US011919019B2

(12) United States Patent
Raman et al.

(10) Patent No.: US 11,919,019 B2
(45) Date of Patent: *Mar. 5, 2024

(54) AUTONOMOUS PAINTING SYSTEMS AND RELATED METHODS

(71) Applicant: RevolutioNice Inc., Belleville, NJ (US)

(72) Inventors: Sreenivas Raman, Park Ridge, NJ (US); Brian Jennings, Hawthorne, CA (US); Ryan J. Giovacchini, Hamilton, NJ (US); Elie Cherbaka, Franklin Lakes, NJ (US); Thomas C. Slater, New York, NJ (US); TianHao Ye, Hoboken, NJ (US)

(73) Assignee: RevolutioNice Inc., Belleville, NJ (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/589,232

(22) Filed: Jan. 31, 2022

(65) Prior Publication Data

US 2022/0143640 A1 May 12, 2022

Related U.S. Application Data

(63) Continuation-in-part of application No. 16/185,682, filed on Nov. 9, 2018, now Pat. No. 11,235,344,
(Continued)

(51) Int. Cl.
*B05B 12/12* (2006.01)
*B05B 13/00* (2006.01)
(Continued)

(52) U.S. Cl.
CPC .......... *B05B 12/122* (2013.01); *B05B 13/005* (2013.01); *B05B 13/0431* (2013.01);
(Continued)

(58) Field of Classification Search
CPC . B05B 13/005; B05B 13/0431; B05B 12/122; B25J 5/007
See application file for complete search history.

(56) References Cited

U.S. PATENT DOCUMENTS 3,089,599 A 5/1963 Casella
3,305,219 A 2/1967 Rhodes
(Continued)

FOREIGN PATENT DOCUMENTS

CA 2716134 3/2012
CN 204920253 12/2015
(Continued)

OTHER PUBLICATIONS

Abdellatif, Mohamed, "Design of An Autonmous Wall Painting Robot" Mechatronics and Robotics Dept. Egypt- Japan University of Science and Technology, Alexandria, Egypt, Aug. 2012. https://www.researchgate.net/publication/236659040_Design_of_An_Autonomous_Wall_Painting_Robot.
(Continued)

*Primary Examiner* — Dah-Wei D. Yuan
*Assistant Examiner* — Stephen A Kitt
(74) *Attorney, Agent, or Firm* — Brient IP Law, LLC

(57) ABSTRACT

An automated mobile paint robot, according to particular embodiments, comprises: (1) a wheeled base; (2) at least one paint sprayer; (3) at least one pump; (4) a vision system; (5) a GPS navigation system; and (5) a computer controller configured to: (A) generate a room painting plan using one or more inputs from the GPS navigation system, vision system, etc.; (B) control movement of the automated mobile paint robot across a support surface: (C) use the vision system to position the wheeled base in a suitable position from which to paint a desired area using the at least one paint sprayer; and (D) use the at least one pump to activate the at
(Continued)

least one paint sprayer to paint a swath (e.g., swatch) of paint from the suitable position.

20 Claims, 29 Drawing Sheets

Related U.S. Application Data which is a continuation of application No. 15/832,505, filed on Dec. 5, 2017, now Pat. No. 10,124,359, which is a continuation-in-part of application No. 15/185,465, filed on Jun. 17, 2016, now abandoned.

(60) Provisional application No. 62/530,686, filed on Jul. 10, 2017, provisional application No. 62/515,036, filed on Jun. 5, 2017, provisional application No. 62/461,442, filed on Feb. 21, 2017, provisional application No. 62/431,765, filed on Dec. 8, 2016, provisional application No. 62/431,788, filed on Dec. 8, 2016, provisional application No. 62/430,155, filed on Dec. 5, 2016, provisional application No. 62/430,186, filed on Dec. 5, 2016, provisional application No. 62/180,603, filed on Jun. 17, 2015.

(51) Int. Cl.
| | |
|---|---|
| B05B 13/04 | (2006.01) |
| B05C 1/08 | (2006.01) |
| B25J 5/00 | (2006.01) |
| B25J 9/00 | (2006.01) |
| B25J 11/00 | (2006.01) |
| G05D 1/00 | (2006.01) |
| G05D 1/02 | (2020.01) |

(52) U.S. Cl.
CPC ............. *B25J 5/007* (2013.01); *B25J 9/0078* (2013.01); *B25J 11/0075* (2013.01); *G05D 1/0234* (2013.01); *G05D 1/0246* (2013.01); *B05C 1/0821* (2013.01)

(56) References Cited

U.S. PATENT DOCUMENTS

| | | | |
|---|---|---|---|
| 3,417,877 A | 12/1968 | Corley | |
| 3,847,112 A * | 11/1974 | Wise | B05C 17/0333 |
| | | | 118/705 |
| 3,923,167 A | 12/1975 | Blankenbeckler | |
| 4,027,802 A | 6/1977 | Reynolds | |
| 4,375,934 A | 3/1983 | Elliott | |
| 5,259,721 A | 11/1993 | Sato et al. | |
| 5,413,454 A | 5/1995 | Movsesian | |
| 5,602,967 A | 2/1997 | Pryor | |
| 5,899,650 A | 5/1999 | Collins | |
| 5,944,468 A | 8/1999 | Mcbrien | |
| 6,773,218 B1 | 8/2004 | Mingoes | |
| 6,807,461 B2 | 10/2004 | Kneifel, II et al. | |
| 6,832,864 B2 | 12/2004 | Patton et al. | |
| 7,584,586 B2 | 9/2009 | Decker | |
| 7,770,695 B2 | 8/2010 | Myers | |
| 7,811,040 B2 | 10/2010 | Bailly et al. | |
| 7,828,506 B1 | 11/2010 | Young | |
| 7,839,417 B2 | 11/2010 | Ebensberger et al. | |
| 7,981,462 B2 | 7/2011 | Burkhard | |
| 8,050,799 B2 | 11/2011 | Eickmeyer et al. | |
| 8,291,855 B2 | 10/2012 | Hoerl, Jr. et al. | |
| 8,838,273 B2 | 9/2014 | Hvass et al. | |
| 9,107,633 B2 | 8/2015 | Muller | |
| 9,156,160 B2 | 10/2015 | Nagai et al. | |
| 9,352,435 B2 | 5/2016 | Spishak et al. | |
| 9,390,203 B2 | 7/2016 | Miegel et al. | |
| 9,427,874 B1 | 8/2016 | Rublee | |
| 9,592,609 B2 | 3/2017 | Lafary et al. | |
| 9,720,414 B1 | 8/2017 | Theobald | |
| 9,908,763 B2 | 3/2018 | Bagge | |
| 9,919,330 B2 | 3/2018 | Letard et al. | |
| 9,995,047 B2 | 6/2018 | Raman et al. | |
| 10,124,359 B2 * | 11/2018 | Raman | B05B 13/005 |
| 10,377,583 B2 | 8/2019 | Strass | |
| 10,464,760 B2 | 11/2019 | Herfert | |
| 11,090,674 B2 * | 8/2021 | Raman | B05B 12/1454 |
| 11,235,344 B2 * | 2/2022 | Raman | B25J 11/0075 |
| 2003/0039531 A1 | 2/2003 | Bickle | |
| 2004/0141784 A1 * | 7/2004 | Patton | B41J 3/4073 |
| | | | 400/323 |
| 2004/0240981 A1 | 12/2004 | Dothan et al. | |
| 2005/0100680 A1 * | 5/2005 | Bustgens | B05B 1/169 |
| | | | 427/427.1 |
| 2006/0099064 A1 | 5/2006 | Anaki et al. | |
| 2006/0283981 A1 | 12/2006 | Mead et al. | |
| 2009/0299525 A1 | 12/2009 | Takahashi et al. | |
| 2011/0264306 A1 | 10/2011 | Bagge | |
| 2012/0027550 A1 | 2/2012 | Bellacicco et al. | |
| 2012/0279142 A1 | 11/2012 | Michaud | |
| 2013/0011234 A1 | 1/2013 | Pretlove et al. | |
| 2013/0119033 A1 | 5/2013 | Lipnevicius | |
| 2013/0122186 A1 * | 5/2013 | Hoppel | B05B 12/10 |
| | | | 118/712 |
| 2014/0242285 A1 * | 8/2014 | Pettersson | G01B 11/002 |
| | | | 427/427.2 |
| 2015/0050111 A1 | 2/2015 | Townsend | |
| 2015/0274294 A1 | 10/2015 | Dahlstrom | |
| 2016/0052126 A1 | 2/2016 | Chin et al. | |
| 2016/0121486 A1 * | 5/2016 | Lipinski | B05B 13/0405 |
| | | | 427/427.3 |
| 2016/0144512 A1 | 5/2016 | Kim | |
| 2016/0160511 A1 | 6/2016 | Giattina | |
| 2016/0299509 A1 | 10/2016 | Ueda et al. | |
| 2016/0320765 A1 | 11/2016 | Carberry et al. | |
| 2017/0036351 A1 | 2/2017 | Sorensen et al. | |
| 2017/0081162 A1 | 3/2017 | Ahern et al. | |
| 2017/0335579 A1 | 11/2017 | Marcon | |
| 2019/0388926 A1 | 12/2019 | Raman et al. | |

FOREIGN PATENT DOCUMENTS

| | | | |
|---|---|---|---|
| CN | 106426225 | 2/2017 | |
| EP | 110644 A * | 6/1984 | .......... B05B 12/122 |
| IN | 201721000991 | 1/2017 | |
| JP | 03100265 | 4/1991 | |
| JP | 2808019 | 10/1998 | |
| WO | 2013112907 | 8/2013 | |
| WO | 2016109721 | 7/2016 | |
| WO | 2017063652 | 4/2017 | |

OTHER PUBLICATIONS

Final Office Action, dated Aug. 31, 2018, from corresponding U.S. Appl. No. 15/185,465.
Final Office Action, dated Jul. 26, 2018, from corresponding U.S. Appl. No. 14/999,676.
Final Office Action, dated Oct. 15, 2020, from corresponding U.S. Appl. No. 16/422,686.
GCR, "Spray-painting Robot Makes Painters Redundant", Global Construction Review, Oct. 27, 2016. http://www.globalconstructionreview.com/innovation/spray-painting-robot-mak7es-painte7rs-redund7ant/.
International Search Report, dated Aug. 31, 2018, from corresponding International Application No. PCT/US2018/035644.
International Search Report, dated Oct. 27, 2016, from corresponding International Application No. PCT/US2016/00049.
Keerthanaa, P. et al., "Automatic Wall Painting Robot" International Journal of Innovative Research in Science, Engineering and Technology, Jul. 2013, 3009-3023, vol. 2, Issue 7, IJIRSET. https://www.ijirset.com/upload/july/59_AUTOMATIC.pdf.
Notice of Allowance, dated Feb. 1, 2018, from corresponding U.S. Appl. No. 15/178,563.
Notice of Allowance, dated Jun. 29, 2018, from corresponding U.S. Appl. No. 15/832,505.

(56) References Cited

OTHER PUBLICATIONS

Notice of Allowance, dated Sep. 23, 2021, from corresponding U.S. Appl. No. 16/185,682.
Office Action, dated Dec. 5, 2017, from corresponding U.S. Appl. No. 15/185,465.
Office Action, dated Dec. 7, 2017, from corresponding U.S. Appl. No. 14/999,676.
Office Action, dated Feb. 23, 2021, from corresponding U.S. Appl. No. 16/185,682.
Office Action, dated Jan. 9, 2020, from corresponding U.S. Appl. No. 16/422,686.
Office Action, dated Mar. 9, 2018, from corresponding U.S. Appl. No. 15/832,505.
Office Action, dated May 14, 2021, from corresponding U.S. Appl. No. 16/422,686.
Office Action, dated Sep. 22, 2017, from corresponding U.S. Appl. No. 15/178,563.
Restriction Requirement, dated Jun. 24, 2020, from corresponding U.S. Appl. No. 16/185,682.
Restriction Requirement, dated Sep. 21, 2017, from corresponding U.S. Appl. No. 14/999,676.
Restriction Requirement, dated Sep. 22, 2017, from corresponding U.S. Appl. No. 15/185,465.
Written Opinion of the International Searching Authority, dated Aug. 31, 2018, from corresponding International Application No. PCT/US2018/035644.
Written Opinion of the International Searching Authority, dated Oct. 27, 2016, from corresponding International Application No. PCT/US2016/00049.

\* cited by examiner

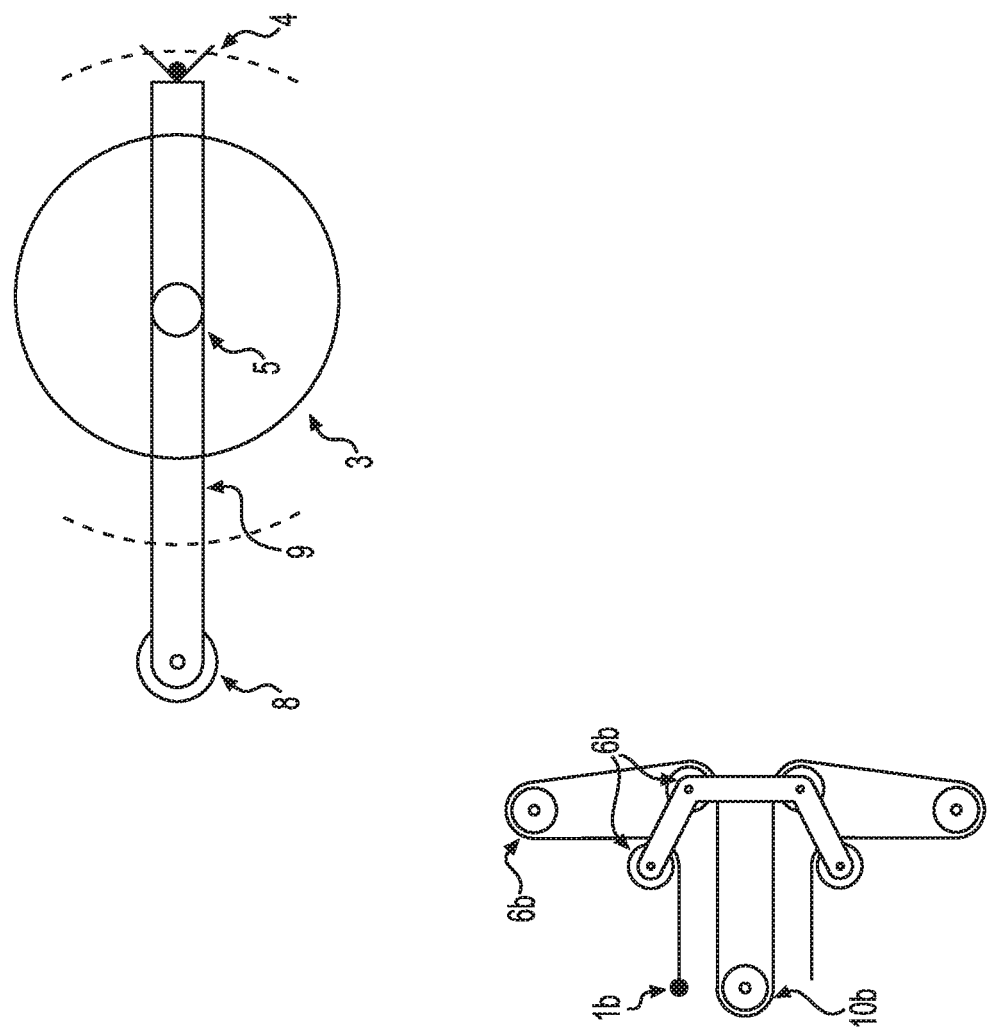
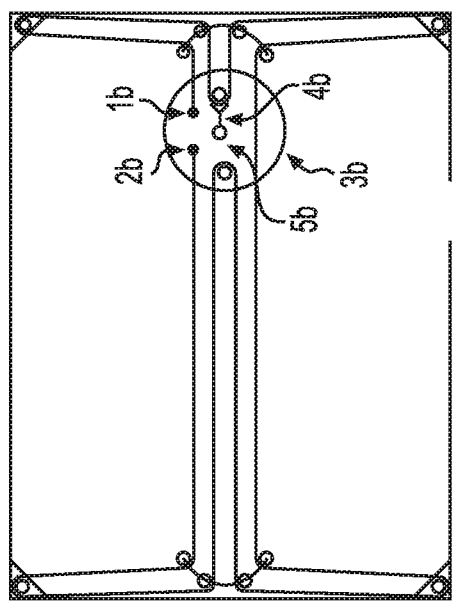
FIG. 21

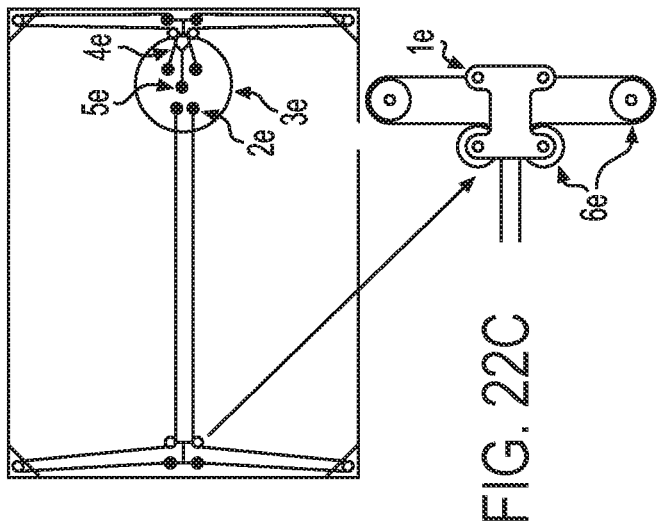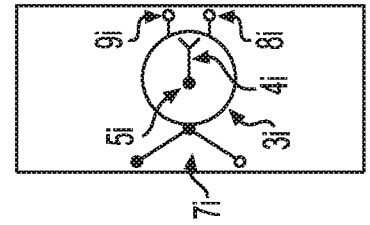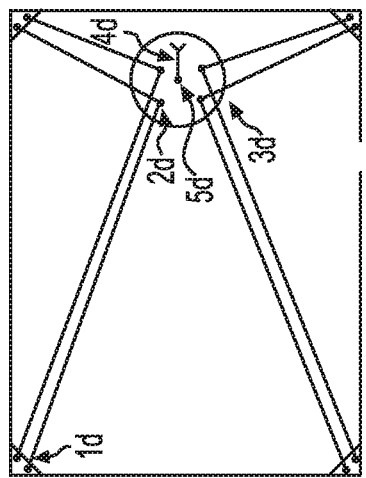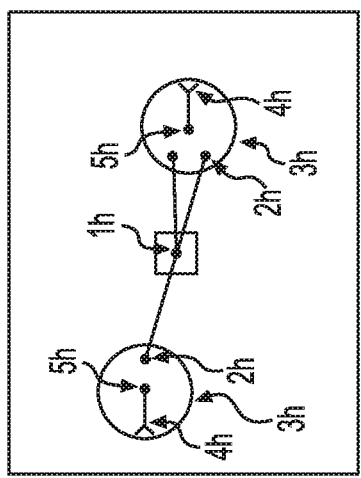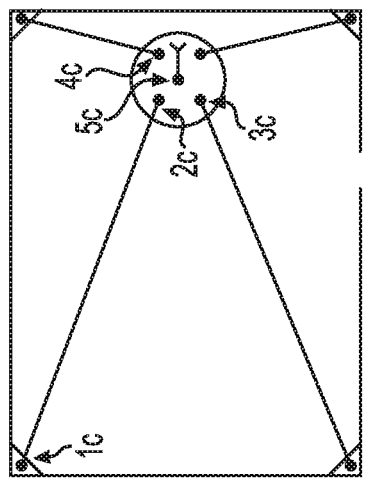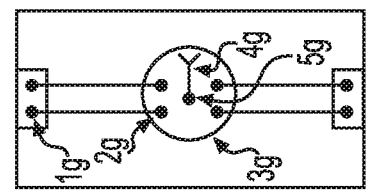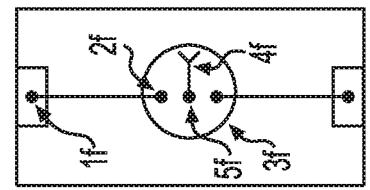

AUTONOMOUS PAINTING SYSTEMS AND RELATED METHODS

CROSS REFERENCE TO RELATED APPLICATIONS

This application is a continuation-in-part of U.S. patent application Ser. No. 16/185,682, filed Nov. 9, 2018, entitled "Autonomous Painting Systems and Related Methods," which is a continuation of U.S. patent application Ser. No. 15/832,505, filed Dec. 5, 2017, now U.S. Pat. No. 10,124, 359, issued Nov. 13, 2018, entitled "Autonomous Painting Systems and Related Methods," which is a continuation-in-part of U.S. patent application Ser. No. 15/185,465, filed Jun. 17, 2016, entitled "Paint Robot," which claimed priority to U.S. Provisional Patent Application Ser. No. 62/180,603, filed Jun. 17, 2015, entitled "Paint Robot"; U.S. patent application Ser. No. 15/832,505 also claimed priority to U.S. Provisional Patent Application Ser. No. 62/430,186, filed Dec. 5, 2016, entitled "Mobile Gantry and System #3; U.S. Provisional Patent Application Ser. No. 62/430,155, filed Dec. 5, 2016, entitled "System for Mapping and Localization within a Room"; U.S. Provisional Patent Application Ser. No. 62/431,765, filed Dec. 8, 2016, entitled "Vision Guided Painting Systems and Method"; U.S. Provisional Patent Application Ser. No. 62/431,788, filed Dec. 8, 2016, entitled "Paint Sprayer Shroud"; U.S. Provisional Patent Application Ser. No. 62/461,442, filed Feb. 21, 2017, entitled "Paint Robot #2"; U.S. Provisional Patent Application Ser. No. 62/515,036, filed Jun. 5, 2017, entitled "Autonomous Painting Systems and Related Methods"; and U.S. Provisional Patent Application Ser. No. 62/530,686, filed Jul. 10, 2017, entitled "Cable Driven Painting Systems and Related Methods", the disclosures of which are hereby incorporated by reference in their entirety.

BACKGROUND

Painting can be a labor-intensive, costly process. Additionally, traditional painting techniques often result in excessive waste (e.g., in terms of paint consumption, brushes, etc.) or result in the release of potentially hazardous chemicals into the air (e.g., via paint spraying). Accordingly, there is a need for improved systems and methods that address these and other needs.

SUMMARY

An autonomous mobile paint spraying robot, according to various embodiments, comprises: (A) a wheeled base; (B) at least one camera; (C) a paint sprayer support system comprising at least one vertical support; (D) at least one paint sprayer adjacent the at least one vertical support and configured to translate vertically along the at least one vertical support; and a computer controller. In particular embodiments, the computer controller is configured for: (A) generating a virtual model of a room based on a location of one or more local position beacons disposed in one or more corners of the room; (B) defining one or more walls of the room based on the virtual model of the room; (C) using a planning algorithm to break down each of the one or more walls into a discrete number of vertical swaths; (D) generating a queue of actions to take in order to paint each of the vertical swaths; and (E) operating the autonomous mobile paint spraying robot to complete the queue of actions. In some embodiments, operating the autonomous mobile paint spraying robot to complete the queue of actions comprises: (A) activating the at least one paint sprayer to spray paint along each vertical swath by causing vertical motion of the at least one paint sprayer relative to the base; and (B) causing the wheeled based to move along each of the one or more walls a distance of one swath-width between painting each vertical swath.

In particular embodiments, a mobile paint spraying robot comprises: (A) a wheeled base; (B) at least one camera; (C) pole mounted paint sprayer comprising a first vertical support portion comprising a sprayer, a chain, a motorized sprocket, and an offset arm; and a second vertical support portion comprising one or more linear bearings, and a cable configured to adjust a relative position of the first and second vertical support portions; and (D) a computer controller. In some embodiments, the computer controller is configured for: (A) generating a virtual model of a room based on a location of one or more local position beacons disposed in one or more corners of the room; (B) defining one or more walls of the room based on the virtual model of the room; (C) receiving first position data from a local position marker; (D) receiving second position data from the local position marker; (E) generating a rectangle based at least in part on the first and second position data; (F) determining whether the rectangle coincides with a particular one of the one or more walls; (G) in response to determining that the rectangle coincides with the particular one of the one or more walls, modifying the virtual model to include an exclusion zone that coincides with the rectangle; (H) using a planning algorithm to break down each of the one or more walls into a discrete number of vertical swaths; (I) generating a queue of actions to take in order to paint each of the vertical swaths, wherein generating the queue of actions to take in order to paint each of the vertical swaths comprises segmenting at least one vertical swath based at least in part on a location of the exclusion zone; and (J) operating the autonomous mobile paint spraying robot to complete the queue of actions. In particular embodiments, operating the autonomous mobile paint spraying robot to complete the queue of actions comprises: (A) activating the sprayer to spray paint along each vertical swath by causing vertical motion of the sprayer relative to the base; and (B) causing the wheeled based to move along each of the one or more walls a distance of one swath-width between painting each vertical swath.

A cable driven robotic painting system, in various embodiments, comprises: (A) a robot chassis comprising one or more wheels; (B) at least one motorized pulley; (C) a robot mounted cable spool; (D) one or more pulleys; (E) a rotary turret configured to rotate about an axis of rotation; (F) a pole mounted paint sprayer disposed adjacent an upper portion of the rotary turret; (G) a fixed cable mount; and (H) a cable that runs between the at least one motorized pulley, the robot mounted cable spool, the one or more pulleys, and the fixed cable mount. In particular embodiments, the at least one motorized pulley, the robot mounted cable spool, the one or more pulleys, and the fixed cable mount are configured to cooperate to manipulate the cable to cause the robot chassis to roll across a support surface on the one or more wheels. In some embodiments, the system comprises a computer controller configured to control the operation of the robot mounted cable spool and the at least one motorized pulley to manipulate an X and Y position of the robot chassis within a room. In other embodiments, each of four pulleys are at least temporarily disposed in respective corners of the room.

BRIEF DESCRIPTION OF THE DRAWINGS

Various embodiments of an automated painting robot are described below. In the course of this description, reference will be made to the accompanying drawings, which are not necessarily drawn to scale, and wherein:

FIG. 21 is a top plan view of a cable driven robotic painting system according to another embodiment and a top plan view of a paint robot with a turret mounted sprayer and wall spacer which may, for example, be used in the context of any suitable cable driven robotic painting system described herein.

FIGS. 22A-22G depict various top plan views of a cable driven robotic painting system according to several other embodiments.

DETAILED DESCRIPTION OF VARIOUS EMBODIMENTS

Figure 1B:
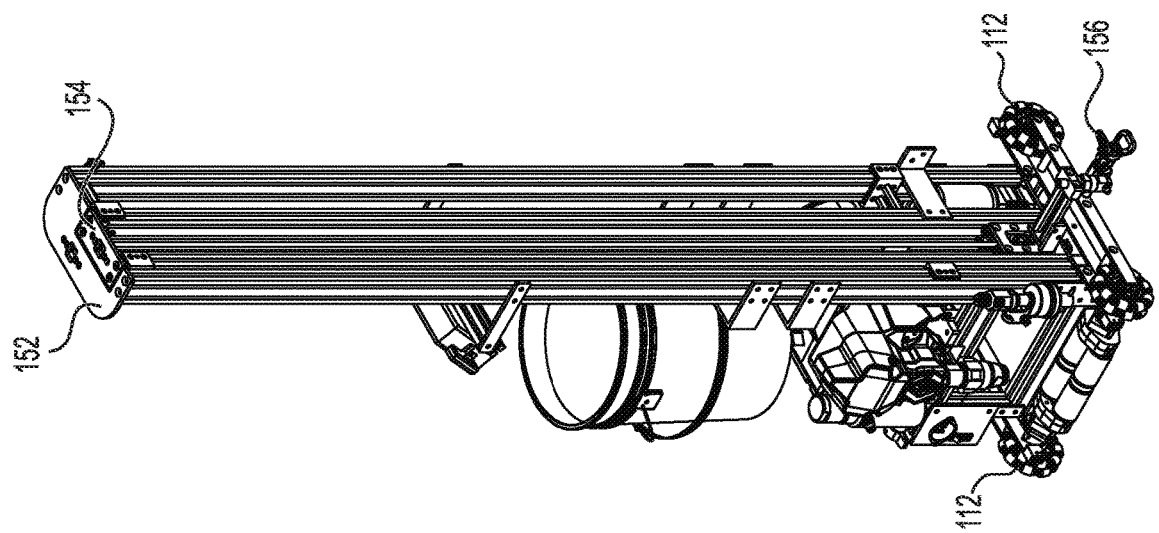
FIGS. 1A-1B depict a perspective view of an automated mobile paint robot 100 according to a particular embodiment.

Various embodiments will now be described in greater detail. It should be understood that the invention may be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout.

Overview

An automated mobile paint robot, according to particular embodiments, comprises: (1) a wheeled base; (2) at least one paint sprayer; (3) at least one pump; (4) a vision system; (5) a GPS navigation system; and (5) a computer controller configured to: (A) generate a room painting plan using one or more inputs from the GPS navigation system, vision system, etc.; (B) control movement of the automated mobile paint robot across a support surface: (C) use the vision system to position the wheeled base in a suitable position from which to paint a desired area using the at least one paint sprayer; and (D) use the at least one pump to activate the at least one paint sprayer to paint a swath (e.g., swatch) of paint from the suitable position.

In various embodiments, the paint robot is configured to minimize an amount of paint required to paint a particular wall, for example, by reducing overspray, reducing overpaint on a particular portion of the wall, etc. This may, for example, enable the automated paint robot to paint a particular surface with a paint transfer rate between a paint container and the particular surface that is at least about 90%. In other embodiments, the system is configured to achieve a paint transfer rate of at least about 80%. In still other embodiments, the paint transfer rate may result in a reduction in harmful emission and fumes released into the air during the paint spraying.

According to one embodiment, the automated mobile paint robot comprises a lifting mechanism (e.g., a lead screw, telescoping lifting mechanism, chain, rail system, or other suitable lifting mechanism) configured to move the at least one paint sprayer vertically relative to the support surface. In such an embodiment, the paint robot is configured to paint a particular wall by painting discrete vertical swaths along the length of the wall. In particular, the computer controller may: (1) cause the at least one sprayer to paint a first vertical swath from floor to ceiling; (2) determine a next suitable position to paint the second swath such that the first and second swaths abut one another based on characteristics of the sprayer and the distance of the wheeled base from the wall (e.g., based on the width of the swath, which may be determined by the fan of the sprayer, spray pressure, etc.); (3) reposition the wheeled base to the next suitable position; (4) paint the second vertical swath; and (5) so on until the entire width of the wall is painted. In some embodiments, the paint robot comprises two paint sprayers: (1) the first being configured to paint the top portion of the swath; and (2) the second being configured to paint the bottom portion of the swath. In other embodiments, the paint robot may include any other suitable number of sprayers In some embodiments, the vision system comprises: (1) at least one camera; and (2) a fiducial marker or target. The fiducial marker may include any object or image suitable for use as a reference point (e.g., concentric circles or other shapes, machine-readable indicia such as a barcode, QR code, etc., or other suitable reference point). In such embodiments, a user may place the fiducial marker in a particular location of a wall that is desired to be painted (e.g., along an edge or a corner of the wall). The user may then place the paint robot in the room with the wall. The vision system may then be configured to: (1) capture at least one image with the at least one camera; (2) identify the fiducial marker in that at least one image; and (3) determine a relative position and orientation of the paint robot to the wall based on the identified fiducial marker and an analysis of the at least one image comprising the identified fiducial marker. For example the system may be configured to determine a position of the paint robot relative to the fiducial marker based on, for example: (1) a skew of the fiducial marker in the at least one image; (2) an angle of the fiducial marker in the at least one image; (3) a rotation or angle of the fiducial marker in the at least one image; and/or (4) any other suitable characteristic of the fiducial marker in the at least one image.

In some embodiments, the local position navigation system comprises a series of beacons, which may, for example, be placed in one or more locations in a particular room (e.g., in four corners of a rectangular room). The local position navigation system, in various embodiments) further comprises a marker for indicating a position of windows or other objects that are not desired to be painted. The system may then use the computer controller to generate a virtual model of the walls of the room, including portions of each wall that should not be painted, based on the local position beacons and markers.

The computer controller may then: (1) use a planning algorithm to break each wall into a particular number of swaths; (2) determine an initial relative position and orientation of the paint robot relative to a first wall using the fiducial marker and/or the local position navigation system (e.g., based at least in part on a position of each of the one or more location beacons relative to one or more beacons disposed on a suitable portion of the paint robot); (3) generate a queue of actions to take in order to paint each wall; and (4) cause the paint robot to systematically perform the queue of actions until each of the walls are painted. While executing the stack of moves, the system may be configured to utilize the vision system and/or the local position navigation system to ensure that the paint robot maintains a consistent distance from the wall (e.g., based on the relative position of the fiducial marker) and travels a correct distance along the wall between painting each particular distinct vertical swath.

MORE DETAILED DISCUSSION

Mobile Paint Robot

Figure 1A:
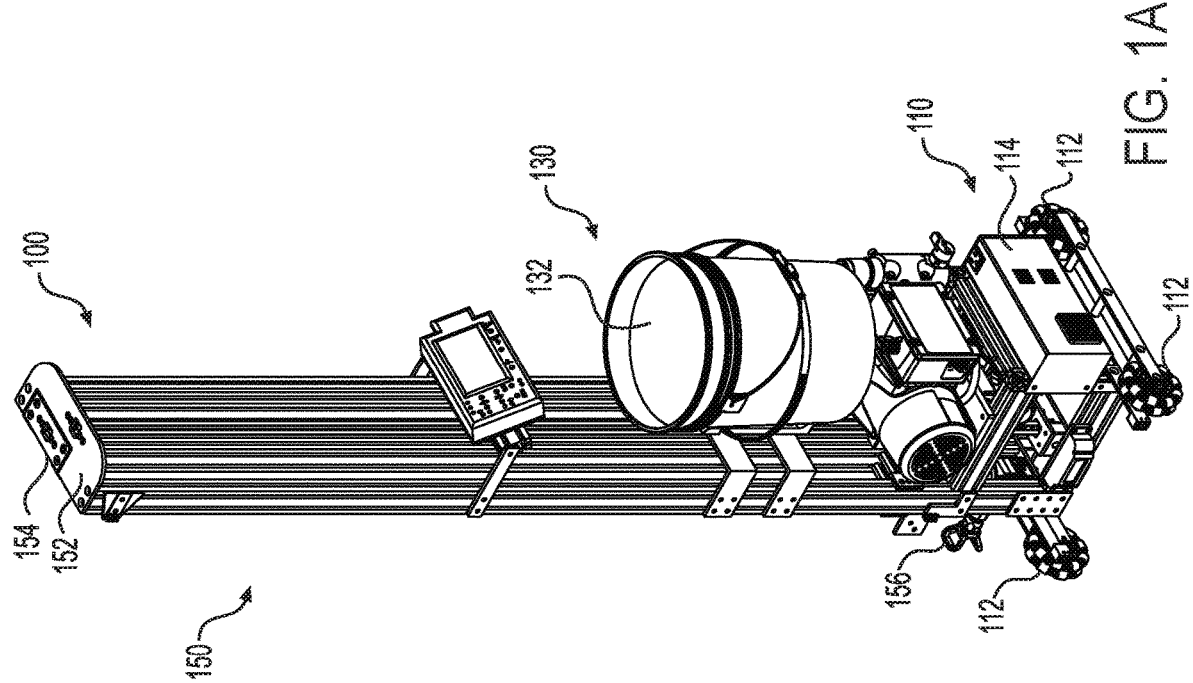

FIGS. 1A and 1B depict an autonomous mobile paint robot 100 according to a particular embodiment. In the embodiment shown in this figure, the autonomous mobile paint robot 100 comprises: (1) a base portion 110; (2) a paint caddy assembly 130; and (3) a paint sprayer support system 150. These features will be discussed more fully below.

As may be understood from FIGS. 1A and 1B, the autonomous mobile paint robot 100 comprises a substantially rectangular (e.g., rectangular) base portion 110 that comprises a plurality of wheels 112 (e.g., four wheels in the embodiment shown in FIGS. 1A and 1B). In various embodiments, the plurality of wheels are configured to support the autonomous mobile paint robot 100 adjacent a support surface (e.g., the ground, a suitable flooring surface within a building, etc.).

In particular embodiments, the plurality of wheels 112 comprise one or more Mecanum wheels, which are configured to move the autonomous mobile paint robot 100 over a support surface in any direction (e.g., in any direction relative to an orientation of any particular wheel). In various embodiments, the one or more Mecanum wheels each comprise a conventional wheel (e.g., a substantially circular wheel) comprising a plurality of rollers disposed about its circumference (e.g., disposed such that an axis of rotation of each roller is 45 degrees to the plane of the wheel and at 45 degrees to a line through the center of the roller parallel to an axis of rotation of the wheel).

In still other embodiments, the plurality of wheels 112 comprise one or more omni wheels (e.g., one or more poly wheels) each comprising one or more discs disposed about its circumference which are perpendicular to the turning direction of the respective wheel. In still other embodiments, the plurality of wheels 112 may comprise any other suitable type of wheel (e.g., one or more casters, one or more standard wheels, one or more omni wheels etc.). In some embodiments, the plurality of wheels 112 comprise a single wheel.

In some embodiments, the autonomous mobile paint robot 100 comprises a distributed controller (e.g., computer controller) configured to control operation of one or more motors for powering operation of the plurality of wheels 112. In some embodiments, each respective wheel of the plurality of wheels is controlled by a respective distributed controller. In various embodiments, each distributed controller is configured to cause the one or more motors to operate each respective wheel of the plurality of wheels 112 to cause the autonomous mobile paint robot 100 to roll across the support surface (e.g., in any suitable direction). As may be understood by one skilled in the art, the distributed controller arrangement for each of the plurality of wheels 122 may enable the system (e.g., a master control system) to operate each of the plurality of wheels independently at one or more different velocities, one or more different accelerations, and/or one or more different directions.

In various embodiments, the base portion 110 further comprises at least one computer controller 114, configured to control one or more aspects of the operations of the autonomous mobile paint robot 100 described herein. Various features of the control systems of the autonomous mobile paint robot 100 are described more fully below.

As shown in FIGS. 1A and 1B, the autonomous mobile paint robot 100 further comprises a paint caddy assembly 130. As may be understood from this figure, the paint caddy assembly 130 comprises at least one paint container 132 (e.g., a bucket or other suitable housing for storing paint or other liquid). In some embodiments, the paint caddy assembly 130 comprises a pump configured to draw paint stored in the at least one paint container 132 and deliver the paint at pressure through a spray tip 156, such as the spray tip 156 discussed more fully below.

Figure 2B:
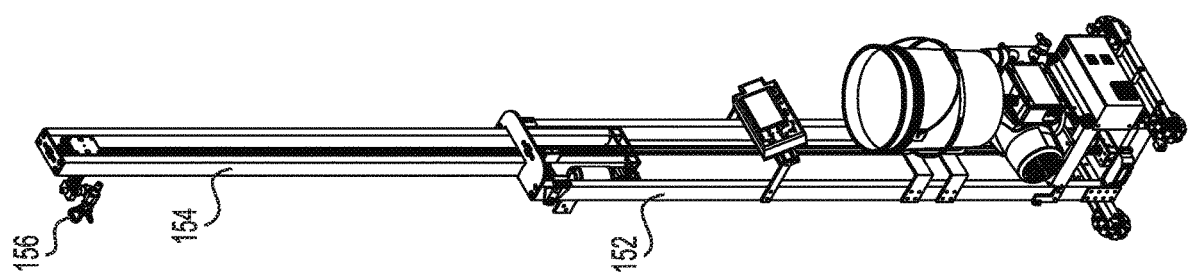
FIGS. 2A-2B depict the automated mobile paint robot 100 of FIG. 1 with the paint sprayer in an extended position.
Figure 2A:
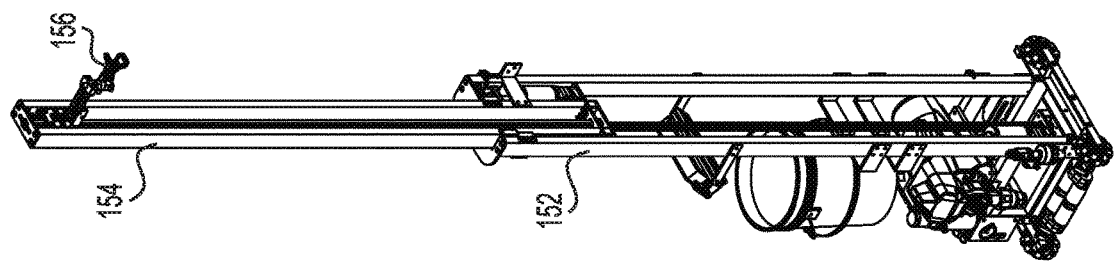

In particular embodiments, the paint robot 100 further comprises a paint sprayer support system 150 that comprises: (1) a first vertical support 152; (2) a second vertical support 154; and a spray tip. In particular embodiments, the first and second vertical supports 152, 154 are configured to slide relative to one another via a suitable joint (e.g., a prismatic joint) in a substantially telescoping (e.g., telescoping) manner. FIGS. 2A and 2B show the paint robot 100 with the second vertical support 154 in an extended position relative to the first vertical support 152. FIGS. 2A and 2B further depict the spray tip positioned at an upper end of the second vertical support. As may be understood from this figure, in various embodiments, the spray tip is configured to move vertically along the first and second vertical supports 152, 154 (e.g., via a second prismatic or other suitable joint, along a suitable track, etc.). In various embodiments, the paint sprayer support system comprises one or more motors configured to cause: (1) the second vertical support 154 to slide relative to the first vertical support 152; and (2) the spray tip 156 to slide vertically relative to both the first and second vertical supports 152, 154. In a particular embodiment, the system comprises two motors, or any other suitable number of motors configured to cooperate to cause the first and second vertical supports 152, 154 or other components of the paint robot to move relative to one another to enable the spray tip 156 (e.g., or spray tips) to spray a complete vertical swath of a wall (e.g., from floor to ceiling or from ceiling to floor).

In various embodiments, as may be understood from FIGS. 1A, 1B, 2A, and 2B, the spray tip 156 is configured to slide from a first position at a base of the paint robot 100 (e.g., at floor level) to a second position at an upper portion of the second vertical support 154. In this way, the spray tip 156, in any embodiment described herein, may be configured to paint a vertical swath of paint along this vertical path between the first and second positions. In particular embodiments, the spray tip 156 comprises a pressure activated valve, which may, for example, be configured to prevent leakage of paint of other liquid from the spray tip and providing a minimum pressure level of fluid to the spray tip orifice.

In various embodiments, the paint robot 100 is substantially light and configured to enable an individual to carry or easily move the paint robot 100 into a subject room for painting. This may include for example, carrying the paint robot 100 up and down stairs. The paint robot 100 may be sufficiently easy to transport that a single individual may be capable of offloading the paint robot 100 from a transport vehicle and guiding the paint robot 100 to a target area for painting (e.g., at a construction site, in a building, or other suitable area) without utilizing any powered movement of the paint robot.

Robot Control and Planning Systems

As may be understood in light of this disclosure, various functions related to the control of the autonomous mobile paint robot 100 may be implemented in the context of a robot control and planning system 300. The system may, for example, be housed substantially entirely on the paint robot (e.g., as the at least one computer controller 114 shown in FIG. 1A). In other embodiments, the system comprises a plurality of computing devices, servers, etc. and is configured to distribute particular functionality (e.g., the execution of particular process steps) among those various devices. Particular embodiments of the robot control and planning system 300 are described below.

Exemplary Technical Platforms

As will be appreciated by one skilled in the relevant field, the present invention may be, for example, embodied as a computer system, a method, or a computer program product. Accordingly, various embodiments may take the form of an entirely hardware embodiment, an entirely software embodiment, or an embodiment combining software and hardware aspects. Furthermore, particular embodiments may take the form of a computer program product stored on a computer-readable storage medium having computer-readable instructions (e.g., software) embodied in the storage medium. Various embodiments may take the form of web-implemented computer software. Any suitable computer-readable storage medium may be utilized including, for example, hard disks, compact disks, DVDs, optical storage devices, and/or magnetic storage devices.

Various embodiments are described below with reference to block diagrams and flowchart illustrations of methods, apparatuses (e.g., systems), and computer program products. It should be understood that each block of the block diagrams and flowchart illustrations, and combinations of blocks in the block diagrams and flowchart illustrations, respectively, can be implemented by a computer executing computer program instructions. These computer program instructions may be loaded onto a general purpose computer, special purpose computer, or other programmable data processing apparatus to produce a machine, such that the instructions which execute on the computer or other programmable data processing apparatus to create means for implementing the functions specified in the flowchart block or blocks.

These computer program instructions may also be stored in a computer-readable memory that can direct a computer or other programmable data processing apparatus to function in a particular manner such that the instructions stored in the computer-readable memory produce an article of manufacture that is configured for implementing the function specified in the flowchart block or blocks. The computer program instructions may also be loaded onto a computer or other programmable data processing apparatus to cause a series of operational steps to be performed on the computer or other programmable apparatus to produce a computer implemented process such that the instructions that execute on the computer or other programmable apparatus provide steps for implementing the functions specified in the flowchart block or blocks.

Accordingly, blocks of the block diagrams and flowchart illustrations support combinations of mechanisms for performing the specified functions, combinations of steps for performing the specified functions, and program instructions for performing the specified functions. It should also be understood that each block of the block diagrams and flowchart illustrations, and combinations of blocks in the block diagrams and flowchart illustrations, can be implemented by special purpose hardware-based computer systems that perform the specified functions or steps, or combinations of special purpose hardware and other hardware executing appropriate computer instructions.

Example System Architecture

Figure 3:
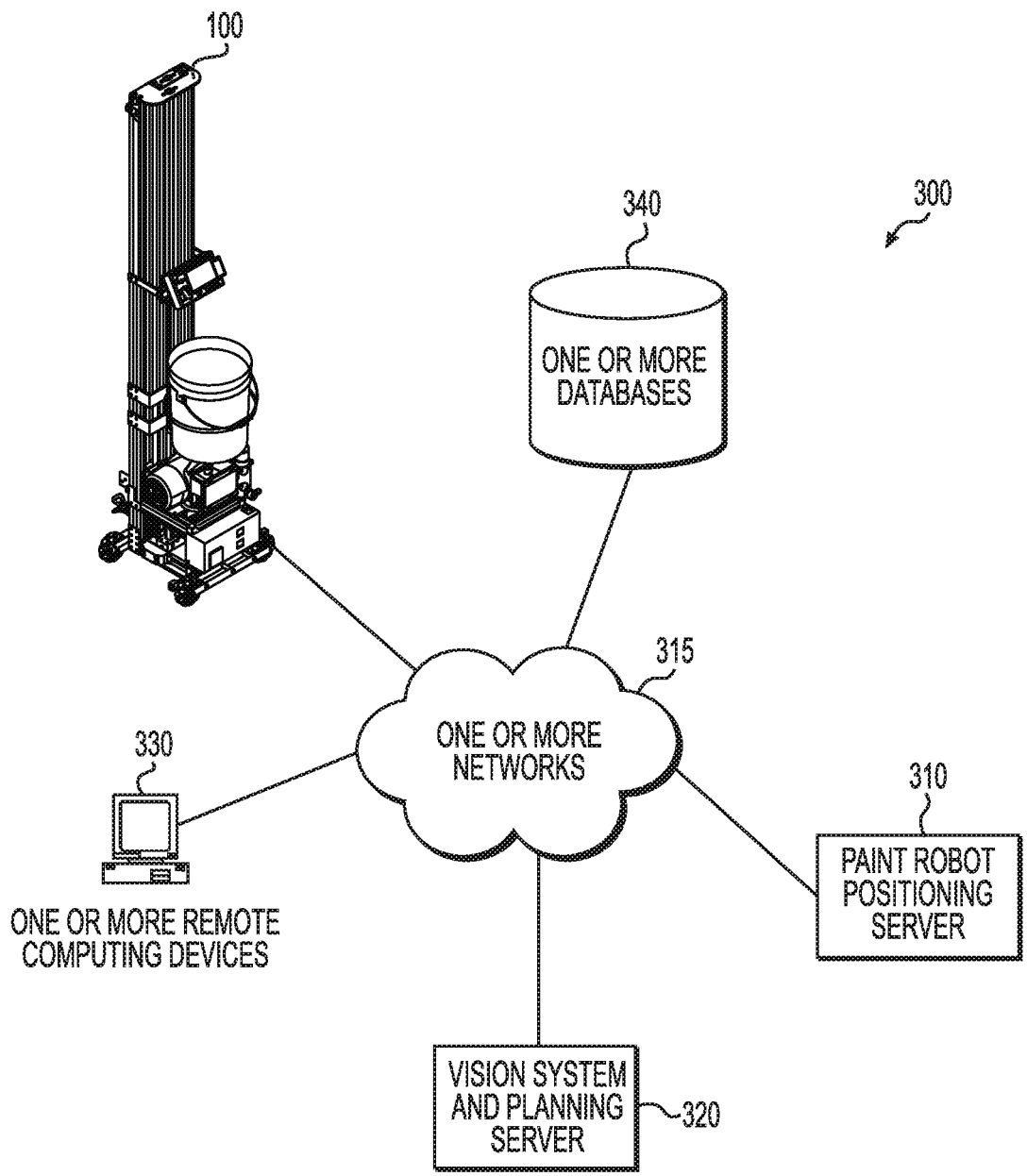
FIG. 3 depicts a robot control and planning system 300 according to various embodiments.

FIG. 3 is a block diagram of a robot control and planning system 300 according to a particular embodiment. In some embodiments, the robot control and planning system 300 is configured to coordinate the planning and execution of one or more actions by an autonomous mobile paint robot 100 in order to complete the painting of a particular surface, room, etc.

As may be understood from FIG. 3, the robot control and planning system 300 includes one or more computer networks 315, an autonomous mobile paint robot 100, a paint robot positioning server 310, a vision system and planning server 320, one or more remote computing devices 330 (e.g., such as a desktop computer, laptop computer, tablet computer, smartphone, etc.), and one or more databases 340. In particular embodiments, the one or more computer networks 315 facilitate communication between the autonomous mobile paint robot 100, one or more remote computing devices 330 (e.g., a desktop computer, laptop computer, tablet computer, etc.), and one or more databases 340.

The one or more computer networks 315 may include any of a variety of types of wired or wireless computer networks such as the Internet, a private intranet, a public switch telephone network (PSTN), or any other type of network. The communication link between the paint robot positioning server 310 and database 340 may be, for example, implemented via a Local Area Network (LAN) or via the Internet.

Figure 4:
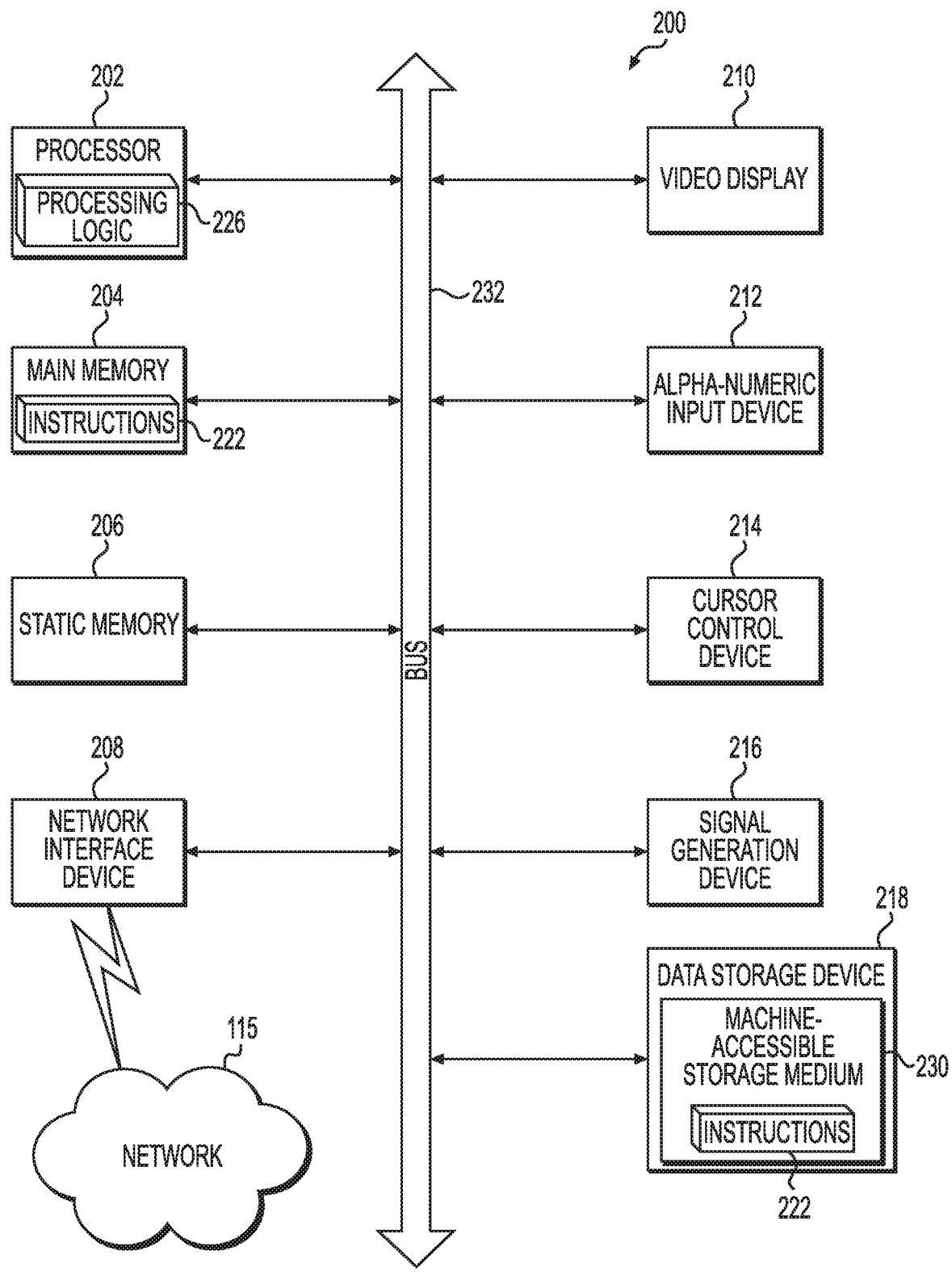
FIG. 4 is a schematic diagram of a computer (such as the vision system and planning server 310, or one or more remote computing devices 330) that is suitable for use in various embodiments of the robot control and planning system 300 shown in FIG. 1.

FIG. 4 illustrates a diagrammatic representation of a computer 200 that can be used within the robot control and planning system 300, for example, as a client computer (e.g., one or more remote computing devices 130 shown in FIG. 1), or as a server computer (e.g., paint robot positioning server 310 shown in FIG. 1), or one or more computer controllers on the autonomous mobile paint robot 100 itself (e.g., such as one of the one or more distributed controllers for controlling one or more motors to power the plurality of wheels 112). In particular embodiments, the computer 200 may be suitable for use as a computer within the context of the robot control and planning system 300 that is configured to receive data input, generate a virtual room plan, generate a queue or stack of moves for the paint robot 100 to perform, and operate the paint robot 100 to perform those moves.

In particular embodiments, the computer 200 may be connected (e.g., networked) to other computers in a LAN, an intranet, an extranet, and/or the Internet. As noted above, the computer 200 may operate in the capacity of a server or a client computer in a client-server network environment, or as a peer computer in a peer-to-peer (or distributed) network environment. The Computer 200 may be a personal computer (PC), a tablet PC, a set-top box (STB), a Personal Digital Assistant (PDA), a cellular telephone, a web appliance, a server, a network router, a switch or bridge, or any other computer capable of executing a set of instructions (sequential or otherwise) that specify actions to be taken by that computer. Further, while only a single computer is illustrated, the term "computer" shall also be taken to include any collection of computers that individually or jointly execute a set (or multiple sets) of instructions to perform any one or more of the methodologies discussed herein.

An exemplary computer 200 includes a processing device 202, a main memory 204 (e.g., read-only memory (ROM), flash memory, dynamic random access memory (DRAM) such as synchronous DRAM (SDRAM) or Rambus DRAM (RDRAM), etc.), static memory 206 (e.g., flash memory, static random access memory (SRAM), etc.), and a data storage device 218, which communicate with each other via a bus 232.

The processing device 202 represents one or more general-purpose processing devices such as a microprocessor, a central processing unit, or the like. More particularly, the processing device 202 may be a complex instruction set computing (CISC) microprocessor, reduced instruction set computing (RISC) microprocessor, very long instruction word (VLIW) microprocessor, or processor implementing other instruction sets, or processors implementing a combination of instruction sets. The processing device 202 may also be one or more special-purpose processing devices such as an application specific integrated circuit (ASIC), a field programmable gate array (FPGA), a digital signal processor (DSP), network processor, or the like. The processing device 202 may be configured to execute processing logic 226 for performing various operations and steps discussed herein.

The computer 200 may further include a network interface device 208. The computer 200 also may include a video display unit 210 (e.g., a liquid crystal display (LCD) or a cathode ray tube (CRT)), an alphanumeric input device 212 (e.g., a keyboard), a cursor control device 214 (e.g., a mouse), and a signal generation device 216 (e.g., a speaker).

The data storage device 218 may include a non-transitory computer-accessible storage medium 230 (also known as a non-transitory computer-readable storage medium or a non-transitory computer-readable medium) on which is stored one or more sets of instructions (e.g., software instructions 222) embodying any one or more of the methodologies or functions described herein. The software instructions 222 may also reside, completely or at least partially, within main memory 204 and/or within processing device 202 during execution thereof by computer 200—main memory 204 and processing device 202 also constituting computer-accessible storage media. The software instructions 222 may further be transmitted or received over a network 115 via network interface device 208.

While the computer-accessible storage medium 230 is shown in an exemplary embodiment to be a single medium, the term "computer-accessible storage medium" should be understood to include a single medium or multiple media (e.g., a centralized or distributed database, and/or associated caches and servers) that store the one or more sets of instructions. The term "computer-accessible storage medium" should also be understood to include any medium that is capable of storing, encoding or carrying a set of instructions for execution by the computer and that cause the computer to perform any one or more of the methodologies of the present invention. The term "computer-accessible storage medium" should accordingly be understood to include, but not be limited to, solid-state memories, optical and magnetic media, etc.

Control System Overview

Various functionality of the autonomous paint robot control and paint spraying system 300 may be implemented via various system modules. The system, when executing certain steps of such modules, may be configured to generate, may perform the operations described in an order other than those in which they are presented in the various embodiments described herein. Various other embodiments of the system modules may perform steps in addition to those described, or omit one or more of the described steps.

Figure 5:
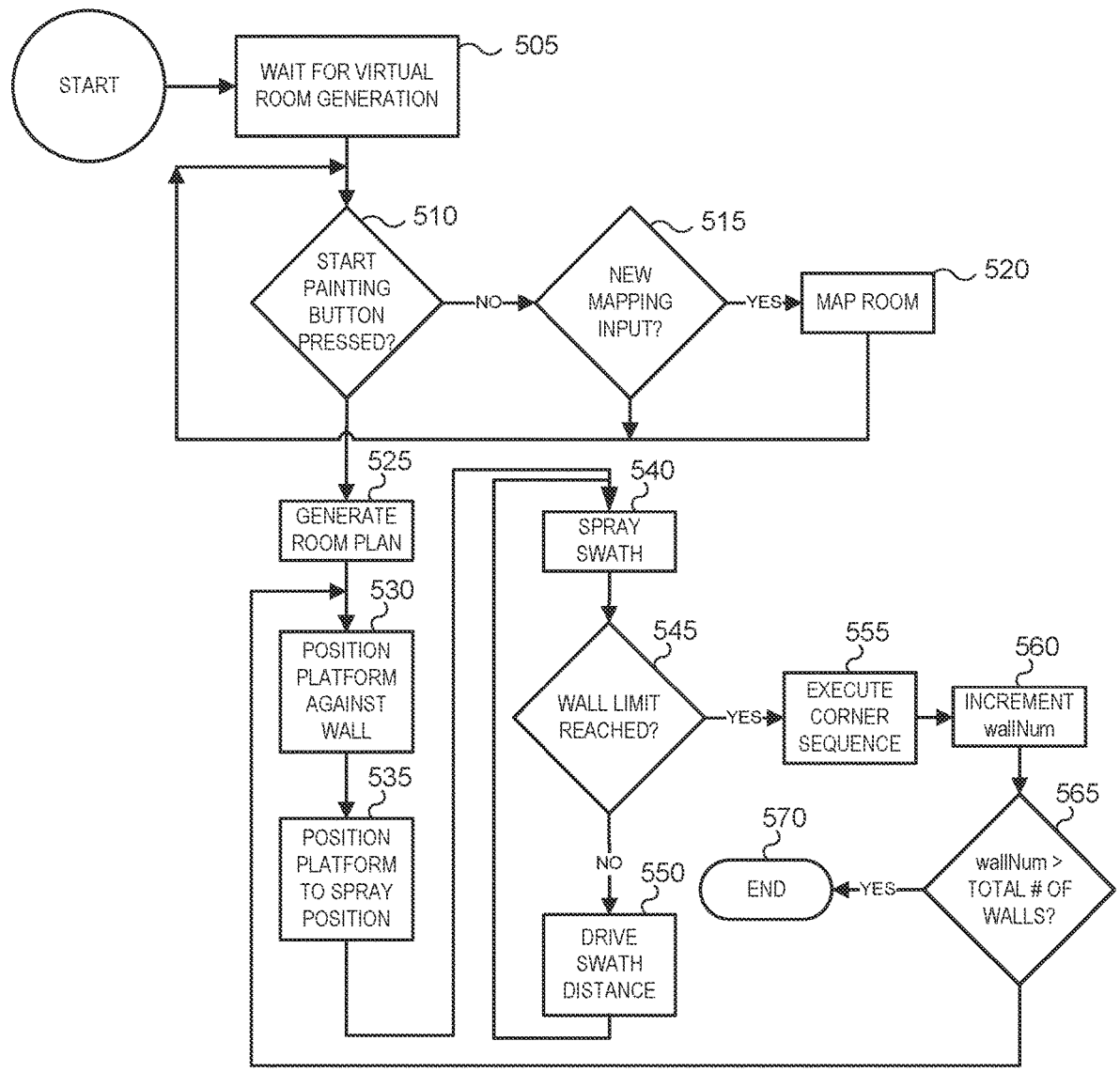
FIGS. 5-6 are exemplary processes that the robot control and planning system 300 may execute to implement various functionalities of the autonomous mobile paint robot.

FIG. 5 depicts an overview of various operations performed by the autonomous paint robot control and paint spraying system 300 (e.g., an autonomous paint robot control and paint spraying module that includes steps that the system is configured to perform). In particular embodiments, the system is configured to control one or more operations of the autonomous mobile paint robot 100 (e.g., movement via the plurality of wheels 112, operation of the pump to cause paint spraying via the pray tip 156, etc.). In particular embodiments, such as the embodiment shown in FIG. 5, the system begins at Step 505 by waiting for virtual room generation. In particular embodiments, at Step 505, the system is configured to generate a virtual representation of a particular room that is desired to be painted (e.g., by the autonomous mobile paint robot 100). The system may, for example, include a local position navigation system that comprises a series of beacons, which may, for example, be placed in four corners of a rectangular room. The local position Navigation system further comprises a marker for indicating a position of windows or other objects that are not desired to be painted. The system may then use the computer controller to generate a virtual model of the walls of the room, including portions of each wall that should not be painted, based on the local position beacons and markers.

Continuing to Step 510, the system is configured to determine whether a start painting button has been pressed. In particular embodiments, the start painting button is disposed on the autonomous mobile paint robot 100. In other embodiments, the system may receive a start request via a suitable software application (e.g., such as a software application running on the one or more remote computing devices 330 shown in FIG. 3). In still other embodiments, the system may use any other suitable technique to determine whether to initiate painting of a particular room.

In response to determining that a start painting button has not been pressed at Step 510, the system may be configured to determine, at Step 515, whether to initiate a new mapping input (e.g., for a new room). In response to determining that the system should initiate a new mapping input, the system may be configured to map a particular room for painting at Step 520.

In response to determining that a start painting button has been pressed at Step 510, the system may be configured, at Step 525, to generate a room plan for the autonomous mobile paint robot 100 to follow in order to complete painting of the room. When generating the room plan, the system may, for example: (1) use a planning algorithm to break each wall into a particular number of vertical swaths; (2) determine an initial relative position and orientation of the paint robot 100 relative to a first wall; and (3) generate a queue of actions to take in order to paint each wall in the room.

Continuing to Step 530, the system, in some embodiments, is configured to position the paint robot 100 against the wall. The system may, for example, cause the one or more distributed controllers to operate the plurality of wheels 112 to translate the paint robot 100 across the support surface such that the paint robot 100 is in the initial position determined during the room plan discussed above at Step 525. The system may then, for example, position the platform (e.g., the spray tip) to an initial spray position at Step 535 and then operate the at least one pump to spray a first swath of paint on the wall at Step 540. After painting an initial vertical swath at Step 540, the system is configured to determine whether a wall limit has been reached at Step 545 (e.g., determine whether the paint robot 100 has reached the end of the first wall).

In response to determining that the paint robot 100 has not reached the end of the first wall, the system continues, at Step 550, by causing the one or more distributed controllers to operate the plurality of wheels 112 to translate the paint robot 100 across the support surface along the first wall a distance that substantially corresponds to the width of a single vertical swath. While travelling the swath distance, the system may be configured to utilize the vision system described herein to ensure that the paint robot maintains a consistent distance and orientation relative to the wall that is being painted. In particular embodiments, the system is configured to repeat: (1) Step 540 of spraying a vertical swath; (2) Step 545 of determining whether the wall limit has been reached; and (3) Step 550 of driving an additional swath distance until the system determines that the wall limit has been reached.

In response to determining that the wall limit has been reached, the system continues, at Step 555, by executing a corner sequence. When executing a corner sequence, the system is configured to execute a series of steps to ensure that the paint robot 100 applies an even coating of paint across an intersection of two walls (e.g., a corner). After completing the corner sequence at Step 555, the system is configured, at Step 560, to increment a stored value associated with a number of painted walls (e.g., up to 4 walls in a rectangular room).

The system is then configured to determine whether the stored number of painted walls has reached the number of walls in the room. In response to determining that the number of painted walls is greater than the total number of walls, the process ends at Step 570 (e.g., because all the walls of the rooms would be painted at that point). In response to determining that the number of painted walls has not reached the total number of walls in the room, the system repeats the process of positing the paint robot 100 against the wall, spraying a series of swaths, etc. for each of the remaining walls. Various aspects of the autonomous paint robot control and paint spraying system 300 are described in more detail below.

Room Mapping and Planning System

In particular embodiments, the system is configured to generate a virtual representation of a room that is desired to be painted. The system may, for example: (1) identify a location of each of four corners of a particular room; (2) determine a distance between and/or a relative location of each of the four corners; and (3) generate a virtual wall for each identified wall in the room, each virtual wall having a width that corresponds to a width of the room to be painted and a particular height that corresponds to the height of the room (e.g., or an indefinite height). The system is then configured to identify one or more exclusion zones within the room (e.g., windows, light switches, doorways, power outlets, and any other suitable exclusion zones) that are not meant to be painted.

In some embodiments, the planning system comprises a series of local position beacons, which may, for example, be placed in four corners of a rectangular room. The system may be configured to identify the location of each corner of the room based at least in part on a determined location of each of the local position beacons (e.g., using any suitable local position techniques). In particular embodiments, the system further comprises a local position marker for indicating a position of windows or other objects (e.g., or painting exclusion zones) that are not desired to be painted. In particular embodiments, the local position marker may comprise any suitable device for transmitting a local position of the local position marker (e.g., to one or more of the computing systems described herein). In various embodiments, the local position marker comprises one or more antennae for transmitting the local position to the one or more computing systems described herein. In particular embodiments, the one or more antennae are configured to transmit the local position using any suitable wireless protocol (e.g., Bluetooth, Wi-Fi, etc.). In particular embodiments, the position of the local position marker is a position of the marker relative to one or more beacons placed within the room. In other embodiments, the position of the marker is a position determined using one or more global positioning techniques, dead reckoning, or other suitable technique.

Figure 6:
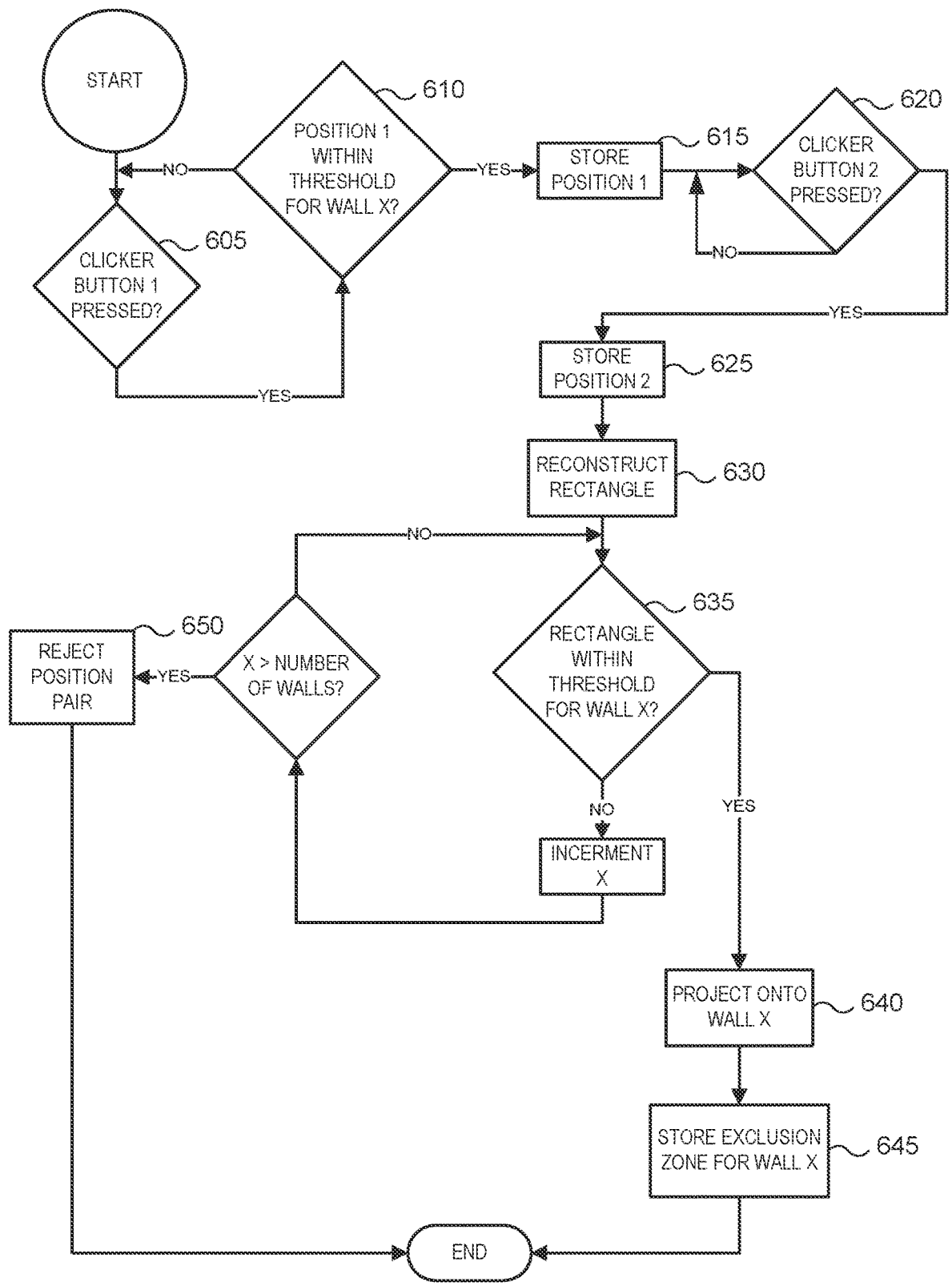

FIG. 6 shows an exemplary process that the system may utilize for mapping out one or more exclusion zones for particular walls in a room to be painted. This room mapping module may include, for example, various steps for defining one or more exclusion zones that do not make up a portion of a particular wall that the paint robot will paint (e.g., such as doors, windows, etc.). When executing the room mapping module, the system may be configured to perform one or more of the steps described more fully below.

As may be understood from this figure, the system begins, at Step 605, by determining whether a clicker button has been pressed on the local position marker. The system may then, in response to determining that the clicker button was pressed, determine, at Step 610: (1) a first position of the local position marker at the time that the clicker button was pressed (e.g., a local position location); and (2) determine whether the first position corresponds to a position on a particular wall in the generated virtual room. In response to determining that the position does correspond to a position on a wall in the room, the system is configured to store the first position (e.g., in computer memory) at Step 615.

Continuing to Step 620, the system again determines whether a clicker button has been pressed on the local position marker (e.g., click remote). In some embodiments, the local position marker comprises a single clicker button. In other embodiments, the local position marker comprises at least a first clicker button and a second clicker button. The system then continues to Step 625 where the system: (2) determines a second position of the local position marker at the time that the clicker button was pressed (e.g., a local position location); and (2) stores the second position (e.g., in computer memory). In various embodiments, the system then continues to Step 630 and reconstructs a rectangle based at least in part on the first and second positions. In some embodiments, the reconstructed rectangular is a rectangular comprising the first position and second position as opposing corners. In various embodiments, the reconstructed rectangular is substantially parallel to a wall within which it is positioned.

Figure 7:
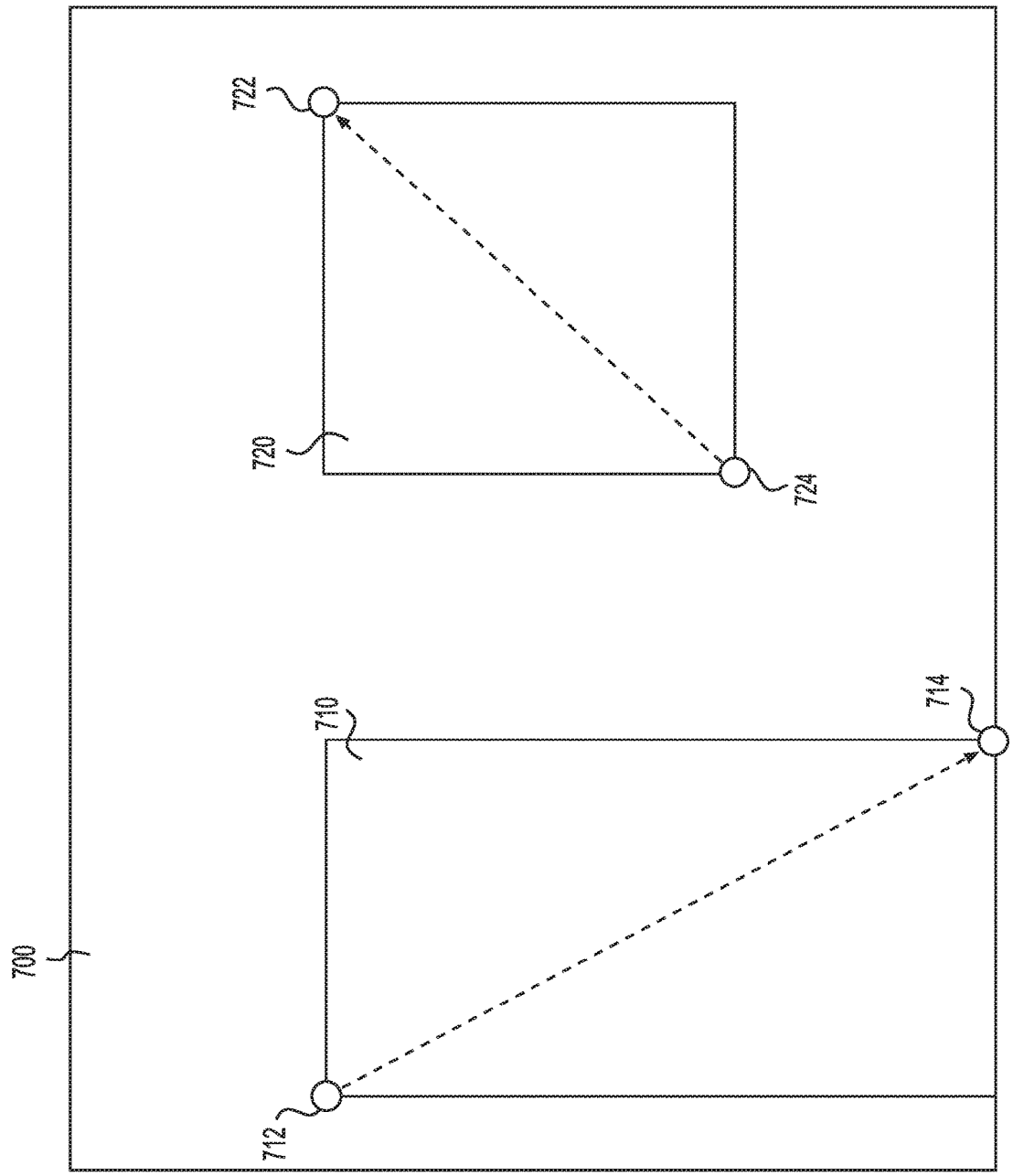
FIG. 7 depicts an exemplary wall with exemplary exclusion zones that the automated mobile paint robot 100 of FIG. 1 may be configured to avoid painting when painting the wall.

FIG. 7 depicts an exemplary wall 700 within a room that the system may be configured to cause the paint robot to paint. As described herein, the system may be configured to identify one or more vacancies 710, 220 within the wall that the system may determine not to paint. For example, in the embodiment shown in FIG. 7, the wall 700 includes a door 710 and a window 720. As may be understood in light of this disclosure, when mapping a particular room for painting (e.g., a particular wall in a particular room), the system may be configured to identify one or more regions of each particular wall to which the paint robot should not apply paint. These one or more regions may include, for example: (1) one or more doors; (2) one or more windows; (3) one or more switch plates (e.g., light switches) and/or electrical outlets; (4) one or more HVAC vents; and/or (5) any other suitable portion of a wall that an operator may not desire to have painted or may desire to paint in an alternate color (e.g., trim, molding, etc.).

As may be understood in light of the above, a user may place a local positioning marker in a first corner 712 of the doorway 710 and activate the local position marker to transmit its location to the system. The user may then place the local positioning marker in an opposing corner 214 of the door 710 and activate the local position marker to transmit the second location 214 to the system. The system may then be configured to reconstruct a rectangle that defines the doorway 710, and store the reconstructed rectangle as an exclusion zone for painting purposes. Similarly, the user may repeat the steps above for the window 720, by using the local position marker on two opposing corners 722, 724 of the window 720.

Returning to FIG. 6, at Step 635, the system is configured to determine whether the reconstructed rectangle is within a threshold for a particular wall (e.g., the entire area of the rectangle is within an area defined by the virtual wall). In response to determining that the rectangle is within the threshold for a particular wall, the system continues to Step 640 where the system projects the rectangle onto to particular wall in the virtual representation of the room, and stores the rectangle as an exclusion zone for the particular wall at Step 645. In response to determining that the rectangle is not within the threshold for the particular wall, the system rejects the received position pair (e.g., the first and second positions) at Step 650.

The system may then repeat this process for any additional exclusion zones and use the computer controller to generate a virtual model of the walls of the room, including portions of each wall that should not be painted (e.g., including each identified exclusion zone), based on the local positioning system beacons and markers.

After building a virtual model of a particular rom, the system is configured to generate a painting plan to substantially evenly paint all of the surfaces of the particular room with the exception of the identified exclusion zones. The system may, for example: (1) use a planning algorithm to break each wall of the room into a particular number of swaths (e.g., a particular number of discrete vertical swaths of paint having a particular width); (2) determine an initial relative position and orientation of the paint robot relative to a first wall using a fiducial marker (e.g., which will be discussed more fully below); and (3) generate a queue of actions to take in order to paint each wall from the initial position. The queue of actions may include, for example, one or more actions related to causing the spray tip to spray paint along the vertical swath, causing the paint robot 100 to travel a particular distance along the wall, causing the paint robot 100 to execute a corner painting (e.g., as discussed below), executing one or more movements in order to complete painting of a ceiling, etc.

Figure 8:
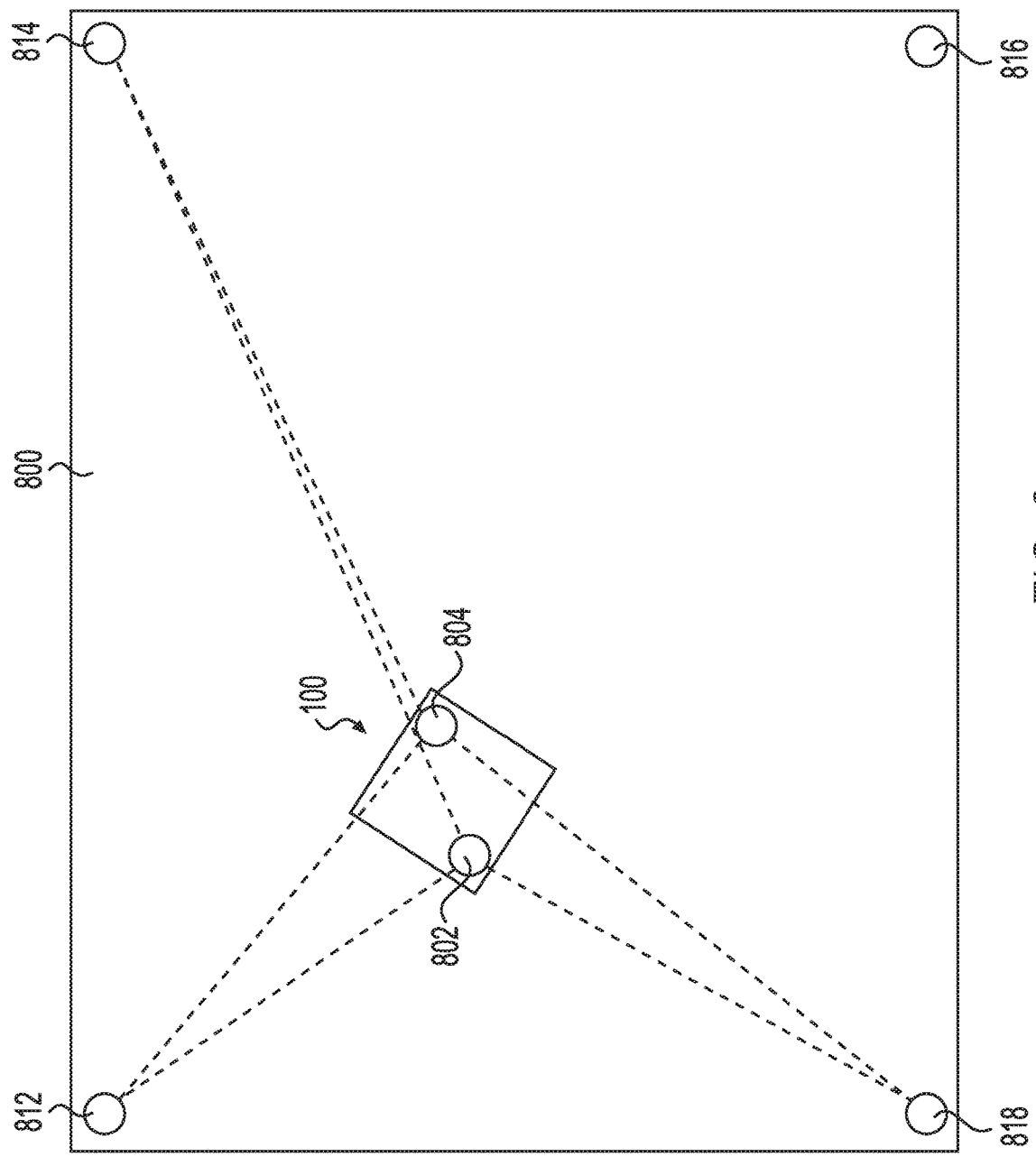
FIG. 8 depicts an exemplary overhead view of a local positioning system according to a particular embodiment.

FIG. 8 depicts a top view of a paint robot 100 within a room. As shown in this figure, the room comprises a plurality of beacons 812, 814, 816, 818 disposed in each respective corner of the room. As may be further understood from this figure, the robot 100 comprises one or more beacons 802, 808. In particular embodiments, the system is configured to determine the initial relative position and orientation of the paint robot (e.g., and/or a substantially continuous relative position of the paint robot within the room) based on a relative position of any of the one or more beacons 802, 804 relative to the plurality of beacons disposed about the room.

Figure 9:
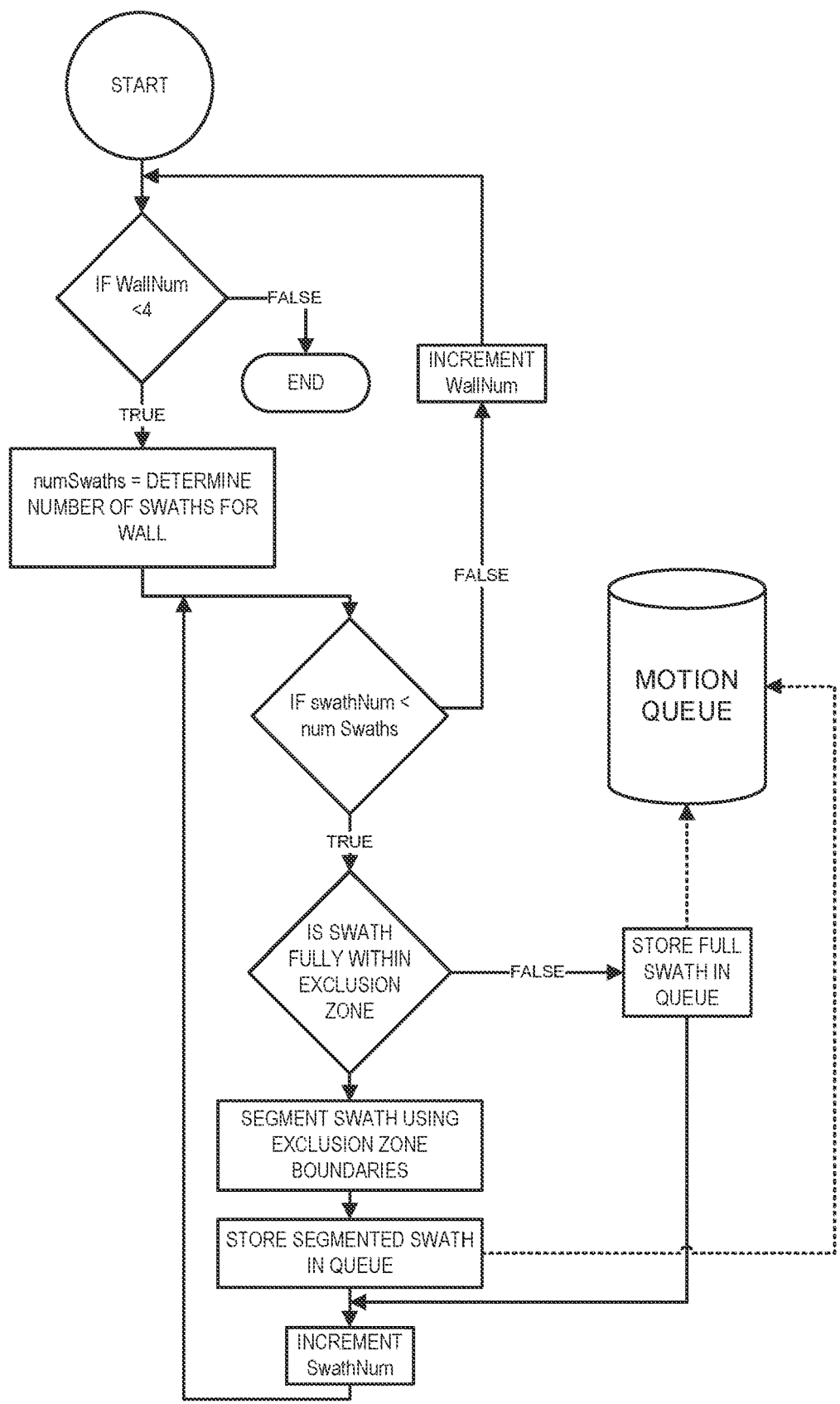
FIG. 9-12 are exemplary processes that the robot control and planning system 300 may execute to implement various functionalities of the autonomous mobile paint robot.

FIG. 9 depicts an exemplary process that the system may utilize for generating a motion queue for the paint robot 100 to execute to complete painting of the room. As may be understood from this figure, the system is configured to initially divide the wall into a number of vertical swaths based, for example, on spraying characteristics of the spray tip and paint robot 100. These spraying characteristics may, for example, determine a swath width for a particular paint robot 100 equipped with a particular spray tip. As a particular example, the system may determine that a twelve foot wall comprises twenty four six inch wide swaths. In some embodiments, when the system is dividing the room into swaths, the system may account for some overlap in each swath, which may, for example, prevent a soft edge between particular swaths. This overlap may be, for example, up to one quarter of an inch, or any other width necessary to substantially prevent a soft edge. In other embodiments, the system is configured to account for an overlap of up to 50% between particular swaths (e.g., such that each swath overlaps an adjoining swath by up to about 50%). In some embodiments, the system may, for example, divide a particular wall into swaths based on a swath overlap of up to any suitable amount of overlap (e.g., up to 80%, up to about 60% up to about 40%, up to about 20%, or any other suitable overlap). In particular embodiments, the percentage of overlap is defined by a percentage of the total width of a swath that is overlapped by a subsequently painted swath.

The system may then identify, for each swath, whether the swath is at least partially within an exclusion zone. In response to determining that the swath is fully within an exclusion zone, the system may segment the swath (e.g., include an instruction for the paint robot 100 not to spray paint along the portion of the swath that comprises the exclusion zone). In this way, the system may determine and store a series of vertical swaths that the paint robot 100 can execute along the wall. Each individual swath may comprise a plurality of exclusion zones, no exclusion zones, one exclusion zone, etc. In particular embodiments, a particular exclusion zone may comprise a particular type of exclusion zone. For example: (1) a first type of exclusion zone may include an exclusion zone comprising a void (e.g., a doorway); and (2) a second type of exclusion zone may include a feature such as, for example, a window. In particular embodiments, the system is configured to avoid the first type of exclusion zone completely when spraying (e.g., so the paint robot 100 doesn't spray paint through the door). In some embodiments, the system may be configured to allow the paint robot to spray slightly into the second type of exclusion zone (e.g., because the window may be taped and/or at least partially covered in plastic). In this way, the system may be configured to cause the paint robot 100 to cut in to the window (e.g., to create a crisp, clean line along the window molding), while saving a majority of the paint that would otherwise be sprayed onto the plastic and discarded.

Paint Robot Positioning System

Figure 10:
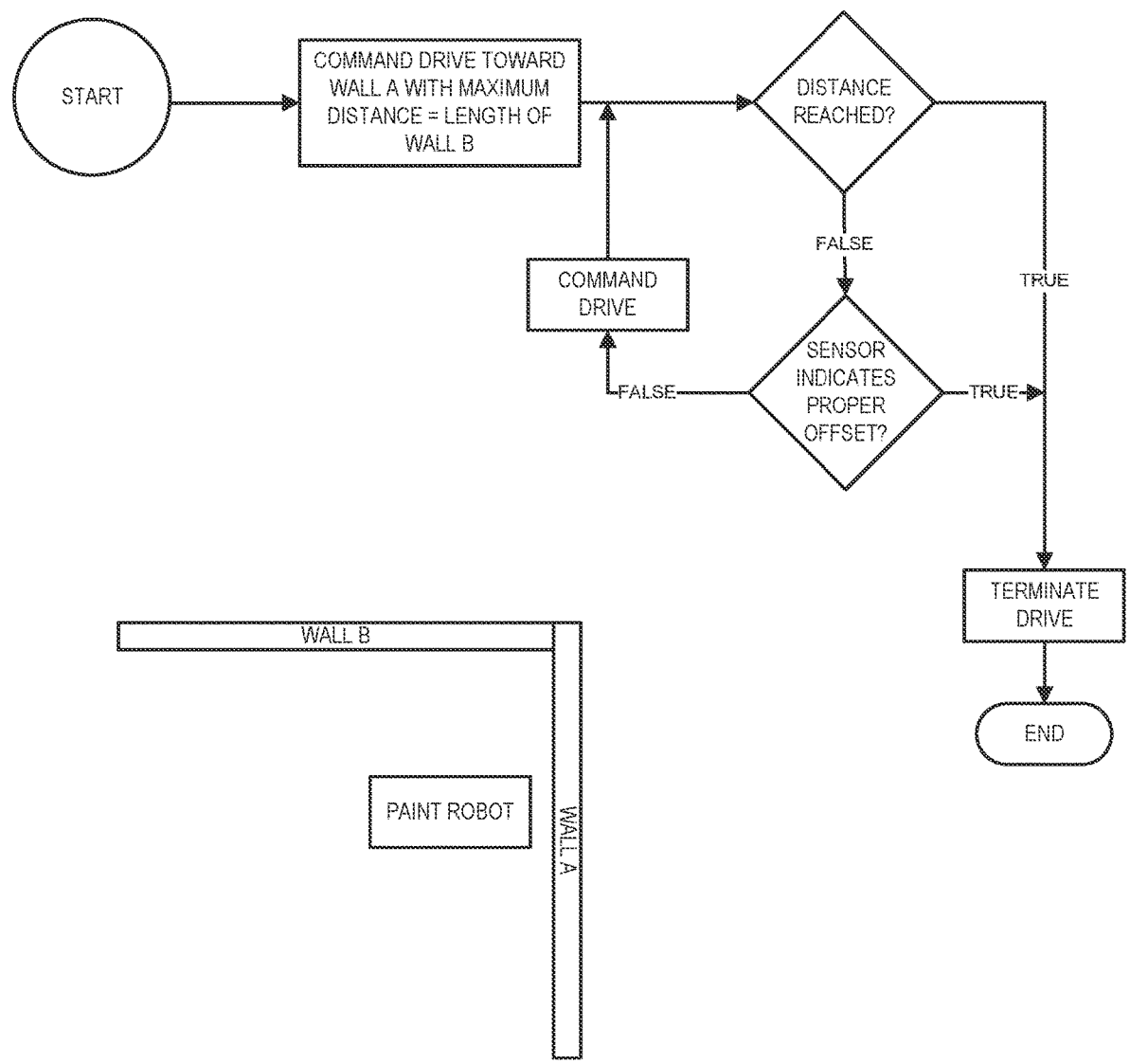

After completing the room mapping and planning process described immediately above, the system is configured to position the paint robot 100 in an initial position to paint the room. FIG. 10 depicts an example process for positioning the paint robot 100 against a first wall for painting. As may be understood from this figure, the system is configured to: (1) command the paint robot to drive towards the first wall; (2) determine whether the paint robot 100 has reached the first wall; and (3) terminate the drive command in response to determining that the paint robot 100 has reached the first wall. The system may be configured to determine that the paint robot has reached the first wall using, for example: (1) one or more limit switches; (2) one or more IR sensors; (3) the Vision System described below; and/or (4) any other suitable technique.

Figure 11:
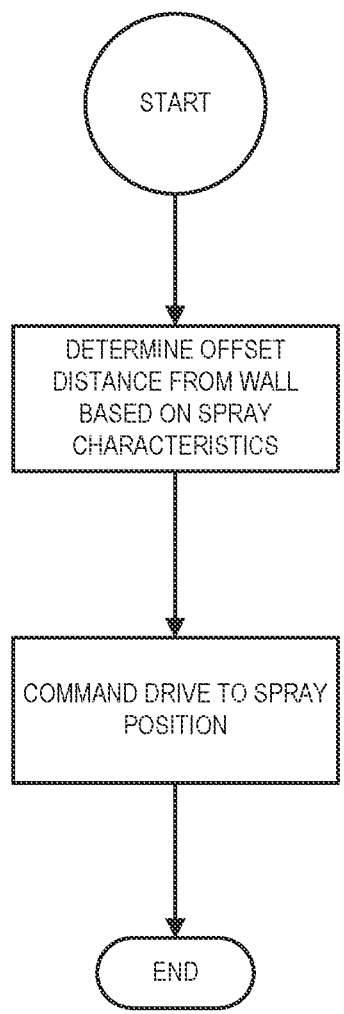

Once the paint robot 100 is positioned against the wall, the system is configured to position the paint robot away from the wall at a suitable distance for painting the vertical swaths. The suitable distance may be based on, for example, one or more spray characteristics of the paint robot 100, the environment, the paint or other liquid being sprayed, etc. These may include, for example: (1) swath width; (2) spray pressure; (3) paint viscosity; (4) room temperature; (5) etc. FIG. 11 depicts an exemplary process for positioning the paint robot relative to the wall in the proper spray position. As may be understood from this figure, the system may, for example: (1) determine a suitable offset distance based at least in part on one or more spray characteristics; and (2) command the paint robot 100 to drive to the spray position (e.g., a position based on the offset distance) using any suitable technique, such as any technique described herein.

Swatch Spraying System

Figure 12:
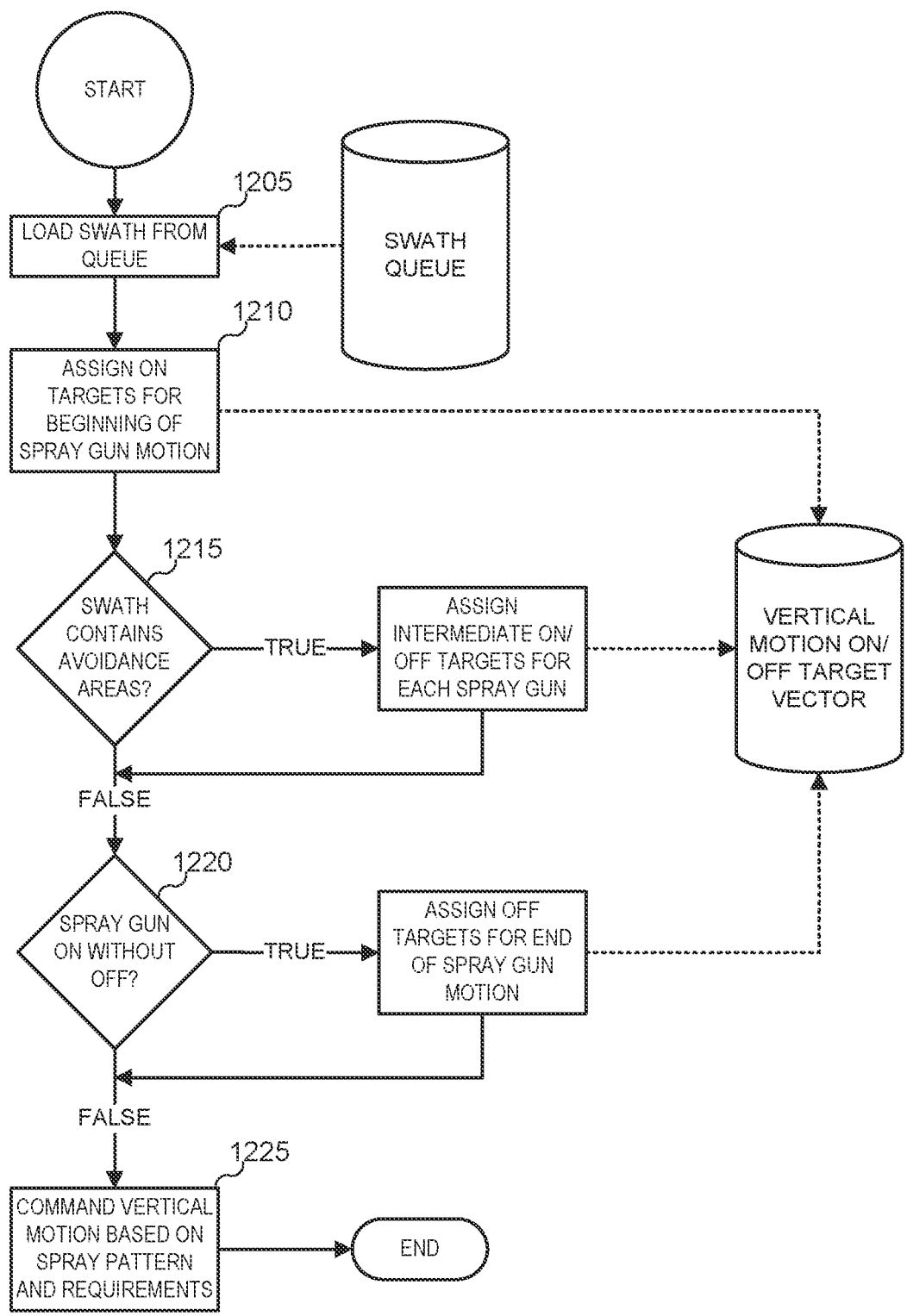

Once the paint robot is in the initial painting position, the system is configured to begin initiating painting of the room (e.g., each individual wall in the room) by systematically completing the stack of moves generated in the queue of moves described above (e.g., by painting each individual determined swath). FIG. 12 depicts an exemplary process for painting each individual swath of paint. As may be understood from this figure, when painting a swath of paint, the system begins, at Step 1205, by loading a swath from the queue (e.g., the queue described above). The system may load the swath from any suitable location (e.g., memory onboard the paint robot 100, the one or more databases 140, or any other suitable location). The system then continues at Step 1210 by assigning an on target for beginning of the motion of the spray tip 156. The on target may include the initial starting position of the spray tip 156 in order to paint the swath (e.g., the base or top of the wall).

Continuing to Step 1215, the system determines whether the swath contains any avoidance areas (e.g., one or more exclusions zones) and assigns intermediate on/off target locations for the spray tip (e.g., one or more spray tips) along the vertical swath if necessary. The system then determines, at Step 1220, an off target for the motion of the spray tip, and commands vertical motion of the spray tip at Step 1225. The vertical motion may be determined, for example, based on one or more spray characteristics (e.g., a desired mil thickness, wet film thickness etc.). In various embodiments, the vertical motion includes a particular speed of movement of the spray tip along the vertical swath while applying the paint (e.g., in order to achieve a desired transfer rate). In particular embodiments, commanding vertical motion of the spray tip comprises causing the paint robot 100 to cause the first vertical support 152 to slide or translate relative to the second vertical support 154 (e.g., using a suitable motor, gear, etc.). In other embodiment commanding vertical motion of the spray tip comprises causing the spray tip to slide and/or translate relative to the first and/or second vertical support 154.

Driving and Vision System

In various embodiments, the system comprises a Vision System for identifying a relative position of the paint robot 100 in a room, a position of the paint robot 100 relative to a wall, or any other suitable purpose. In some embodiments, the vision system comprises: (1) at least one camera or other imaging device (e.g., light detection and ranging sensor such as LIDAR, etc.); and (2) at least one fiducial marker or target. The fiducial marker may include any object or image suitable for use as a reference point (e.g., concentric circles or other shapes, machine-readable indicia such as a QR code, etc.). In such embodiments, a user may place the fiducial marker in a particular location of a wall that is desired to be painted (e.g., along an edge or a corner of the wall). The user may then place the paint robot 100 within the room with the wall. The vision system may then be configured to: (1) capture at least one image with the at least one camera; (2) identify the fiducial marker in that at least one image; and (3) determine a relative position and orientation of the paint robot to the wall based on the identified fiducial marker.

Figure 13:
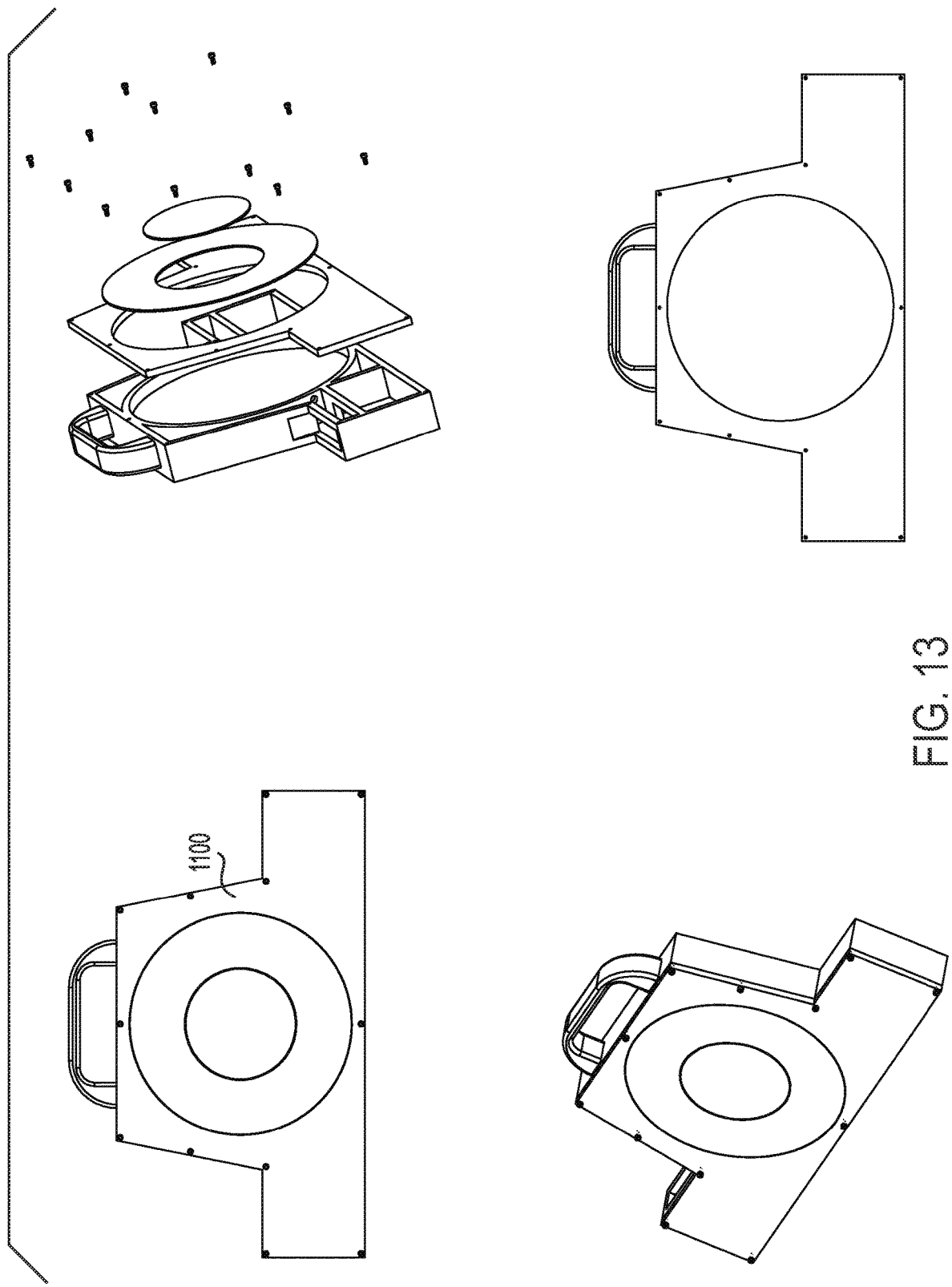
FIG. 13 depicts an exemplary fiducial that the system may utilize as part of the Vision System according to a particular embodiment.

FIG. 13 depicts an exemplary fiducial marker 1100. In the embodiment shown in this figure, the fiducial marker 1100 comprises one or more concentric circles. In particular embodiments, the ridicule marker comprises one or more lighting features (e.g., lights) configured to highlight the concentric circles. In particular embodiments, a user may place the fiducial marker 1100 in a particular location (e.g., using a bracket of a known length) such that when the paint robot 100 identifies the fiducial marker, it will be able to accurately determine its relative location and orientation.

Figure 14:
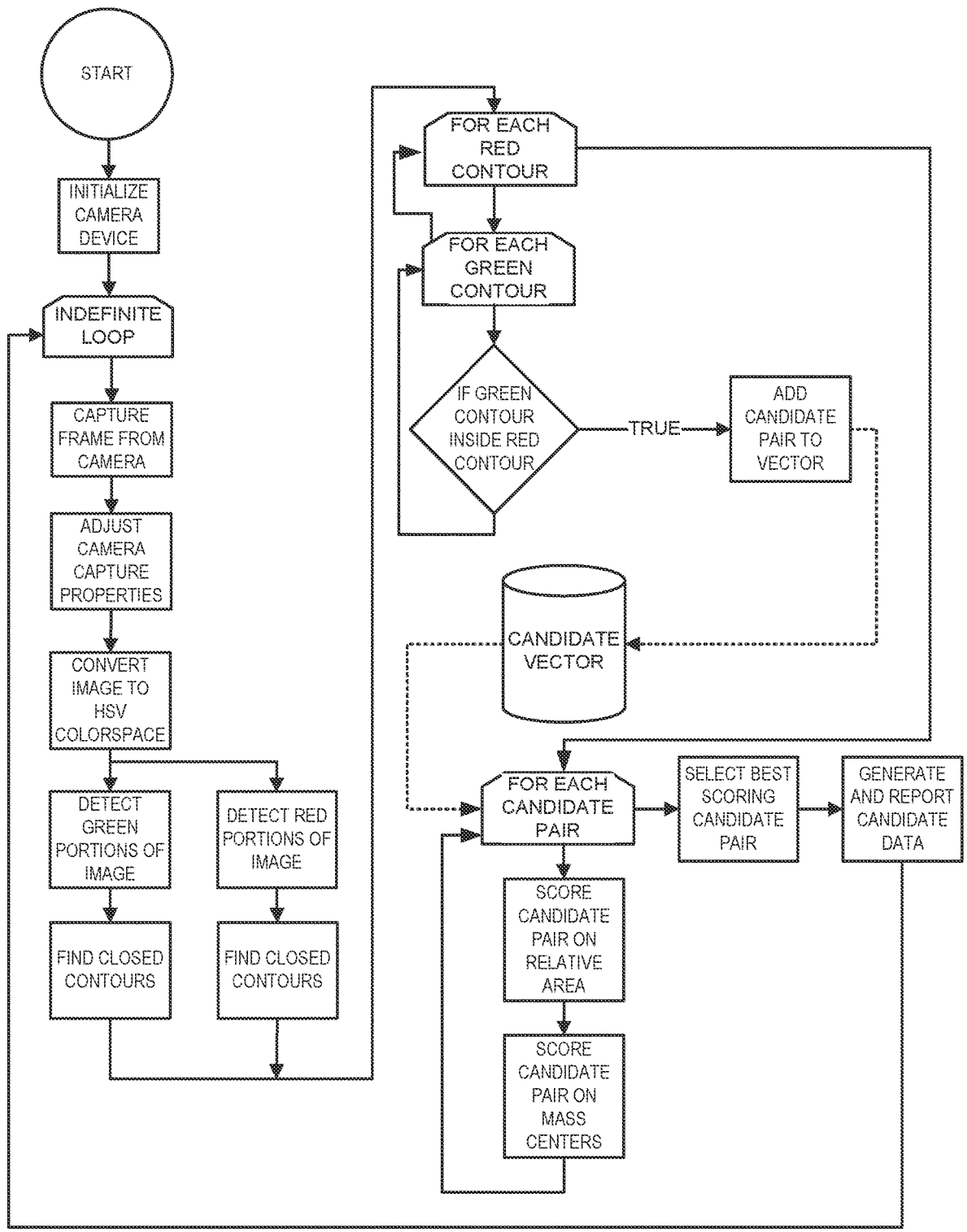
FIGS. 14-19 are further exemplary processes that the robot control and planning system 300 may execute to implement various other functionalities of the autonomous mobile paint robot.

FIG. 14 depicts an exemplary process for measuring a position and orientation of the fiducial marker relative to the paint robot 100 (e.g., relative to an imaging device or camera on the paint robot 100). In the example shown in this figure, the process refers to a fiducial marker (e.g., such as the fiducial marker shown in FIG. 13) having red and green concentric circles. The system may utilize data gleaned from analysis of an image comprising the fiducial marker to determine a relative position and orientation of the paint robot 100 within the room.

As such, when the system is operating the paint robot 100 to drive from a first location to a second location, the system may, for example, utilize the vision system (e.g., and the relative position and orientation of the paint robot determined from the one or more images of the fiducial) to determine whether the paint robot has accurately travelled to a suitable location. For example, because of factors such as friction, uneven support surfaces (e.g., non-flat floors), and other factors, the paint robot may travel a distance and/or direction other than a desired distance and/or direction (e.g., a desired distance based on power input from each of the one or more wheels, etc.). This may occur, for example, while the paint robot is travelling a swath distance along a particular wall between painting particular swaths. In such embodiments, the system is configured to utilized information determined using the vision system to make adjustments to the movement of the paint robot 100 and place the paint robot in a suitable position to execute the next move in a queue of actions.

Figure 15:
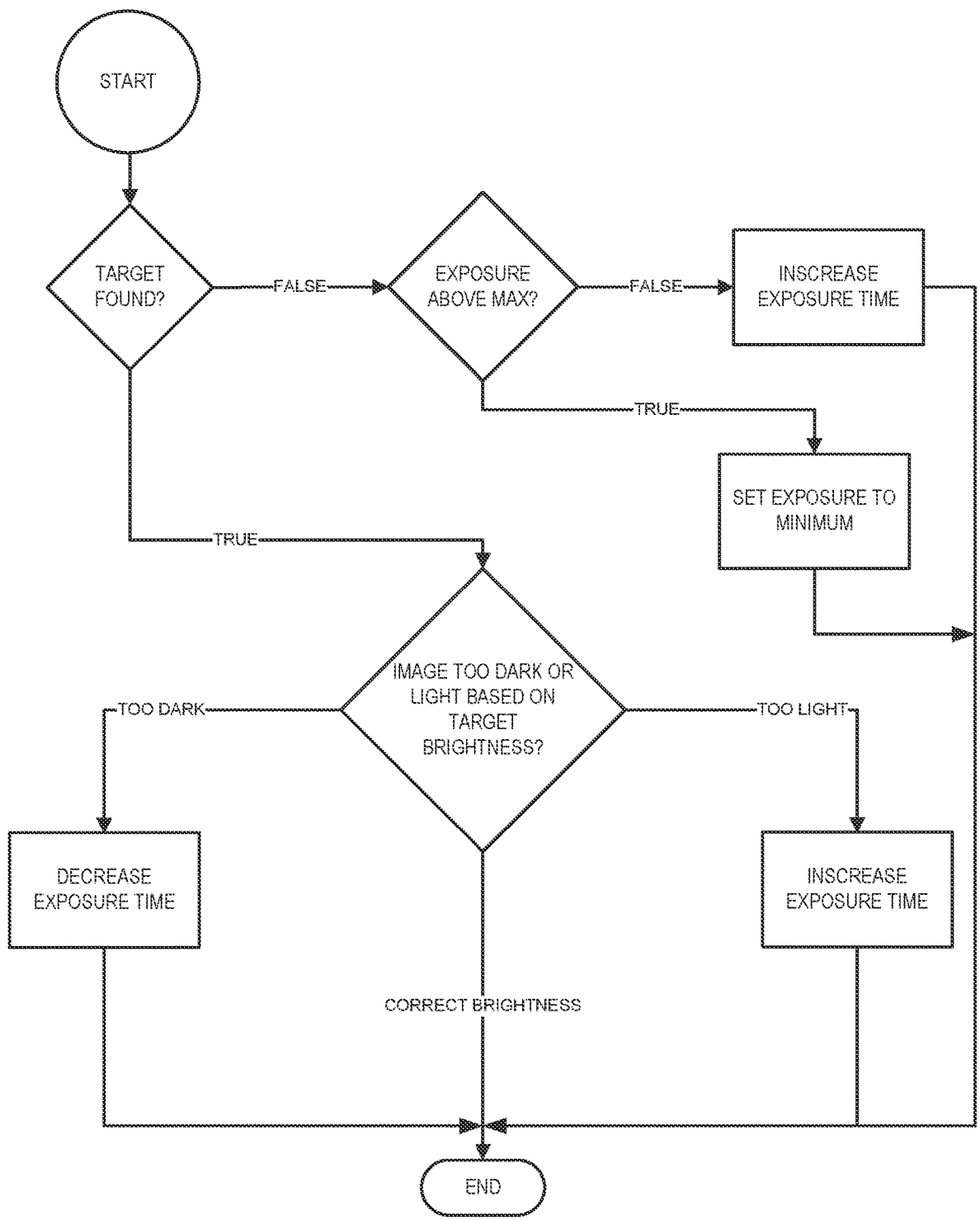

FIG. 15 depicts an exemplary process that the system may utilize, for example, in low light or overly bright environments in which the system cannot identify a fiducial marker in one or more taken images. In implementing this process, the system may, for example, take one or more additional images with different camera settings to account for ambient light conditions.

In other embodiments, the driving system further comprises one or more gyroscopes, one or more magnetometers, and any other suitable sensor that the system may utilize to ensure accurate translation of the paint robot 100 across the support surface.

Corner Painting System

Figure 16:
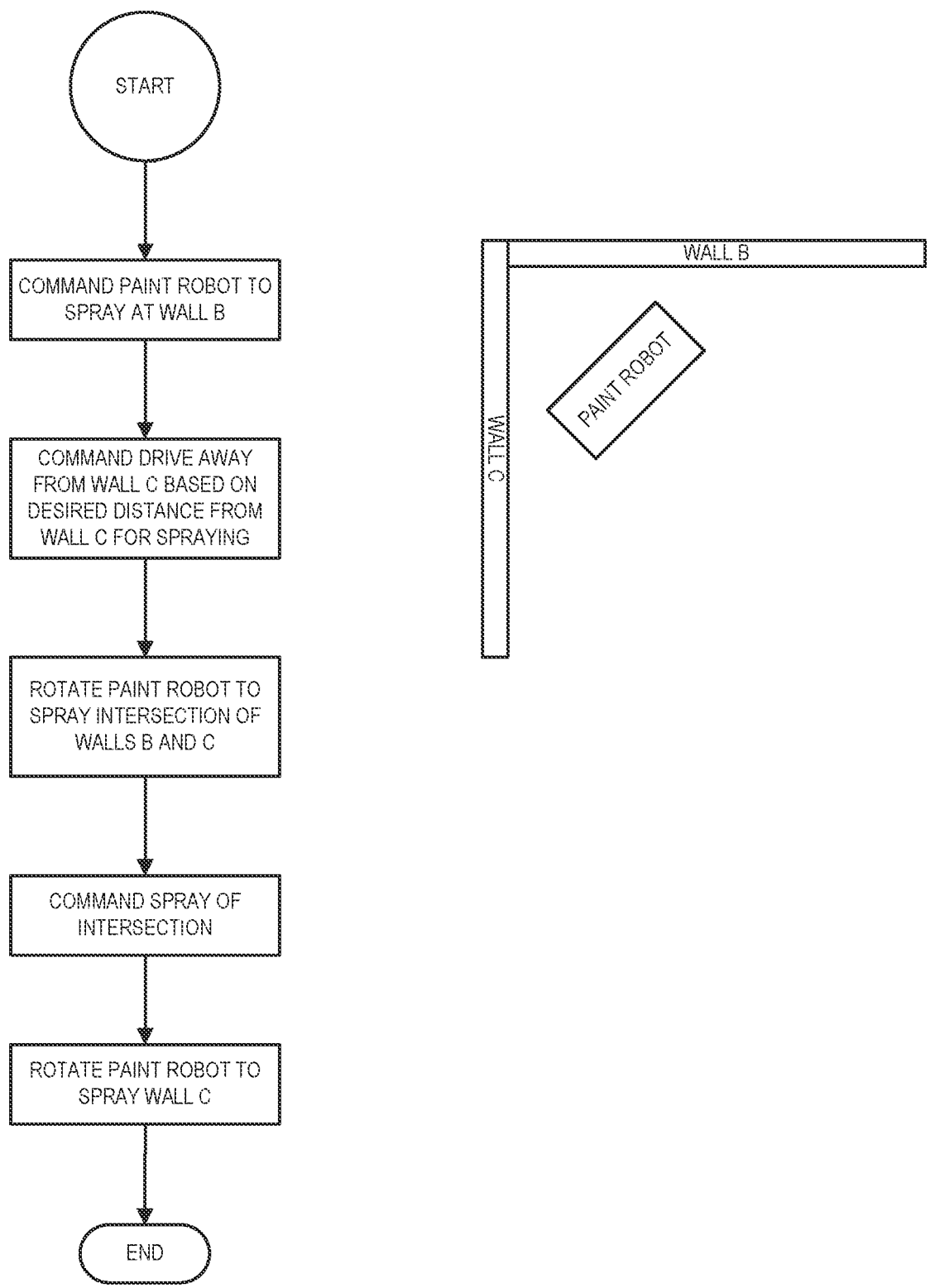

FIG. 16 depicts an exemplary process that the system may utilize to paint an intersection between two walls (e.g., a corner). In the exemplary process flow shown in this figure, the paint robot 100 has just completed painting wall B and is transitioning to painting wall C. As may be understood from this process flow, in order to paint the intersection (e.g., corner) between walls B and C, the system causes the paint robot to: (1) position the paint robot in a location that is a desired paint distance from both wall B and wall C; (2) rotates the paint robot 100 such that the paint sprayer is pointed in a direction that is about forty-five degrees from both wall B and Wall C; and (3) commands the paint robot 100 to spray a swath along the intersection. The system then completes another forty five degree turn such that the paint robot is facing wall C, and initiates the painting process for wall C. In some embodiments, the system is configured to rotate the paint robot any other suitable distance while transitioning between wall b and c. For example, the system may be configured to rotate in thirty degree increments, in ten degree increments, in fifteen degree increments, or any other suitable increment to ensure that the paint robot 100 can evenly apply paint to the corner and/or intersection.

Ceiling Painting System

Figure 17:
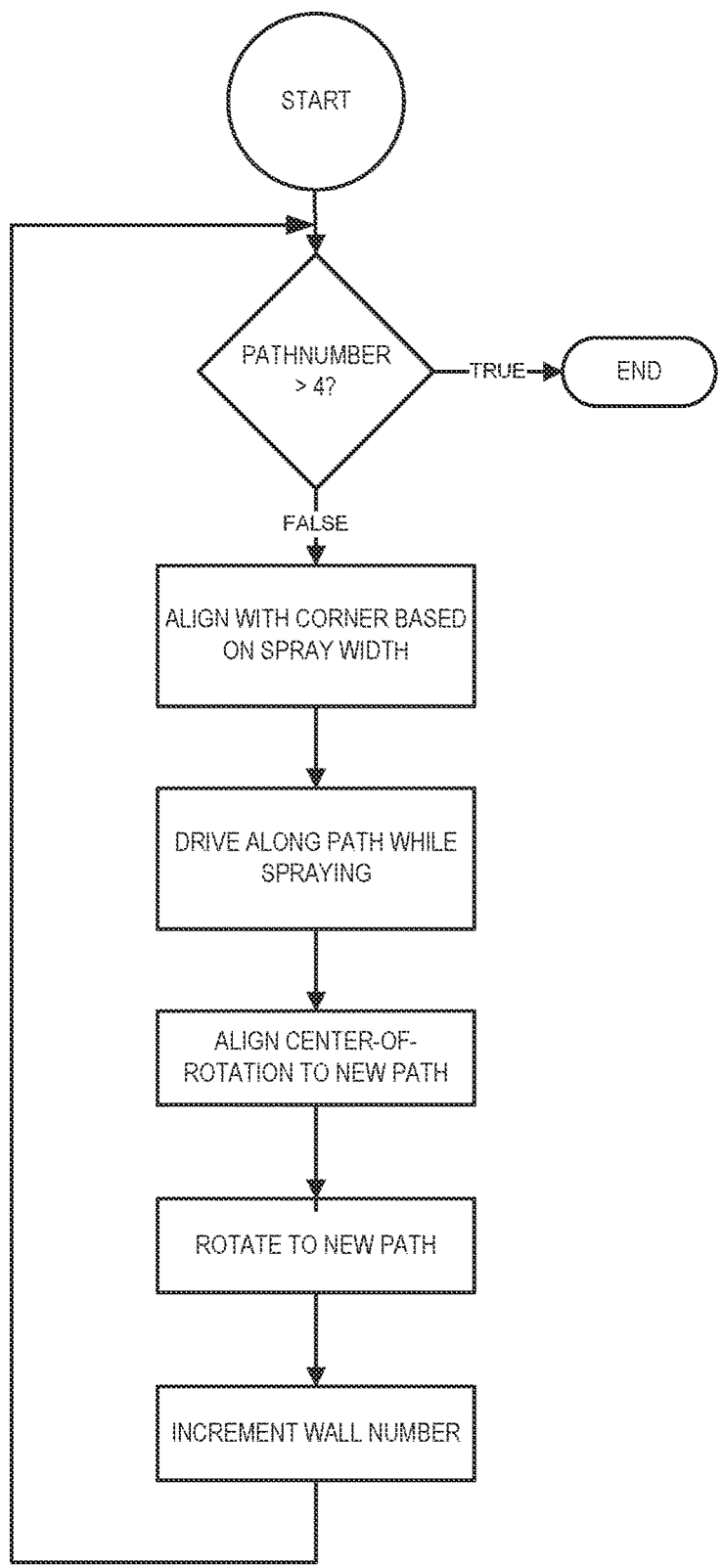
Figure 18:
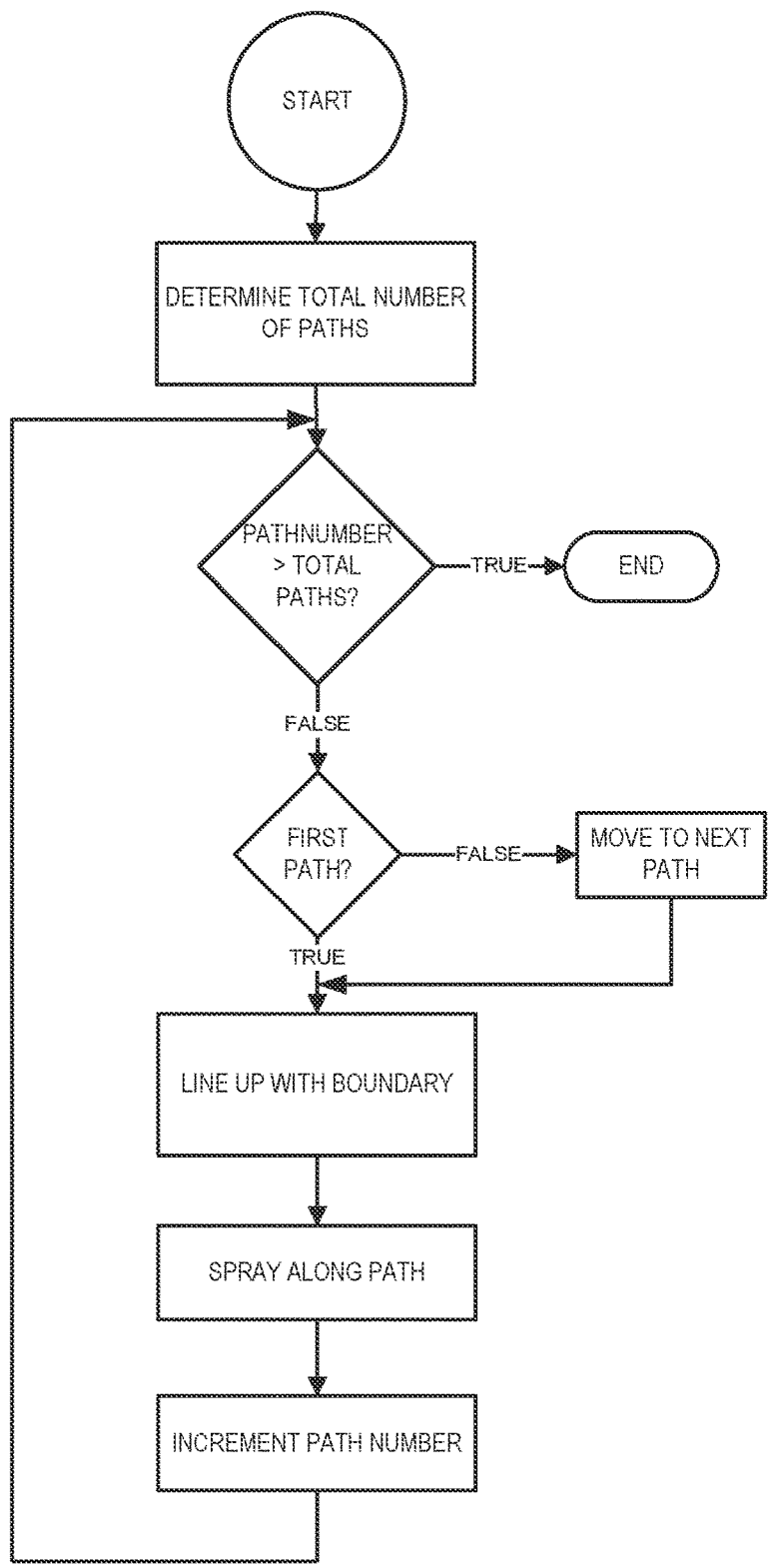

FIGS. 17 and 18 depict exemplary processes for painting a ceiling using the paint robot. As may be understood form FIGS. 17 and 18, the system may first cause the paint robot to paint a border of the ceiling, and subsequently paint individual swaths along the ceiling within the painted border. In particular embodiments, in order to paint the ceiling the spray tip 156 is configured to angle upwards by about ninety degrees (e.g., ninety degrees) such that the spray tip 156 directs paint vertically upward toward a ceiling (e.g., as opposed to horizontally toward a wall).

As shown in FIG. 18, the system, first determines a total number of paths (e.g., based on one or more spray characteristics). The system may then incrementally paint each particular swath along the ceiling. When the paint robot 100 reaches the end of a particular swath, the system may, for example: (1) turn the paint robot 90 degrees; (2) drive forward one swath width; (3) turn the paint robot an additional ninety degrees; and (4) cause the paint robot to paint the next swath. In various embodiments, the system is configured to use the vision system or other suitable system to ensure that the paint robot is suitably positioned to paint each subsequent swath (e.g., so that the boundaries of each swath meet or at least partially overlap).

Paint Spray Optimization and Pressure Management System

In various embodiments, the system is configured to substantially optimize an amount of paint that is transferred from the at least one paint container 132 to the surface being painted (e.g., one or more particular walls). In such embodiments, the system is configured to achieve a paint transfer rate of at least about 60%. In other embodiments, the system is configured to achieve a paint transfer rate of at least about 80%. In still other embodiments, the system is configured to achieve a paint transfer rate of at least about 90% (e.g., at least about 95%). In particular embodiments, the paint transfer rate may relate to one or more losses of paint due to, for example, overspray, paint loss in the air, etc.

In particular embodiments, the system is configured to achieve a particular mil thickness (e.g., pre-defined mil thickness) when applying paint to a particular surface. In various embodiments, the particular mil thickness may at least partially correspond to (e.g., correspond to) a wet film thickness of a particular fluid (e.g., paint) on the particular surface (e.g., wall). In various embodiments, the system is configured to automatically modify one or more aspects of the spraying system in order to at least partially account for one or more environmental, medium, or other changes that may affect the consistent application of the liquid substance (e.g., paint) to the target surface.

For example, in various embodiments, the system is configured to increase the pressure (e.g., by operating the at least one pump to increase a pressure of spray through the spray tip) as the viscosity of the particular fluid (e.g., paint) increases. The system may, for example, comprise a viscosity sensor that is configured to measure a viscosity of the paint being applied to the particular surface (e.g., wall). The viscosity sensor may, for example, be at least partially disposed within the at least one paint container 132 such that the viscosity sensor is disposed in a location suitable for measuring the viscosity of a suitable liquid stored in the at least one paint container 132 (e.g., paint). In particular embodiments, the system may adjust the spray pressure with which the paint robot 100 applies the paint to the particular surface via the spray tip 156 in response to measuring one or more changes to the viscosity of the paint. The system may, for example, increase (e.g., or decrease) the pressure in response to measuring an increase in paint viscosity. In some embodiments, the change in pressure may be at least partially proportional (e.g., proportional) to the change in viscosity.

In particular other embodiments, the system may modify the pressure utilized to apply the paint to the particular surface based at least in part on one or more other factors such as, for example: (1) a temperature of the room being painted; (2) a pressure at which the fluid (e.g., paint) is being stored (e.g., in the at least one paint container 132); (3) a material transfer rate of the paint onto the particular surface (e.g., a speed of the spray tip relative to the mobile paint robot 100 as the spray tip applies paint to the particular surface while painting the vertical swath); (4) a distance of the paint robot 100 from the particular surface (e.g., wall); (5) a width of the particular swath; and/or (6) any other suitable characteristic of the spray tip, paint robot 100, or environment.

In various embodiments, the paint robot may, for example, comprise: (1) a temperature gauge configured for measuring a temperature in a room being painted; (2) a non-contact wet film thickness gauge; (3) an IR sensor, at least one imaging device, or other suitable device for measuring a distance between the paint robot 100 and the surface being painted (e.g., a wall; and/or (4) any other suitable sensor or measuring device for measuring one or more factors related to the viscosity or other characteristic of paint (e.g., or other liquid) being applied to the surface that may affect the wet film thickness of paint as it is applied to the surface. In such embodiments, the pump may be in a closed loop control system with the one or more sensors in order to substantially automatically (e.g., on-the-fly) adjust a pressure of the sprayed liquid (e.g., paint).

In some embodiments, the system is configured to determine viscosity of the paint based at least in part on, for example: (1) power usage of the at least one pump's at least one motor; (2) one or more cycles of the at least one pump; (3) an orifice size and shape of the spray tip; and/or (4) any other suitable factor for determining a material transfer rate of the paint.

In various embodiments, the paint robot 100 comprises at least one stirring mechanism disposed at least partially within the at least one paint container 132. In some embodiments, the at least one stirring mechanism is configured to mix paint (e.g., or other fluids) stored within the at least one paint container 132. The system may, for example, cause the at least one stirring mechanism to operate to stir the paint in response to measuring a change in viscosity of the paint.

Line Following System

Various embodiments of a paint robot 100 may utilize one or more line following techniques in order to ensure substantially accurate application of paint to a wall or other surface. For example, the system may be configured follow a line such as a line of tape (e.g., painter's tape), string, or other suitable substance using any suitable infrared imaging techniques. In other embodiments, the system may be configured to use one or more imaging devices to identify and follow along the predefined line. For example, a user may lay down a line (e.g., such as a line of tape) along the edge of a wall, so that the paint robot 100 can follow the line along the wall and maintain a sufficiently consistent distance from the wall while moving along the wall to paint swaths. Similarly, a user may place a series of lines below a ceiling that they desire the paint robot to paint. In such embodiments, the system may be configured to adjust a driving path of the paint robot based on one or more detected deviations from the line.

Figure 19:
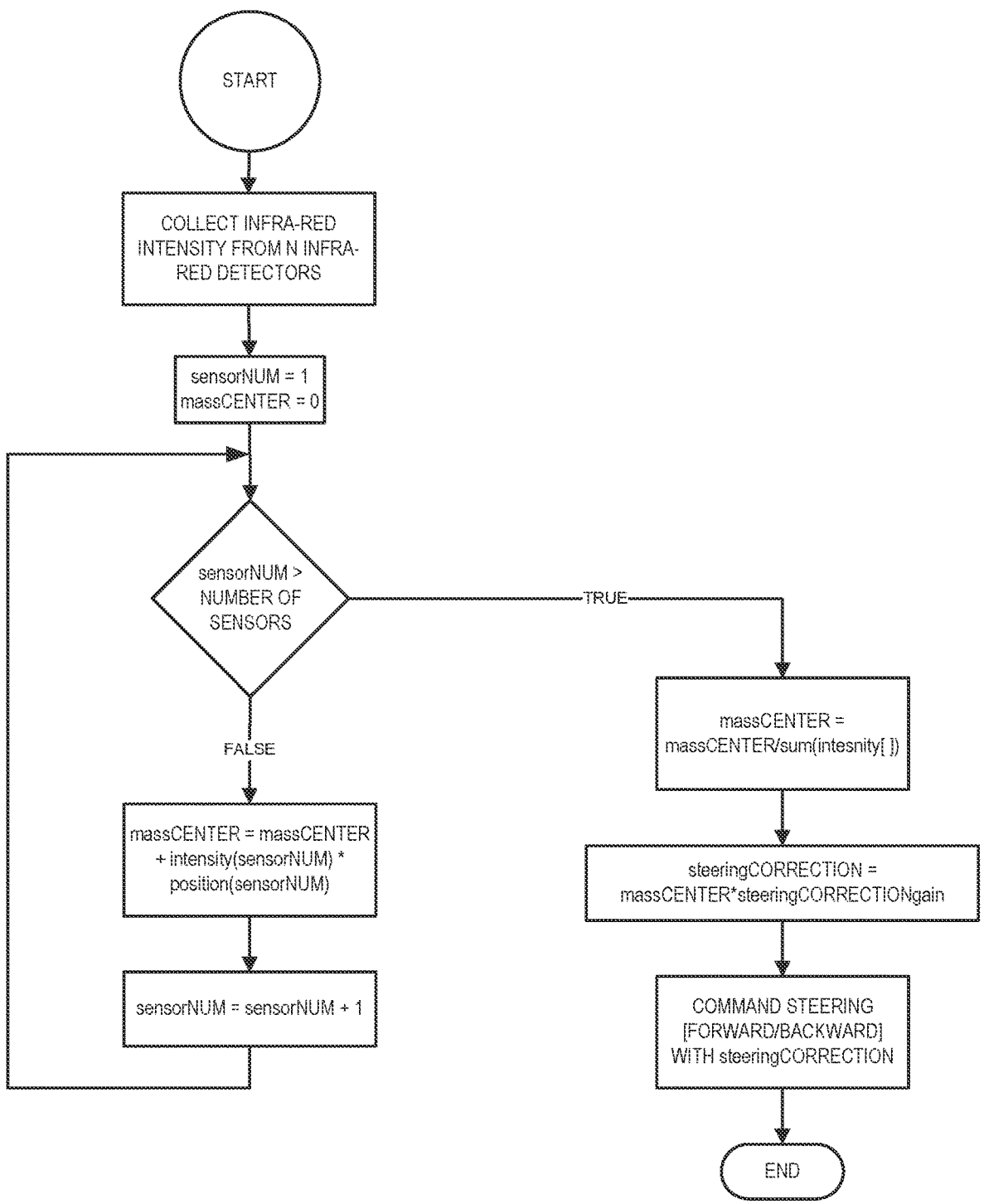

FIG. 19 depicts an exemplary process which the system may utilize to implement one or more line-following techniques. In the embodiments shown in this figure, the system is configured to utilize one or more infra-red techniques to follow one or more particular lines. As may be understood from these figures, the system is configured to correct steering of the paint robot 100 based at least in part on one or more deviations from a line (e.g., deviation from a center of mass of the line, detection of the line at an angle to the robot, etc.).

Alternative Control Systems

In various embodiments, the paint robot 100 includes one or more sensors configured to sense a position of the paint robot (e.g., relative to a wall, within a room, relative to a completed vertical paint swath, etc.). In various embodiments, the paint robot 100 may receive information (e.g., distance information, etc.) from one or more sensors (e.g., one or more LIDAR, one or more imaging devices, one or more infrared sensors, etc.). As may be understood by one skilled in the art, sprayed particles (e.g., as a result of overspray, etc.) may impact the efficacy, accuracy, etc. of various sensors utilized by the patent robot 100. For example, paint may accumulate on one or more sensors, which may affect the ability of the one or more sensors to make accurate readings (e.g., distance readings, etc.). As such, in various aspects, the paint robot 100 comprises one or more sensors that are selectively exposed during operations. For example, the one or more sensors may enter and/or exit a covered area of the paint robot 100, for example, using a suitable lifting mechanism. In other aspects, the one or more sensors may be disposed behind a suitable shielding or cover that is configured to be selectively opened and/or closed (e.g., rotated, lifted, opened, etc.). The cover may include any suitable mechanism for at least temporarily exposing the one or more sensors during use. In this way, the paint robot 100 may be configured to temporarily enclose the one or more sensors during a spraying operation of the paint robot 100, exposing the one or more sensors in order to take one or more sensor readings while the paint robot is not spraying (e.g., while traversing along a wall between painting vertical swaths, etc.). In some aspects, using a retractable/removable/etc. cover may be preferable to a static clear cover (e.g., such as glass or plastic), as the partially transparent cover may affect the accuracy of the one or more sensors when in place. In particular aspects, the one or more sensors may be fixed relative to the paint robot, with one or more covers being configured to move between: (1) a first position in which the one or more covers shield the one or more sensors from the exterior air (e.g., and paint spray); and (2) a second position in which the one or more covers do not interfere with the one or more sensors taking any required reading. In still other aspects, the paint robot may include a fixed shield or cover that the one or more sensors are configured to move into (e.g., behind) and out of during operation. In various embodiments, the one or more sensor shields may include a domed surface, flat surface, combination surfaces, etc. configured to cooperate to cover the one or more sensors to protect the one or more sensors from paint spray during operation of the one or more sprayers.

The paint robot may, for example: (1) paint a first vertical swath; (2) expose the one or more sensors to take one or more readings; (3) position the paint robot for a second vertical swath; and (4) prior to painting the second vertical swath, shielding the one or more sensors from the one or more sprayers (e.g., by moving at least one of the one or more sensors or the one or more sensor shields into a position such that the one or more sensors are not exposed to an exterior of the paint robot (e.g., to the air around the paint robot). In various aspects, the paint robot may move the at least one of the one or more sensors forth one or more sensor shields through operation of one or more motors, lifts, hatches, flaps, or other suitable mechanism for moving one component relative to another.

Multiple Spray Tips

In particular embodiments, the paint robot 100 comprises a plurality of spray tips (e.g., two spray tips) configured to travel along particular portions of the vertical supports. In such embodiments, each particular spray tip may be configured to paint a particular portion of the vertical swath (e.g., a first spray tip may paint an upper portion and a second spray tip may paint a lower portion, meeting in the middle). In other particular embodiments multiple spray tips may be supplied paint by one or more pumps and configured such that a larger area can be sprayed simultaneously with multiple tips.

Remote Control System

In particular embodiments, such as any embodiment described herein, the paint robot 100 is further configured to operate based at least in part on one or more user inputs (e.g., from an operator). In such embodiments, the system may comprise one or more control systems for enabling a user to provide one or more inputs related to the movement and/or operation of the paint robot 100. For example, the system may comprise: (1) one or more driving inputs configured to enable an operator to control the movement of the paint robot 100 (e.g., across a support surface); (2) one or more spraying inputs configured to enable the operator to control the spraying of paint by the paint robot 100 (e.g., including pressure, velocity, height, etc.); and/or (3) any other suitable input related to the control of any aspect of the paint robot.

In some embodiments, the system comprises a wired controller (e.g., a wired remote control). In other embodiments, the system comprises a wireless remote control in wireless communication with the paint robot 100 (e.g., in wireless communication with one or more computer controllers on the paint robot 100). In such embodiments, the wireless remote controller may transmit user inputs wirelessly to the paint robot 100 via any suitable wireless protocol (e.g., Bluetooth, zigbee, wireless LAN, NFC, etc.). In particular embodiments, when an operator is controlling the operation of the paint robot 100, the system is configured to use one or more suitable gating techniques to enable the operator to operate the paint robot 100 in a substantially straight path (e.g., along a wall). In such embodies, the system may artificially set one or more turning boundaries to prevent the operator from unintentionally nudging the paint robot 100 off of an intended path. In various embodiments, the system is configured to enable the user to turn gating on and/or off via the controller.

Paint Level Detection System

In particular embodiments, the autonomous painting system comprises a paint level detection system that is configured to monitor a level of paint being carried by the paint robot 100 (e.g., an amount of paint disposed within the at least one paint container 132 shown in FIGS. 1A and 1B). In particular embodiments, the paint level detection system may utilize any suitable technique to determine an amount of paint in the at least one paint container 132 (e.g., one or more ultrasonic sensors, one or more floats, one or more infrared monitors, one or more hydrostatic devices, one or more load cells, etc.).

In various embodiments, the system may comprise an alarm to alert a user to refill the paint while the paint robot 100 is painting a particular room. In particular embodiments, the system is configured to substantially automatically stop and/or pause operation of the paint robot 100 in response to determining that the paint robot 100 is low on or out of paint. In various embodiments, the system may be configured to substantially automatically determine a mass and/or weight of the paint robot 100 including the paint based on an amount of paint the paint robot is carrying. In this way, the system may be configured to modify one or more movement systems of the paint robot based on one or more determined changes in weight. For example, as the paint robot consumes the paint in the at least one container 132, the mass of the paint robot 100 may decrease. As the mass decreases, the system may be configured to cause the one or more wheels to use less power when causing the paint robot to travel a swath distance between painting vertical swaths (e.g., because the system may require less power to travel the swath distance as the paint robot gets lighter).

Cable Driven Robotic Painting Systems

A cable driven robotic painting system, according to various embodiments, is configured to control the movement of a paint robot (e.g., an autonomous paint robot, semi-autonomous paint robot, remote-controlled paint robot, or any other suitable paint robot) throughout a room to facilitate painting, by the paint robot, of: (1) one or more walls of the room; (2) a ceiling of the room; (3) trim in the room; (4) molding in the room; and/or (5) any other suitable portion of the room. In various embodiments, the paint robot may include any suitable paint robot, such as any suitable paint robot described herein.

Figure 20:
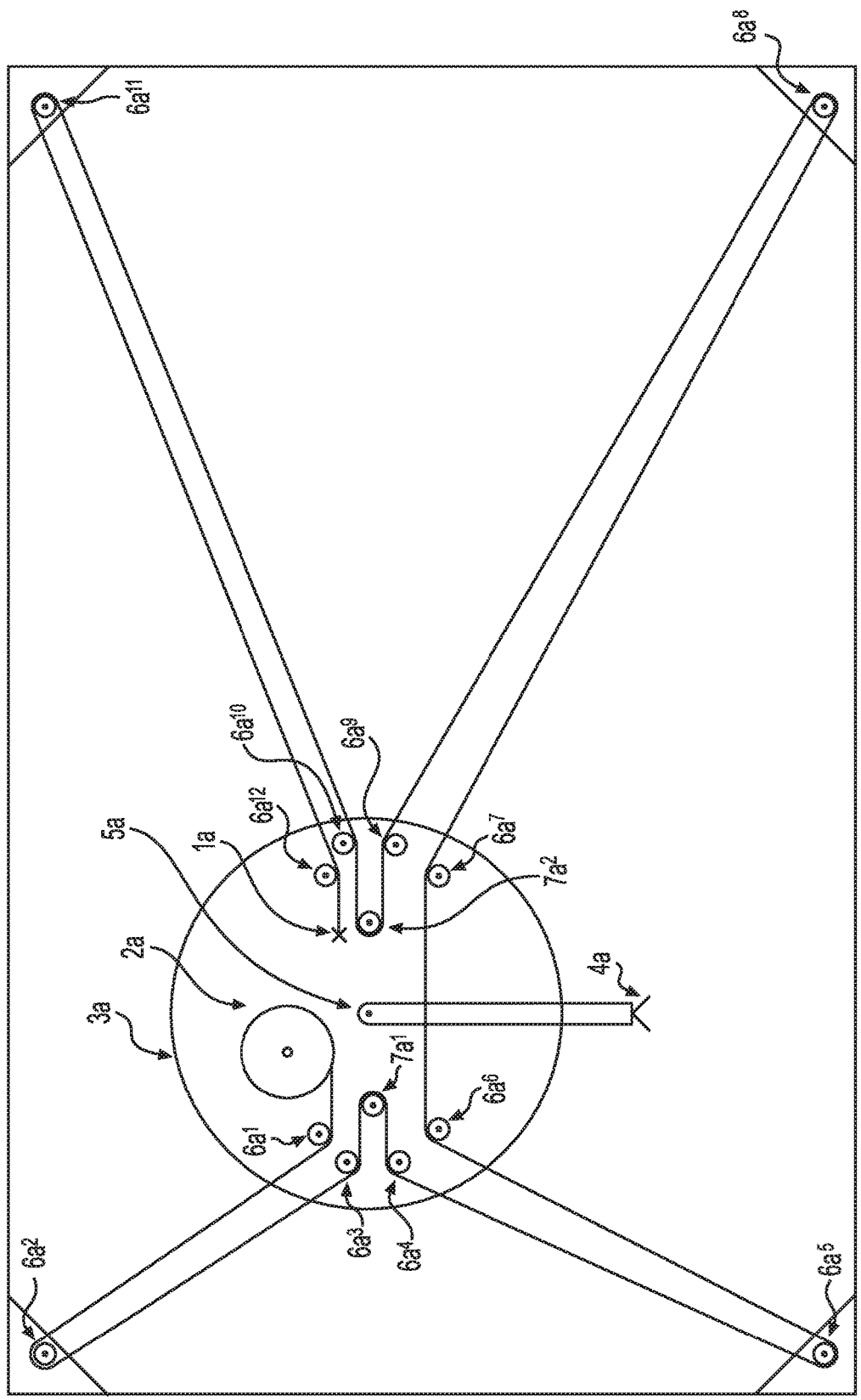
FIG. 20 is a top plan view of a cable driven robotic painting system according to a particular embodiment.

As may be understood from FIG. 20 (e.g., which includes an overhead plan view of a cable-driven paint robot within a room according to a particular embodiment), a cable driven robotic painting system, according to a particular embodiment, comprises: (1) a robot chassis 3A; (2) at least one motorized pulley 7A$^{1,2}$; (3) a robot mounted cable spool 2A; (4) one or more pulleys (e.g., 6A$^{1-12}$); (5) a rotary turret 5A; (6) a pole mounted paint sprayer 4A; and (7) one or more fixed cable mounts 1A. In other embodiments, the cable driven robotic paint system may include a fixed length of cable having two or more fixed cable mounts 1A (e.g., in certain embodiments that do not include a cable spool). In such embodiments, the fixed length may be based at least in part on a size of the room that the system is being utilized to paint.

In the embodiment shown in FIG. 20, the robot chassis 3A comprises: (1) a first and second motorized pulley 7A$^{1,2}$; (2) the robot mounted cable spool 2A; (3) eight pulleys (e.g., 6A$^{1,3,4,6,7,9,10,12}$); (4) the rotary turret 5A; (5) the pole mounted paint sprayer 4A; and (6) the fixed cable mount 1A. Although the robot chassis 3A in FIG. 20 is depicted as being substantially circular (e.g., circular), it should be understood in light of this disclosure that the robot chassis 3A may be any other suitable shape such as, for example: (1) substantially rectangular (e.g., rectangular); (2) substantially octagonal; and/or (3) any other suitable shape. An exemplary embodiment of a robot chassis is described more fully below with respect to FIG. 24.

In particular embodiments, the robot chassis 3A comprises one or more wheels (e.g., omni-directional wheels). In various embodiments, the one or more wheels are configured to support the robot chassis 3A adjacent a support surface (e.g., the ground, a suitable flooring surface within a building, etc.) and facilitate rolling movement of the robot chassis 3A across the support surface. In particular embodiments, the one or more wheels are substantially free-rolling. In other embodiments, at least one of the one or more wheels may be motorized. In particular embodiments, the one or more wheels comprise one or more Mecanum wheels, which are configured to move the robot chassis 3A over a support surface in any direction (e.g., in any direction relative to an orientation of any particular wheel). In various embodiments, the one or more Mecanum wheels each comprise a conventional wheel (e.g., a substantially circular wheel)

comprising a plurality of rollers disposed about its circumference (e.g., disposed such that an axis of rotation of each roller is 45 degrees to the plane of the wheel and at 45 degrees to a line through the center of the roller parallel to an axis of rotation of the wheel).

In still other embodiments, the one or more wheels comprise one or more omni wheels (e.g., one or more poly wheels) each comprising one or more discs disposed about its circumference which are perpendicular to the turning direction of the respective wheel. In such an embodiment, the robot chassis 3A may comprise one or more omni wheels having a plurality of rollers disposed at 90 degrees to the wheel (e.g., a Swedish wheel). In still other embodiments, the one or more wheels may comprise any other suitable type of wheel (e.g., one or more casters, one or more standard wheels, one or more omni wheels etc.).

In particular embodiments, the cable driven robotic painting system is configured to control movement of the robot chassis 3A across the support surface (e.g., while rolling on the one or more wheels) using a combination of: (1) the at least one motorized pulley (e.g., $7A^{1,2}$); (2) one or more robot mounted cable spools (e.g., 2A); (3) the one or more pulleys (e.g., $6A^{1,2}$); and (4) one or more fixed cable mounts (e.g., 1A). In the embodiment shown in FIG. 20, the cable driven robotic painting system is configured to control movement of the robot chassis 3A across the support surface using (1) the first and second motorized pulley $7A^{1,2}$; (2) the robot mounted cable spool 2A; (3) a system of twelve pulleys $6A^{1,2}$; and (4) the fixed cable mount 1A.

As may be understood from FIG. 20, a cable (e.g., a belt, chain, or other suitable flexible member) runs: (1) from the robot mounted cable spool 2A; (2) through a first pulley 6A' mounted on the robot chassis; (2) through a second pulley $6A^2$ at least temporarily mounted in a first corner of a room (3) through a third pulley $6A^3$ mounted on the robot chassis; (4) through a first motorized pulley 7A' mounted on the robot chassis; (5) through a fourth pulley $6A^4$ mounted on the robot chassis; (6) through a fifth pulley $6A^5$ at least temporarily mounted in a second corner of the room; (7) through a sixth pulley $6A^6$ mounted on the robot chassis; (8) through a seventh pulley $6A^7$ mounted on the robot chassis; (9) through an eighth pulley $6A^8$ at least temporarily mounted in a third corner of the room; (10) through a ninth pulley $6A^9$ mounted on the robot chassis; (11) through a second motorized pulley $7A^2$ mounted on the robot chassis; (12) through a tenth pulley $6A^{10}$ mounted on the robot chassis; (13) through an eleventh pulley $6A^{11}$ at least temporarily mounted in a fourth corner of the room; (14) through a twelfth pulley $6A^{12}$ mounted on the robot chassis; and (15) terminates at the fixed cable mount 1A.

In various embodiments, the fixed cable mount may include any suitable fastener or mount for maintaining an end of the cable adjacent the robot chassis at a fixed cable mounting point. In various embodiments, the second, fifth, eighth, and eleventh pulleys $6A^{2,5,8,11}$ are at least temporarily mounted to the four corners of the room in any suitable manner. For example, the pulleys may be at least temporarily mounted via one or more weighted bases that comprise the pulleys and are placed in the corner of the room (e.g., by a user). The weighted bases may, for example, be sufficiently heavy to maintain the pulleys adjacent their respective corner of the room while the cable driven robotic painting system is causing the robot chassis 3A to move about the room. In other embodiments, the pulleys may be at least temporarily mounted adjacent their respective corner via, for example: (1) one or more suitable vacuum cups; (2) one or more suitable fasteners; and/or (3) in any other suitable manner.

As may be understood from FIG. 20, based on the relative positions of the first and second motorized pulley $7A^{1,2}$, the robot mounted cable spool 2A, the system of twelve pulleys $6A^{1,2}$, and the fixed cable mount 1A, and their relationship to the continuous cable, the cable driven robotic painting system is configured to cause the robot chassis to move across the support surface by controlling operation of at least one of the first and second motorized pulleys $7A^{1,2}$ and/or the robot mounted cable spool 2A (e.g., by causing the first and/or second motorized pulley $7A^{1,2}$ to rotate in a clockwise and/or counter-clockwise direction, and/or causing the robot mounted cable spool 2A to wind or unwind the cable).

In various embodiments, the first and second motorized pulley $7A^{1,2}$ are configured to cooperate to control movement of the robot chassis 3A in any desired direction. As may be understood by FIG. 20, the cable may remain in tension at least partially due to the cable spooling and unspooling about the robot mounted cable spool 2A while the first and second motorized pulleys $7A^{1,2}$ cooperate to adjust the position of the robot chassis 3A within the room. In particular embodiments, a length of the cable may vary based at least in part on a size of the room being painted. As may be understood from FIG. 20, a rate of rotation of each of the motorized pulleys and relative direction of rotation of each pulley may affect a direction in which the robot chassis 3B travels.

FIG. 21 depicts another embodiment of a robot chassis 3B and cable driven robotic painting system. In the embodiment shown in this figure, the cable driven robotic painting system comprises twelve pulleys (e.g., as with the embodiment shown in FIG. 20), however none of the pulleys are mounted to the robot chassis (e.g., except for the motorized pulleys). As may be understood from this figure, the operation of the embodiment of the cable driven robotic painting system shown in this figure is similar to the operation of the embodiment described with respect to FIG. 20. However, in the embodiment shown in this figure, the additional pulleys that are not at least temporarily mounted in the corner of the room 'float' remotely from the robot chassis 3B to facilitate the movement of the robot chassis 3B within the room. In such an embodiment, the additional pulleys may be affixed adjacent one another via a suitable pulley bracket (e.g., as shown in the close up of the pulleys 6B in FIG. 2).

In the embodiment shown in FIG. 21, the cable driven robotic painting system is configured to cause the robot chassis 3B to move about the room while maintaining a constant drive base orientation (e.g., without rotating relative the walls of the room). Because the robot chassis 3B maintains this constant orientation, the system further comprises a turret mounted sprayer in various embodiments. FIG. 21 further depicts an overhead view of a turret mounted sprayer according to a particular embodiment. In the embodiment shown in this figure, the turret mounted sprayer comprises: (1) a pole mounted paint sprayer 4; (2) a rotary turret 5; (3) a wall distancing arm 9; and (4) a wall roller 8.

In particular embodiments, the pole mounted paint sprayer 4 is configured to extend between a first and second height (e.g., to enable a spray tip to spray paint or other suitable liquid at varying heights such as when painting along a vertical swath). In various embodiments, the rotary turret 5 is configured to rotate about an axis of rotation that extends vertically through a central portion of the rotary turret 5. In some embodiments, the rotary turret 5 is configured to rotate a full 360 degrees (e.g., or any suitable portion thereof), which may, for example, enable the pole mounted paint sprayer 4 to point in any direction relative to the robot chassis. In some embodiments, the system controls the rotation of the rotary turret 5 via one or more suitable motors.

In various embodiments, the turret mounted sprayer further comprises a wall distancing arm 9 comprising a wall roller 8. In various embodiments the wall roller 8 comprises a suitable wheel. In particular embodiments, the wall distancing arm 9 has a length that is based at least in part on one or more spraying characteristics of the pole mounted paint sprayer 4. For example, the wall distancing arm 9 may be dimensioned such that a distance between the robot chassis and a wall that the robot is painting is substantially suitable for spraying when the wall distancing arm 9 is positioned between the pole mounted paint sprayer 4 and the wall with the wall roller touching the wall. In this way, the system may be configured to cause one or more motors to rotate the rotary turret to physically verify that the sprayer is the correct distance from a spraying surface. The system may do this by rotating the turret until the roller wheel 8 is against the surface and then rotating 180 degrees back in order to begin spraying.

Additional Cable Driven Robotic Paint System Embodiments

FIGS. 22A-G depicts additional embodiments of a cable driven robotic painting system. In the embodiments shown in these figures, the cable driven robotic painting system may utilize different combinations of pulleys, motorized pulleys, fixed mounting points, cables, cable spools, etc. Although specific embodiments will be described below, it should be understood that other embodiments of a cable driven robotic painting system may utilize any other suitable combination of the features and components described herein.

Four Cable Robot

In the embodiment of a Four Cable Robot shown in FIG. 22A, the robot chassis 3C comprises four robot mounted cable spools 2C, each having a respective cable that extends to a respective fixed cable mounting point 1C disposed in each of four corners within a rectangular room. In the embodiment shown in this figure, the system utilizes the four fixed cable mounting points in the corners of the room attached to the four independently driven cable spools 2C to adjust the length of each cable in order to position the robot chassis within the room. The system may then utilize any suitable embodiment of a sprayer arm described herein to paint of each of the four walls of the room while maintaining a constant drive base orientation.

Eight Cable Robot

In the embodiment of an Eight Cable Robot shown in FIG. 22B, the robot chassis 3D comprises four robot mounted cable spools 2D, each having a respective cable that extends to two respective fixed cable mounting points 2D disposed in two of the four corners within a rectangular room. In the embodiment shown in this figure, the system utilizes the eight fixed cable mounting points in the corners of the room attached to the four independently driven cable spools 2D to adjust the length of each cable in order to position the robot chassis within the room. In various embodiments, the Eight Cable Robot is substantially similar to the four cable robot described above. In some embodiments, the addition of four cables enables the system to provide extra stability to the robot chassis where the angle of the cables relative to the walls and the chassis are more extreme. The system may then utilize any suitable embodiment of a sprayer arm described herein to paint of each of the four walls of the room while maintaining a constant drive base orientation.

Four Cable T Robot

In the embodiment of a Four Cable T robot shown in FIG. 22C, the robot chassis 3E comprises four robot mounted cable spools 2E. In the embodiment shown in this Figure, the system further comprises a T-bracket comprising two pulleys 6E (see inset of FIG. 3). As may be understood from this figure, the T-bracket further comprises two fixed cable points in addition to the two pulleys 6E. As may further be understood form this figure, the fixed corner mounting points comprise pulleys 6e. In various embodiments, this pulley and fixed mounting point arrangement in combination with the T-bracket enables a more straightforward location determination for the system.

In particular embodiments, the system may utilize the motorized mounted cable spools in combination to control X and Y movement of the chassis 3E within the room. The system may then utilize any suitable embodiment of a sprayer arm described herein to paint of each of the four walls of the room while maintaining a constant drive base orientation.

Two Cable Robot

FIG. 22D depicts a particular embodiment of a Two Cable Robot, which may, for example, be suitable for hallways, single walls, or single ceiling paint passes. As may be understood from this figure, the Two Cable Robot chassis 3f comprises two robot mounted cable spools 2F having two cables that respectively extend to opposing fixed cable mounting points (e.g., which may be at least temporarily disposed on either ends of a hallway, on opposite walls of a room, etc.). The robot may, for example, move between the two fixed cable mounting points in response to one of the robot mounted cable spool spooling its respective cable while the other robot mounted cable spool unspools its respective cable (e.g., and vice-versa).

Four Cable Inline Robot

FIG. 22E depicts an exemplary embodiment of a Four Cable Inline Robot. In the embodiment shown in this figure, the Four Cable Inline Robot is substantially similar to the Two Cable Robot, but comprises two additional robot mounted cable spools, two additional cables, and two additional fixed mounting points. These additional robot mounted cable spools and mounting points which run an additional cable parallel to the existing cables in the Two Cable Robot, may, for example provide extra stability and control to the robot.

Polar Robot—One or Two Cable

FIG. 22F depicts a first and second embodiment of a Polar Robot. The first embodiment comprises a single cable. In this embodiment, the polar robot comprises one robot mounted cable spool 2H and a cable that runs from the spool to a single fixed mounting point 1H, which may, for example, be disposed in the middle of a room. As may be understood from this figure, the single fixed mounting point 1H may serve as an origin location via which the paint robot can determine its location within the room. The robot chassis 3H may, for example, include a motorized, powered chassis capable of driving in any direction (e.g., without the aid of cables). The system may, for example, determine a distance from the fixed mounting point 1H based on how much cable the robot has unspooled. The system may further be configured to determine whether the cable is in tension to enable the robot to determine that the cable length that has been spooled out is the same as the distance to the fixed point. By adding a second cable, the system may, for example, enable the robot to determine its orientation relative to the fixed point in addition to location.

Hallway Runner Robot

FIG. 22G depicts an exemplary Hallway Runner Robot according to a particular embodiment. As may be understood from this figure, the Hallway Runner Robot comprises two wall rollers 8I disposed adjacent a first side of the robot chassis 3I on a distal end of two respective wall distancing arms 9I that extend outward from the chassis. The chassis further comprises a tensioning device 7I disposed adjacent a side of the chassis opposing the two rollers 8I. As may be understood from this figure, the tensioning device 7I (which may, for example, include any suitable biasing mechanism such as one or more springs, one or more linear springs, etc.) is configured to apply tension against rollers disposed adjacent the tensioning device 7I such that the wall rollers 8I are in substantially constant contact with the opposing wall. In this way, the robot can maintain a fixed distance from the wall, while providing tension for one or more of the rollers 8I (e.g., one or more motorized rollers) to cause the chassis to roll along the wall. In this way, the robot can essentially ride between walls in small rooms or hallways as shown.

Omni-Directional Drive Base with Distance Skirt

Figure 23:
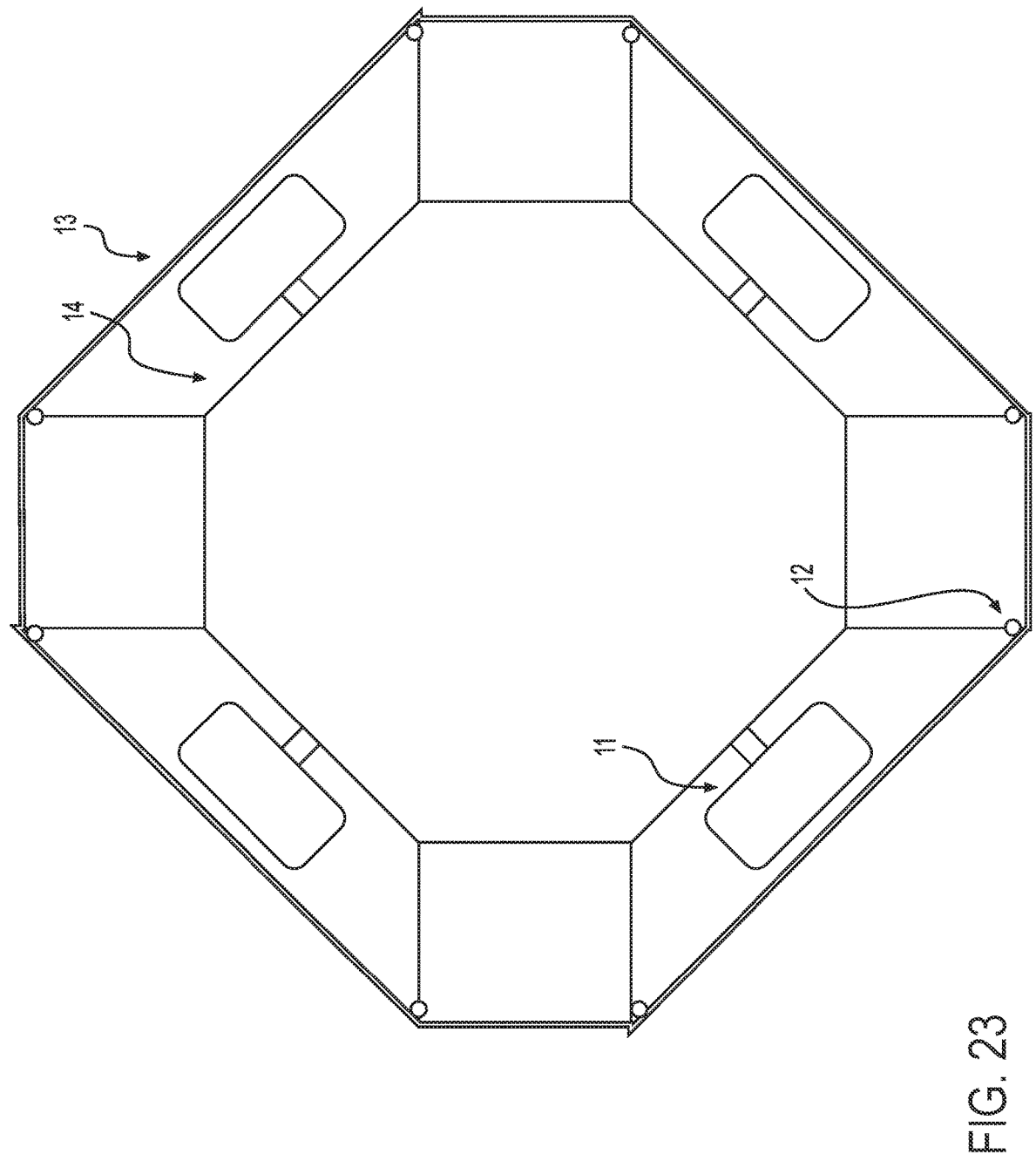
FIG. 23 is a top plan view of a paint robot base with a distancing skirt according to a particular embodiment, which may, for example, be used in the context of any suitable cable driven robotic painting system or self-driving (e.g., autonomous) paint robot described herein.

FIG. 23 depicts a robot chassis according to a particular embodiment. In the embodiment shown in this figure, the chassis is substantially octagonal. As may be understood from this figure, the chassis 14 comprises four wheels 11 and a plurality of rollers 12 on distancing arms. As shown in this figures, the rollers 12 on distancing arms extend outward from the chassis with the rollers 12 disposed adjacent a distal portion of the distancing arms.

In the embodiment shown in FIG. 4, the chassis further comprises a track (e.g., a band or tread) 13 disposed about a perimeter of a base portion of the chassis. As may be understood from this figure, the track 13 may be supported by the rollers 12 on the distancing arms. In particular embodiments, the track rotates freely relative to the chassis (e.g., on the rollers). In particular embodiments, the track is at least partially motorized (e.g., one or more of the rollers may by motorized to enable the system to cause the track to rotate about a perimeter of the chassis). In other embodiments, the track may rotate substantially freely (e.g., as the chassis drives along a wall with an outer surface of the track at least partially touching the wall). In particular embodiments, the track (e.g., as a distance skirt) may function to maintain a proper distance between a painting surface and a spray tip of the paint robot as the system drives the robot chassis along a wall for painting. The distance skirt may, for example, be dimensioned based at least on one or more spray characteristics of a spray tip utilized by the paint robot to apply paint or other liquid to the wall surface (e.g., based on a swath width of the sprayer, a pressure at which the paint is sprayed, a viscosity of the liquid being sprayed, etc.).

Figure 24:
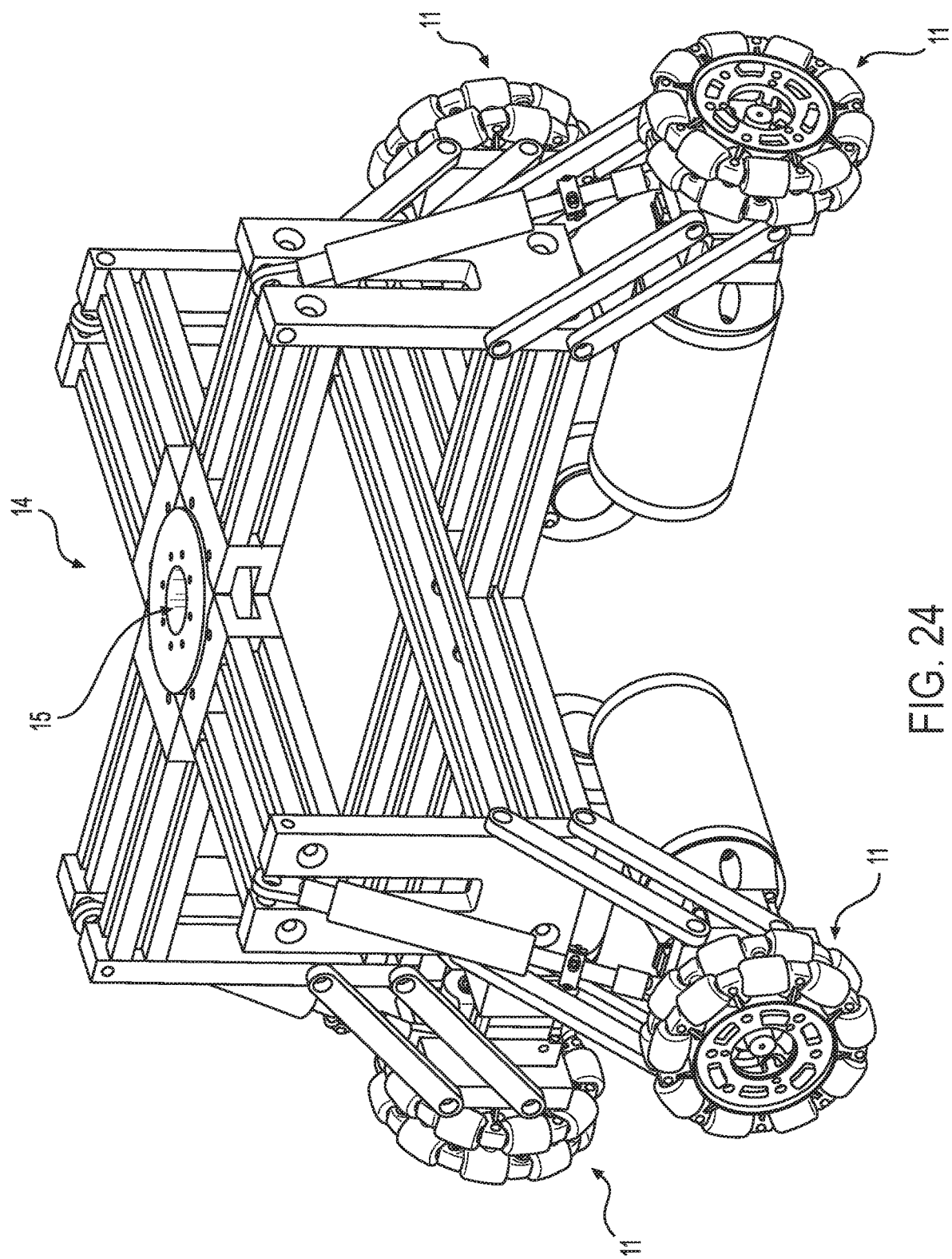
FIG. 24 is a perspective view of a paint robot base according to a particular embodiment.

FIG. 24 depicts a robot chassis according to yet another embodiment. As may be understood from this figure, the chassis 14 comprises four wheels 11a and further defines a paint spray pole support assembly 15. In the embodiment shown in this figure, the paint spray pole support assembly is substantially circular and configured to support a paint sprayer pole (e.g., which may for example support a pole mounted paint sprayer or other suitable paint sprayer described herein). In the embodiment shown in this figure, the chassis further comprises a suspension system, which may, for example, enable smooth movement of the robotic chassis over a support surface (e.g., as the support surface may include a support surface that is not perfectly flat).

In various embodiments described herein, the robot chassis may be configured to move in any direction as well as spin in place. By adding roller wheels at a fixed distance from the drive base and having a tread/band around them creating a distance skirt as described above, the robot may be able to drive along and towards the wall while having the distance skirt maintain the desired spray tip distance from the wall. In the configuration shown in this figure, the distance skirt may ride on the wall similar to a tank tread rides on the ground (e.g., either in a powered or unpowered manner).

Exemplary Spray Turret

Figure 25B:
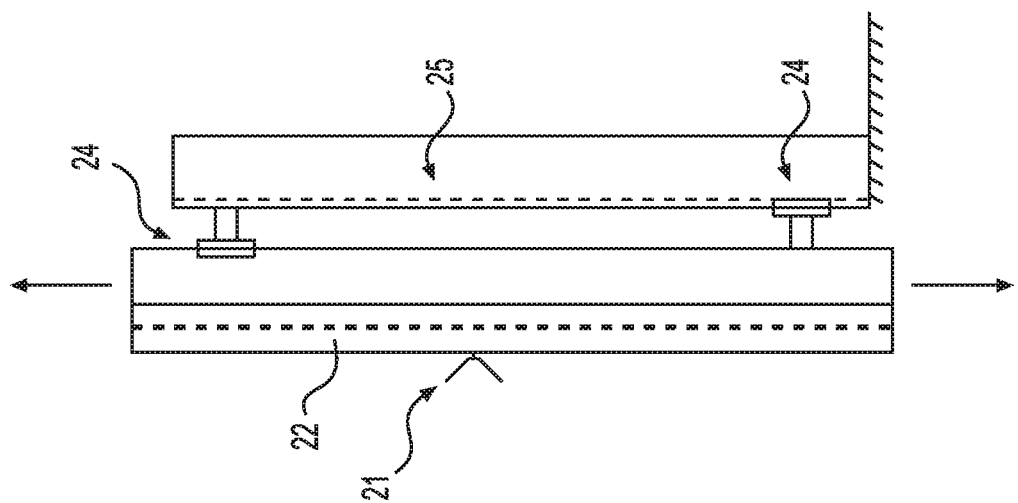
FIGS. 25A-25B depict a front and side view of a telescoping paint spraying arm, which may, for example, be used in the context of any suitable cable driven robotic painting system or other paint robot (e.g., autonomous paint robot) described herein.
Figure 25A:
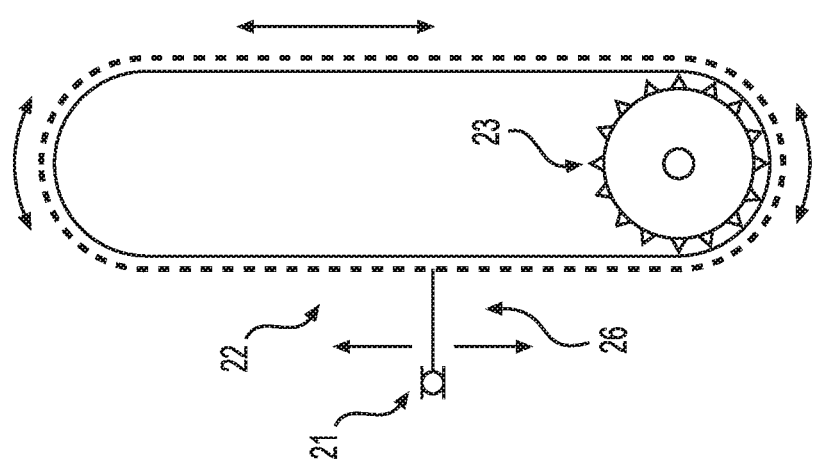

FIGS. 25A-B depict an exemplary spray turret according to a particular embodiment. In the embodiment shown in this figure, the spray turret comprises: (1) a first vertical support portion comprising a sprayer 21, a chain 22, a motorized sprocket 23, and an offset arm; (2) a second vertical support portion comprising one or more linear bearings 24, and a cable/belt 25.

In particular embodiments, the first and second vertical support portions are configured to slide relative to one another via a suitable joint (e.g., the one or more linear bearings 24) in a substantially telescoping (e.g., telescoping) manner. As may be understood from FIG. 25B, in various embodiments, first vertical support is configured to move vertically relative to the second vertical support (e.g., between a first and second height). In various embodiments, the spray turret comprises one or more motors configured to cause the second vertical support portion to slide relative to the first vertical support portion.

In various embodiments, as may be understood from FIG. 25A, the sprayer is configured to travel around a track defined by the chain 22 (e.g., via rotation of the motorized sprocket). In this way, the sprayer 21 is configured to paint a first vertical swath of paint traveling upward along the track, and a second vertical swath of paint adjacent the first vertical swath while traveling downward along the other side of the track. The offset arm, in various embodiments, is dimensioned based on one or more characteristics of the sprayer such that the resulting first and second swaths are adjacent one another (e.g., a width of the first swath is such that an edge of the first swath substantially aligns with an edge of the second swath). In this way, the system may be configured to spray two vertical swaths from a single, stationary position.

In particular other embodiments, the chain 22 may alternatively include a suitable belt or similar device. In various embodiments, the chain 22 is configured translate and rotate the sprayer 21 as it moves along a substantially elliptical path. This entire sub-assembly (e.g., the first vertical support portion) may be attached to a second section (e.g., the second vertical support portion) via one or more linear bearings 24 (shown in the side view of FIG. 25B), which may, for example be attached to a timing belt 25 (or similar device) configured to provide powered movement up and down. To maintain the desired spray tip speed, the system may be configured to utilize the motorized sprocket 23 and the timing belt 25 in combination to reach a desired vertical travel speed of the sprayer 21. For example, the system may be configured (e.g., using a suitable computer controller) to cause the motorized sprocket 23 and the timing belt 25 to synchronize to reach a desired speed. For example if the desired sprayer 21 speed is 24 in/sec then the rotary section may spin at 12 in/sec while moving either up or down via the timing belt 25 at 12 in/sec.

In particular embodiments, the chain driven spray tip allowing for two vertical swaths from a single position of the robot chassis, may, for example: (1) enable the sprayer to cut in at the ceiling and floor; (2) enable the paint robot to spray two swaths per drive base movement (e.g., the drive base may move to a first position, paint two adjacent vertical swaths, move along the wall a width substantially equivalent to two swaths, paint an additional two vertical swaths, and so on); (3) enable the robot to spray up and down without moving allowing for driving to occur only when the pole is in its compact and more stable configuration without loss of productivity; (4) allow for the paint spraying system to only need to activate the sprayer valve once per wall, which may, for example remove any delays from activating and deactivating the sprayer (e.g., such as clogs due to premature paint drying, other delays from activation and deactivation, etc.).

Application in Non-Rectangular Room

Various embodiments of a cable driven robotic painting system are described above in the context of painting a room having four corners (e.g., a rectangular room). Various other embodiments of the system may enable painting of rooms having other shapes (e.g., other contiguous rooms such as U-shaped rooms, etc.).

In such embodiments, the system may be configured to provide for a transfer of a driving cable between first and second portions of the room as the paint robot makes its way around the room to paint the various walls.

Figure 26:
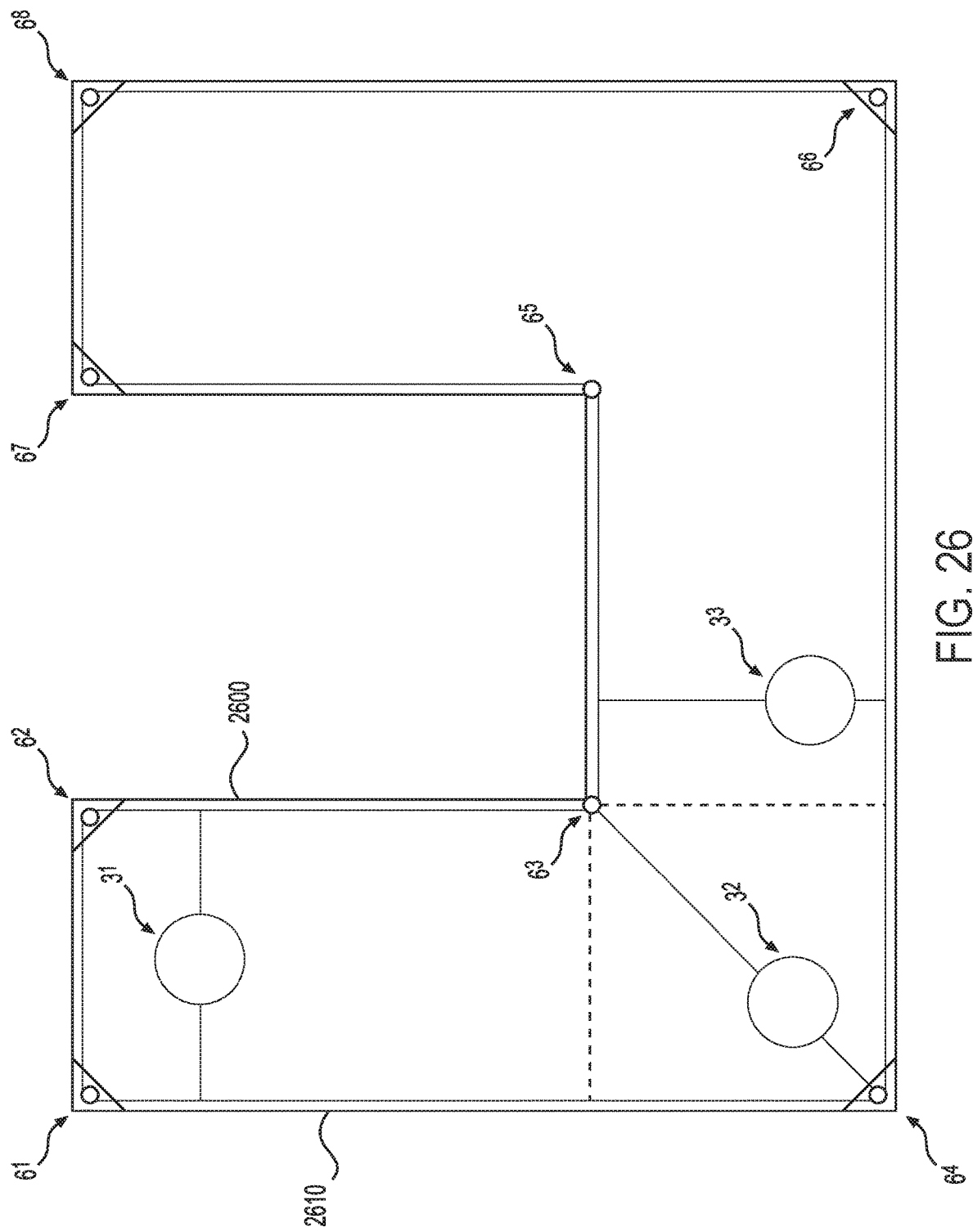
FIG. 26 is a top plan view of a particular implementation of various embodiments of a cable driven robotic painting system for painting a non-rectangular room.

FIG. 26 depicts an exemplary U-shaped room 2600 comprising eight pulleys $6^{1-8}$ at least temporarily disposed adjacent each 'corner' of the room (e.g., at an intersection of each wall of the U-shaped room). As shown in this Figure, a single cable 2610 extends around a perimeter of the room via the eight pulleys $6^{1-8}$. Although these points are depicted as pulleys, in other embodiments, they may include fixed mounting points, or other suitable means for mounting the cable. FIG. 26 further depicts a robot chassis $3^{1-3}$ in three different positions as it traverses around the bottom of the U-shape. As may be understood from this figure, the robot chassis may travel along a particular wall via one or more cables that extend from the chassis to opposing walls of the room (e.g., using any suitable technique or any suitable configuration of a robot chassis or cable-driven robot system described herein).

Figure 27:
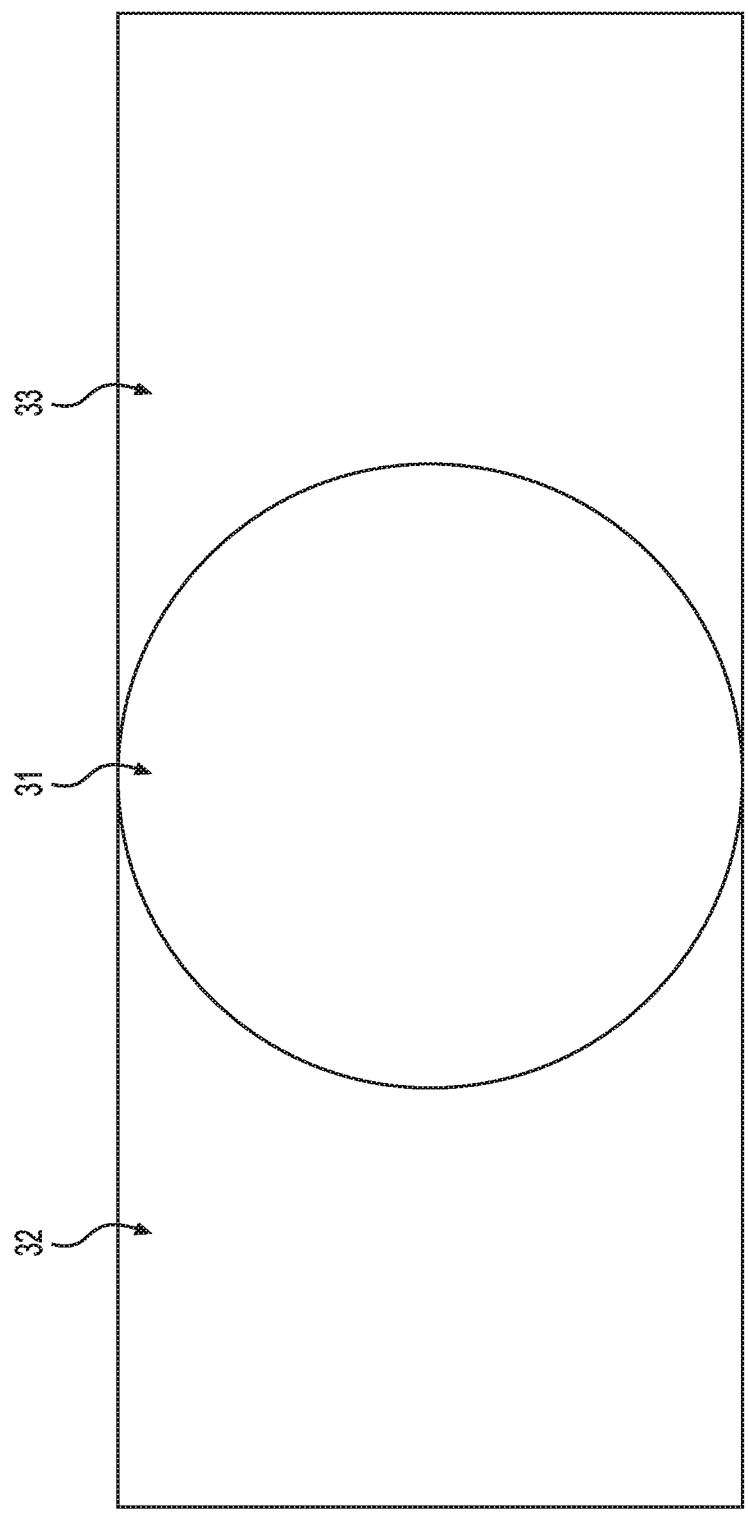
FIG. 27 is an example cross section of a stanchion/cable/guide arrangement according to a particular embodiment.

As may be further understood from this figure, as the robot chassis 3 needs to make a turn from the first, left rectangular portion of the U-shaped room, to the second, bottom rectangular portion of the U-shaped room, a handoff must occur such that a guide that guides the chassis cable along the perimeter cable can bypass a stanchion, pulley, or other device that is maintaining the perimeter cable adjacent the corner. FIG. 27 depicts an exemplary cross section of a stanchion 32 holding a cable 31 and the complimentary guide 33. As shown in this figure, in particular embodiments, the stanchion 32 is dimensioned such that is configured to grip the cable sufficiently tightly to maintain the cable adjacent the corner, while leaving sufficient cable area for the guide 33 to travel along the cable while avoiding the stanchion 32. In particular embodiments, the system may utilize any other suitable technique for holding the perimeter cable in place such that a guide, roller, or other similar device holding the chassis cable can pass by successfully.

As shown in FIG. 26, when turning between the first and second rectangular portions of the U-shaped room, a first end of the chassis cable may remain at a corner fixed point $6^3$ (e.g., or pulley) while the second end of the chassis cable continues to traverse along the perimeter of the room, bypasses a stanchion or other support device at the outside corner $6^4$, and continues along the bottom wall until the stanchion cable ends are on opposing portions of co-facing walls.

Application of Non-Paint Materials

Although various embodiments of a cable driven robotic system are described above in the context of applying paint or other liquid to a surface, it should be understood that other embodiments may utilize any suitable technique described herein to apply any other suitable material (e.g., either singularly or additively). These other materials may include, for example, stucco, cement, gunite, one or more plastics, insulation, foam, or other suitable materials. In various other embodiments, one or more techniques described herein may be utilized for the application of any other suitable material such as, for example, a solid material (e.g., a powder, sand, glitter, pellets such as BBs etc.), semi-solid material, a molten material, gaseous material, plasma, textured material, solid suspended in a liquid, etc. The system may, for example be utilized to apply any material in any suitable location regardless of a density, consistency, or other property of the material.

In various embodiments, the system is configured to utilize any suitable technique herein to apply any suitable material under pressure (e.g., through an orifice, via a suitable mold, etc.). In particular embodiments, the system is configured to atomize a material for application. In other embodiments, the system is configured to apply the material in its substantially natural state. In still other embodiments, the system is configured to apply one or more materials in a suitable matrix. In some embodiments, the system is configured to utilize one or more techniques described herein in a suitable 3-D printing application (e.g., portable and/or large-scale 3-D printing).

Additional Alternative Embodiments

One or more additional alternative embodiments may comprise one or more features that are similar to those described above. In particular embodiments described herein, any suitable fixed cable mounting point, pulley, motorized pulley, motorized or motorized cable spool, etc. may be substituted for any suitable similar feature. For example, where a fixed cable mounting point is described, various other embodiments may substitute a pulley, motorized pulley, motorized or motorized cable spool, etc. Similarly, where a pulley is described, particular other embodiments may substitute fixed cable mounting point, a motorized pulley, motorized or motorized cable spool, etc. Any other embodiment described herein may further substitute any other suitable feature for one or more additional features or combination of features.

Variable Width Trestle Sprayer with Multiple V-Spray Guns

Figure 28:
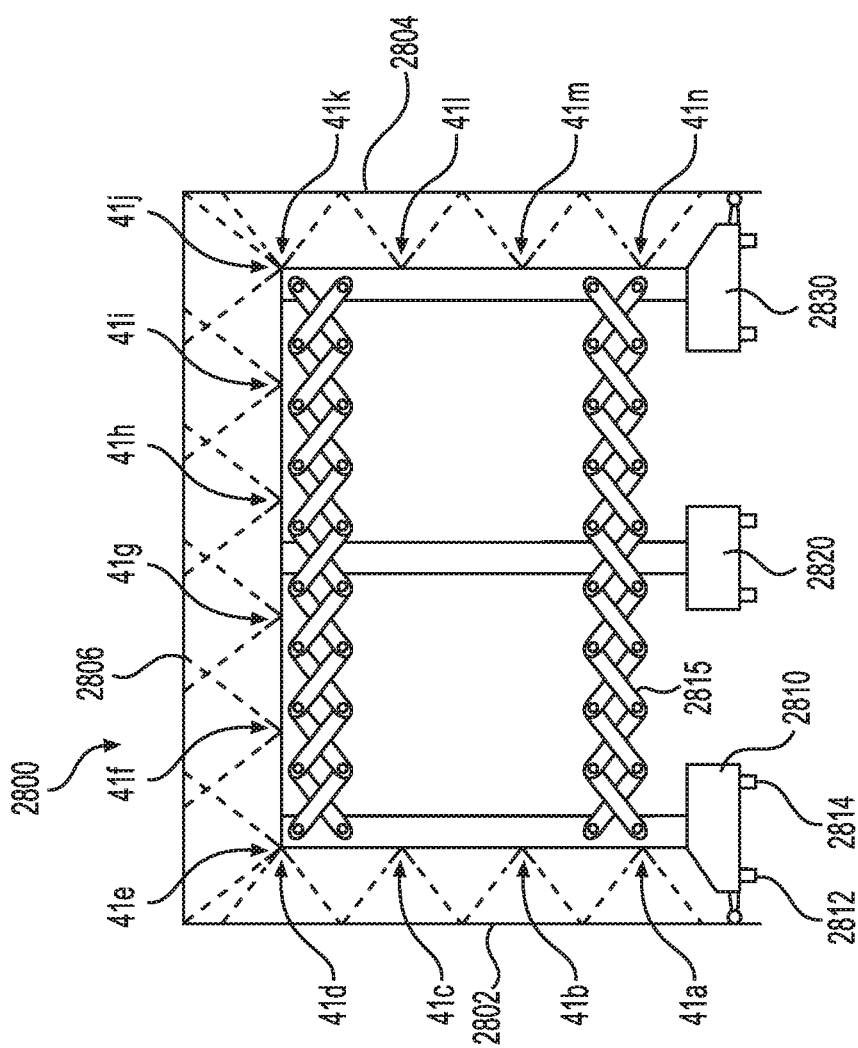
FIG. 28 is an exemplary embodiment of a variable width trestle sprayer according to a particular embodiment.

FIG. 28 depicts a variable width trestle sprayer according to a particular embodiment. As may be understood from this figure, a variable width trestle sprayer may be configured to be adjusted in size both vertically and horizontally to substantially encompass a room, hallway, or other suitable portion of a building such that a plurality of sprayers disposed about the variable width trestle sprayer may spray a left wall 2802, right wall 2804, and ceiling 2806 of a room 2800 substantially simultaneously.

In the embodiment shown in FIG. 28, the variable width trestle sprayer comprises: (1) a left motorized unit 2810; (2) a right motorized unit 2830; (3) and one or more intermediate support units 2820 (e.g., which may be motorized or un-motorized according to particular embodiments). As may be understood from FIG. 28, the variable width trestle sprayer may comprise varying numbers of intermediate support units based at least in part on a size of a room that the variable width trestle sprayer is spraying. The variable width trestle sprayer may be configured to enable a straight-forward addition or removal of one or more intermediate support units, for example, via a suitable latch, pin, or other suitable fastener 2815. In particular embodiments, the left motorized unit 2810, right motorized unit 2830, and any intermediate support units 2820 are configured to support at least one respective vertical support. In the embodiment shown in this figure, each respective vertical support portion may be connected to an adjacent vertical support portion via one or more suitable variable width trestles (e.g., an upper trestle and a lower trestle). In particular embodiments, the one or more variable width trestles are adjustable on-the-fly (e.g., as the motorized units are driving). In other embodiments, each of the vertical supports is adjustable in height (e.g., to accommodate one or more rooms of differing heights).

As may be further understood from FIG. 28, the variable width trestle sprayer comprises a plurality of spray tips 41A-N. Each of the plurality of spray tips 41A-N may be disposed substantially evenly along a height of the vertical support portion supported by the left and right motorized units 2810, 2830 (e.g., adjacent a left and right wall of a room) as well as along an upper portion of the variable width trestle sprayer (e.g., adjacent the room's ceiling 2806). In particular embodiments, each of the plurality of spray tips 41A-N may be disposed in a pattern suitable for applying a substantially consist coat of paint about a perimeter of the room (e.g., including a left ceiling, and right wall) as the left and right motorized units drive the variable width trestle sprayer through the room (e.g., or along the hallway, etc.). As may be understood from this figure, the variable width trestle sprayer may be configured to be assembled in an area that is desired to be sprayed (e.g., as shown) and then driven along a length of the room as the plurality of spray tips 41A-N spray paint or another suitable liquid or other material described herein along the walls.

As shown in FIG. 28, the variable width trestle sprayer may further comprise a wall sensing standoff on both the left and right motorized units that is configured to ensure that the left and right motorized units are positioned a suitable distance from the left and right walls as the plurality of sprayers 41A-N are spraying. In various embodiments, the wall sensing standoff may comprise one or more mechanical standoffs (e.g., such as one or more rollers on one or more extender arm), one or more distance sensors (e.g., such as an IR sensor), or any other suitable sensor.

In particular embodiments, the position of the plurality of spray tips may be determined based at least in part on one or more spray characteristics of the tips (e.g., a fan of the sprayers, etc.). In various embodiments, each of the plurality of spray tips 41A-N may be adjusted along a height of the respective vertical support on which it is disposed, or along a width of the upper portion of the variable width trestle sprayer adjacent the ceiling on which it is disposed.

Figure 29A:
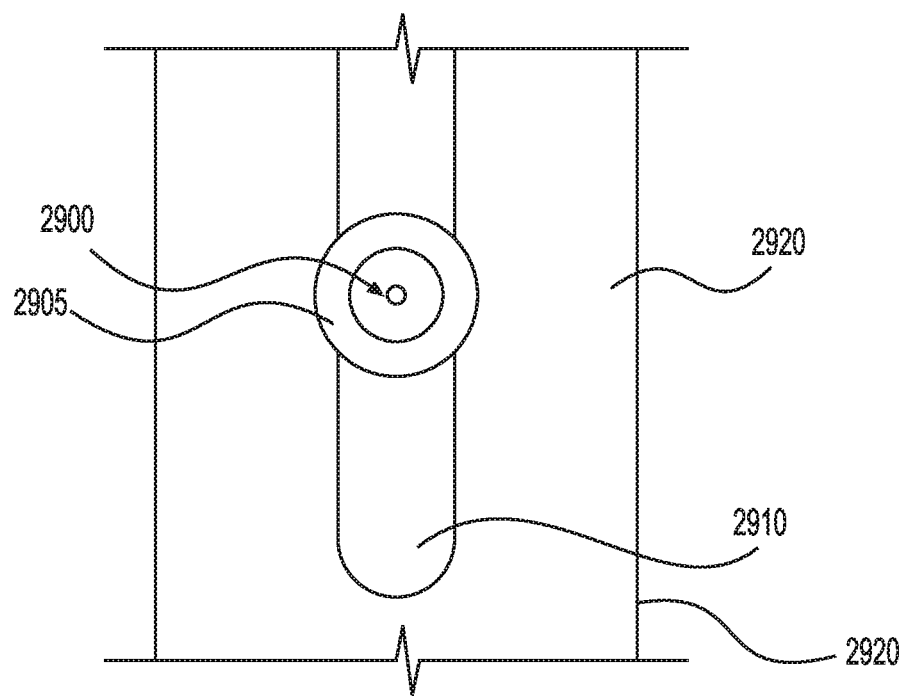
FIG. 29A-B depict a vertical elevation and cross section view of a sprayer that may, for example, be utilized in the variable width trestle sprayer shown in FIG. 28.

FIG. 29A depicts a detail view of a sprayer disposed in a slotted tube. In particular embodiments, the vertical supports may comprise a slotted tube along which each of the plurality of spray tips 41A-N is disposed. As may be understood from the vertical elevation view shown in FIG. 29A, the slotted tube defines a vertical slot 2910 for positioning the sprayer. The sprayer 2900 may be configured to slide within the vertical slot to any desired positioned along a height of the vertical support. A shown in the cross-section top plan view of FIG. 29B, the sprayer may comprise a positioning fixture 2905 for holding the sprayer in a desired vertical location. The positioning fixture may include, for example, a threaded fixture, clamp, biasing mechanism, or other suitable fastener or fixture. As shown in this figure, the positioning fixture may at least partially engage with the slotted tube to maintain the sprayer in the desired position.

Figure 29B:
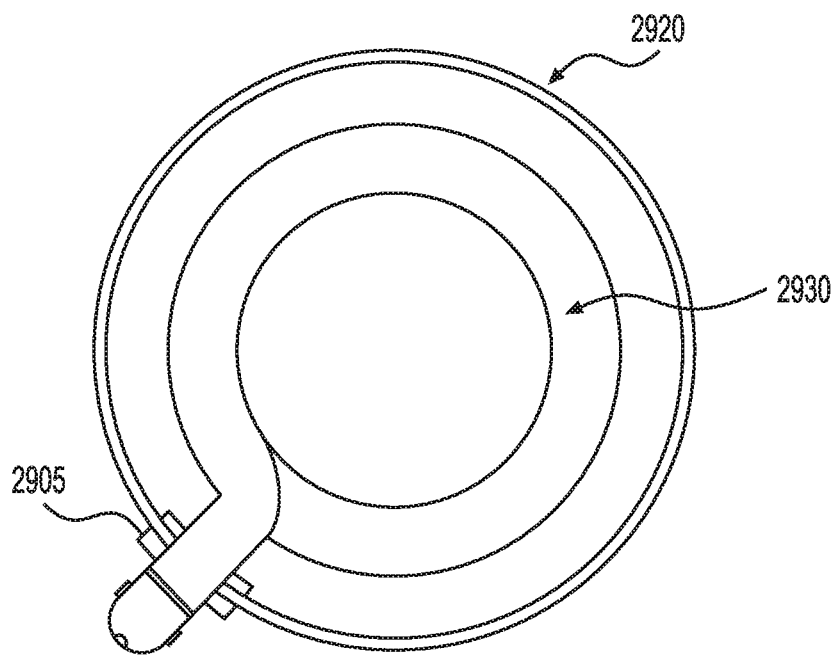

FIG. 29B also depicts a spray material line 2930, which may, for example, be disposed at least partially within the slotted tube (e.g., within the slotted tube) and be configured to supply a medium to the sprayer for spraying. In various embodiments, the spray material line may comprise a coil supply line (e.g., or other adjustable length supply line), which may comprise a respective tap-off point for each respective one of the plurality of spray tips. In particular embodiments, each particular sprayer comprises one or more valves for controlling a pressure at the respective spray tip. This may, for example, ensure that each respective spray tip 41A-N is spraying at substantially the same pressure. In other embodiments, each respective spray tip 41*a*-N comprises one or more respective pumps for pumping a medium to the respective spray tip for spraying. In other embodiments, the variable width trestle sprayer comprises one or more pumps that cooperate to or independently supply a medium to one or more of the plurality of spray tips 41A-N at pressure. In particular embodiments, the system is configured to adjust a pressure at any individual spray tip (e.g., to independently adjust a spray characteristic such as spray fan of one or more respective tips).

In particular embodiments, each of the plurality of spray tips 41A-N may be independently controlled (e.g., using a suitable computer controller). In this way, the variable width trestle sprayer may be configured to activate and deactivate particular spray tips as the variable width trestle sprayer progresses through a room (e.g., in order to avoid painting voids such as windows and doors and other areas that do not require spraying). For example, as the trestle spryer passes along a doorway, the trestle sprayer may turn off the lower-most spray tips (e.g., the lower-most spray tips whose combined spray pattern makes up the height of the door) on the side of the trestle sprayer that is facing that wall that defines the doorway until the trestle sprayer moves past the doorway. In this way, the variable with trestle sprayer may be utilized to paint a room for which a room plan was generated using any suitable technique described herein (e.g., a room having walls with one or more doors, windows, etc. that should not be painted).

In still other embodiments, the variable width trestle sprayer may be configured to adjust its width substantially on the fly. For example, the trestle sprayer may be configured such that the left or right motorized unit is configured to pull away from the left or right wall, for example, in order to avoid an obstacle (e.g., a column, protrusion, etc.) or other object in its path of travel.

In some embodiments, the variable width trestle sprayer is configured to paint non-rectangular rooms (e.g., such as shown in FIG. 26 with respect to the cable driven paint robot). For example, the variable width trestle sprayer may be configured to paint the left portion of the room shown in FIG. 26 until the right motorized unit reaches the corner at location $6^3$ of the U-Shaped room. The left motorized unit may continue to drive while the right motorized unit remains stationary at the corner. As the left motorized unit continues to drive to the corner at location $6^4$, the variable width trestle sprayer may expand in width to account for additional distance (e.g., width). The left motorized until may then complete the turn, and the variable width trestle sprayer may retract in size as the left motorized unit reaches a position opposite the right motorized unit on the co-facing wall on the U-shaped room's bottom portion (e.g., such that the variable width trestle sprayer is positioned along the dashed line shown). The left and right motorized units may then continue to progress along the bottom portion of the U-shaped room (e.g., at substantially the same speed) in order to paint that portion.

In various embodiments, when painting a substantially straight section of a room, both the left and right motorized units may travel at substantially the same speed. In other embodiments in which the room has non-straight portions, the left and right motorized units may move independently of one another, at one or more varying speeds, etc. In any of these embodiments, the width of the trestle robot may adjust on the fly to accommodate one or more changes in the width of the area being painted.

CONCLUSION

Many modifications and other embodiments of the invention will come to mind to one skilled in the art to which this invention pertains having the benefit of the teachings presented in the foregoing descriptions and the associated drawings. Therefore, it is to be understood that the invention is not to be limited to the specific embodiments disclosed and that modifications and other embodiments are intended to be included within the scope of the appended claims. For example, while the above robot is discussed particular in regard to paint, it should be understood that various other embodiments may be configured to apply any other liquid to any other suitable surface using any of the techniques described herein. Furthermore, any combination of any features may be utilized in the context of any specific embodiment. For example, although one or more features may not be discussed in relation to one another, various embodiments of a paint robot may utilize any feature of component described herein in any combination. Furthermore, although various embodiments are described in the context of a paint robot, it should be understood that various features described may be implemented in any other suitable context (e.g., gantry system, etc.) or for any other construction robotics applications (e.g., in the context of a drywall mounting robot, or other autonomous construction robot). Although specific terms are employed herein, they are used in a generic and descriptive sense only and not for the purposes of limitation.

What is claimed is:

1. An autonomous mobile spraying robot comprising:
   a sprayer support system comprising at least one vertical support, wherein the at least one vertical support comprises:
     a first vertical support that extends from a base of the autonomous mobile spraying robot and is perpendicular to a support surface; and
     a second vertical support configured to slide relative to the first vertical support;
   a sprayer adjacent the at least one vertical support and configured to translate vertically along a track defined by the second vertical support; and
   a computer controller configured for:
     causing the autonomous mobile spraying robot to spray a vertical swath of material by:
       causing the second vertical support to slide vertically relative to the first vertical support at a first speed to a height that corresponds to a height of a wall; and
       causing the sprayer to slide relative to the second vertical support at a second speed such that the first speed and the second speed are synchronized to a desired speed and the sprayer travels a linear path from a base of the second vertical support adjacent a base of the wall to a top portion of the second vertical support adjacent a top portion of the wall; and
     causing the sprayer to spray the material while the sprayer is traveling the linear path.

2. The autonomous mobile spraying robot of claim 1, wherein the first vertical support and the second vertical support are co-linear.

3. The autonomous mobile spraying robot of claim 1, further comprising:
   one or more sensors; and
   one or more sensor shields configured to selectively shield the one or more sensors from an exterior of the autonomous mobile spraying robot.

4. The autonomous mobile spraying robot of claim 3, wherein the computer controller is configured to cause one or more mechanisms to expose the one or more sensors to the exterior of the autonomous mobile spraying robot through movement of at least one of the one or more sensors or the one or more sensor shield.

5. The autonomous mobile spraying robot of claim 1, wherein:
   the autonomous mobile spraying robot further comprises a wheeled base, wherein the sprayer support system is coupled to the wheeled base;
   the computer controller is configured to cause the wheeled base to move the autonomous mobile spraying robot along the wall a distance of one swath-width after spraying the vertical swath of material; and
   after causing the wheeled base to move the autonomous mobile spraying robot along the wall the distance of one swath-width after spraying the vertical swath, the computer controller is further configured for:
   causing the second vertical support to slide vertically relative to the first vertical support from the height that corresponds to the height of the wall to an initial position; and
   causing the sprayer to slide relative to the second vertical support such that the sprayer travels a linear path from the top portion of the second vertical support adjacent the top portion of the wall to the base of the second vertical support adjacent the base of the wall while spraying a second vertical swath of the material at the desired speed.

6. The autonomous mobile spraying robot of claim 1, wherein the at sprayer is configured to angle upwards by about ninety degrees.

7. The autonomous mobile spraying robot of claim 6, wherein the sprayer is configured to spray a ceiling above the autonomous mobile spraying robot.

8. The autonomous mobile spraying robot of claim 1, wherein the sprayer is configured to spray one or more materials selected from a group consisting of:
   paint;
   foam;
   cement;
   gunite;
   stucco; and
   insulation.

9. The autonomous mobile spraying robot of claim 8, wherein:
   the one or more materials comprise paint;

the autonomous mobile spraying robot further comprises:
at least one container for storing the paint; and
a pump configured to draw paint from the at least one container and deliver the paint at a pressure through the at least one sprayer.

10. The autonomous mobile spraying robot of claim 9, wherein:
the autonomous mobile spraying robot further comprises a viscosity sensor configured to measure a viscosity of the paint; and
the computer controller is further configured for:
using the viscosity sensor to measure the viscosity of the paint; and
adjusting the pressure in response to measuring one or more changes to the viscosity of the paint.

11. An autonomous mobile spraying robot comprising:
a base portion;
a plurality of wheels disposed on the base portion and configured to support the autonomous mobile spraying robot adjacent a support surface;
a sprayer support system disposed on the based portion comprising
a first vertical support that extends from the base portion and is perpendicular to the support surface; and
a second vertical support configured to slide relative to the first vertical support in a telescoping manner; and
a spray tip disposed adjacent the second vertical support and configured to translate vertically along a track defined by the second vertical support; and
a computer controller configured for:
causing the autonomous mobile spraying robot to spray a vertical swath of a wall by:
activating the spray tip to spray along a vertical path a desired speed by causing vertical motion of the spray tip relative to the base portion by:
causing the second vertical support to slide vertically relative to the first vertical support at a first speed to a height that corresponds to a height of the wall; and
causing the spray tip to slide relative to the second vertical support at a second speed such that the first speed and second speed are synchronized to the desired speed and the spray tip travels a linear path from a base of the second vertical support adjacent a base of the wall to a top portion of the second vertical support adjacent a top portion of the wall.

12. The autonomous mobile spraying robot of claim 11, further comprising one or more motors configured to cause the second vertical support to slide vertically relative to the first vertical support.

13. The autonomous mobile spraying robot of claim 12, further comprising one or more motors configured to cause the spray tip to slide relative to the second vertical support.

14. The autonomous mobile spraying robot of claim 11, wherein the spray tip is configured to spray one or more materials selected from a group consisting of:
paint;
foam;
cement;
gunite;
stucco; and
insulation.

15. The autonomous mobile spraying robot of claim 11, wherein the spray tip is configured to angle upwards.

16. The autonomous mobile spraying robot of claim 11, further comprising:
one or more sensors; and
one or more sensor shields configured to selectively shield the one or more sensors from an exterior of the autonomous mobile spraying robot.

17. The autonomous mobile spraying robot of claim 16, wherein the computer controller is configured to cause one or more mechanisms to expose the one or more sensors to the exterior of the autonomous mobile spraying robot through movement of at least one of the one or more sensors or the one or more sensor shield.

18. The autonomous mobile spraying robot of claim 17, wherein:
the autonomous mobile spraying robot comprises an imaging device; and
the computer controller is configured to use the imaging device to identify a line along the wall and cause the base portion to follow along the line.

19. The autonomous mobile spraying robot of claim 18, wherein:
the imaging device comprises at least one infra-red detector; and
the computer controller is further configured for causing the autonomous mobile spraying robot to follow the line by:
collecting infrared intensity from the at least one infrared detector;
identifying a deviation from the line based on the infrared intensity; and
correcting steering of the plurality of wheels as the base portion moves along the wall based at least in part on the identified deviation from the line.

20. An autonomous mobile spraying robot comprising:
a base portion;
a plurality of wheels disposed on the base portion and configured to support the autonomous mobile spraying robot adjacent a support surface;
a sprayer support system disposed on the based portion comprising
a first vertical support that extends from the base portion and is perpendicular to the support surface; and
a second vertical support configured to slide relative to the first vertical support in a telescoping manner; and
a spray tip disposed adjacent the second vertical support and configured to translate vertically along a track defined by the second vertical support; and
a computer controller configured for:
causing the autonomous mobile spraying robot to spray in a vertical path by:
activating the spray tip to spray along the vertical path a desired speed by causing vertical motion of the spray tip relative to the base portion by:
causing the second vertical support to slide vertically relative to the first vertical support at a first speed to a height that corresponds to a desired height; and
causing the spray tip to slide relative to the second vertical support at a second speed such that the first speed and second speed are synchronized to the desired speed and the spray tip travels a linear path that corresponds to the vertical path from a base of the second vertical support adjacent a base of the base portion to a top portion of the second vertical support adjacent the desired height.

* * * * *